(12) United States Patent
Takahara et al.

(10) Patent No.: US 9,874,806 B2
(45) Date of Patent: Jan. 23, 2018

(54) COLOR SPLITTING/COMBINING PRISM, AND OPTICAL SYSTEM AND PROJECTOR THEREWITH

(71) Applicant: Konica Minolta, Inc., Tokyo (JP)

(72) Inventors: Koji Takahara, Osaka (JP); Yasumasa Sawai, Nara (JP)

(73) Assignee: Konica Minolta, Inc., Tokyo (JP)

( * ) Notice: Subject to any disclaimer, the term of this patent is extended or adjusted under 35 U.S.C. 154(b) by 6 days.

(21) Appl. No.: 15/248,933

(22) Filed: Aug. 26, 2016

(65) Prior Publication Data

US 2016/0363851 A1    Dec. 15, 2016

Related U.S. Application Data

(63) Continuation of application No. PCT/JP2015/055331, filed on Feb. 25, 2015.

(30) Foreign Application Priority Data

Feb. 28, 2014  (JP) ................................. 2014-038114
May 29, 2014  (JP) ................................. 2014-110907

(51) Int. Cl.
*G03B 21/14* (2006.01)
*G03B 21/20* (2006.01)
(Continued)

(52) U.S. Cl.
CPC .............. *G03B 33/12* (2013.01); *G02B 5/04* (2013.01); *G02B 5/28* (2013.01); *G02B 27/102* (2013.01);
(Continued)

(58) Field of Classification Search
CPC ...... G02B 27/102; G02B 27/126; G02B 5/04; G02B 5/28; G03B 21/008; G03B 21/2033; G03B 33/12; H04N 9/3105; H04N 9/3108
See application file for complete search history.

(56) References Cited

U.S. PATENT DOCUMENTS

| 5,914,817 A * | 6/1999 | Browning .......... G02B 27/1026 |
| | | 204/192.26 |
| 6,078,429 A * | 6/2000 | Lyon ....................... G02B 5/04 |
| | | 359/583 |

(Continued)

FOREIGN PATENT DOCUMENTS

JP    2000-258725 A    9/2000
JP    2007-058166 A    3/2007
(Continued)

OTHER PUBLICATIONS

International Search Report issued in corresponding International Application No. PCT/JP2015/055331 dated May 19, 2015, and English translation thereof (5 pages).

*Primary Examiner* — Bao-Luan Le
(74) *Attorney, Agent, or Firm* — Osha Liang LLP

(57) ABSTRACT

A color splitting/combining prism splits apart illumination light from a projector and combines together projection light from the projector. A part of the illumination light that is not used as the projection light passes through the color splitting/combining prism as OFF-light via an image display element in a direction different from the projection light. The color splitting/combining prism includes a dichroic film of which a cutoff wavelength, at which the dichroic film exhibits a transmittance of 50% when splitting two different colors between reflection and transmission, is provided in a wavelength range in which wavelength separation is possible for all of the illumination light, the projection light, and (Continued)

the OFF-light that are incident at different incidence angles respectively.

20 Claims, 41 Drawing Sheets

(51) Int. Cl.
    *G02B 21/10*     (2006.01)
    *G03B 33/12*     (2006.01)
    *H04N 9/31*     (2006.01)
    *G02B 5/04*     (2006.01)
    *G02B 5/28*     (2006.01)
    *G03B 21/00*     (2006.01)
    *G02B 27/10*     (2006.01)
    *G02B 27/12*     (2006.01)

(52) U.S. Cl.
    CPC .......... *G02B 27/126* (2013.01); *G03B 21/008* (2013.01); *G03B 21/2033* (2013.01); *H04N 9/3105* (2013.01); *H04N 9/3108* (2013.01)

(56) References Cited

U.S. PATENT DOCUMENTS

| | | | | |
|---|---|---|---|---|
| 6,288,844 B1* | 9/2001 | Edlinger | ............... | G02B 5/285 |
| | | | | 348/E9.027 |
| 6,404,552 B1* | 6/2002 | Manabe | ............... | G02B 27/126 |
| | | | | 359/292 |
| 6,507,326 B2* | 1/2003 | Manabe | ............... | G02B 27/145 |
| | | | | 345/32 |
| 7,165,846 B2* | 1/2007 | Sannohe | ............. | G02B 5/0833 |
| | | | | 348/E9.027 |
| 7,230,768 B2* | 6/2007 | Pinho | ................ | G02B 5/285 |
| | | | | 348/E5.137 |
| 7,362,506 B2* | 4/2008 | Pinho | ................ | G02B 5/285 |
| | | | | 348/336 |
| 7,508,591 B2* | 3/2009 | Pinho | ................ | G02B 5/285 |
| | | | | 353/33 |
| 7,518,803 B2* | 4/2009 | Sawai | ................ | G02B 5/285 |
| | | | | 353/81 |
| 7,839,571 B2* | 11/2010 | Saita | ................ | G02B 5/04 |
| | | | | 345/32 |
| 7,887,192 B2* | 2/2011 | Chen | ................. | G02B 27/102 |
| | | | | 353/33 |
| 8,040,611 B2* | 10/2011 | Saita | ............... | G02B 27/1013 |
| | | | | 348/338 |
| 8,469,516 B2* | 6/2013 | Ikeda | ................ | H04N 9/3114 |
| | | | | 353/20 |
| 9,500,937 B2* | 11/2016 | Tanaka | ............. | G03B 21/204 |
| 9,651,790 B2* | 5/2017 | Takahara | ........... | G02B 27/126 |
| 2002/0008770 A1* | 1/2002 | Ho | .................... | G02B 27/1013 |
| | | | | 348/336 |
| 2002/0135706 A1* | 9/2002 | Sawamura | ........... | G02B 5/285 |
| | | | | 349/5 |
| 2002/0141070 A1* | 10/2002 | Sawai | ............... | G02B 26/0841 |
| | | | | 359/634 |
| 2003/0071976 A1* | 4/2003 | Okuyama | ........... | G03B 21/006 |
| | | | | 353/31 |
| 2005/0225730 A1* | 10/2005 | Sannohe | ............. | G02B 5/0833 |
| | | | | 353/31 |
| 2007/0019299 A1* | 1/2007 | Sawai | ................. | G02B 5/285 |
| | | | | 359/640 |
| 2008/0239501 A1* | 10/2008 | Saita | ................. | G02B 5/04 |
| | | | | 359/634 |
| 2009/0086324 A1* | 4/2009 | Saita | ................. | G02B 27/1013 |
| | | | | 359/589 |
| 2010/0328614 A1* | 12/2010 | Ikeda | ................ | G03B 21/2073 |
| | | | | 353/20 |
| 2013/0271673 A1 | 10/2013 | Katou | | |
| 2014/0293232 A1* | 10/2014 | Tanaka | ............... | G03B 21/204 |
| | | | | 353/20 |
| 2015/0160462 A1* | 6/2015 | Takahara | ........... | G02B 27/126 |
| | | | | 359/634 |
| 2016/0277717 A1* | 9/2016 | Terada | ................ | H04N 9/3105 |
| 2016/0309126 A1* | 10/2016 | Takahara | ......... | G02B 27/1026 |

FOREIGN PATENT DOCUMENTS

| | | |
|---|---|---|
| JP | 2012-237832 A | 12/2012 |
| JP | 2014-126755 A | 7/2014 |
| WO | 2012/086011 A1 | 6/2012 |

\* cited by examiner

FIG.12

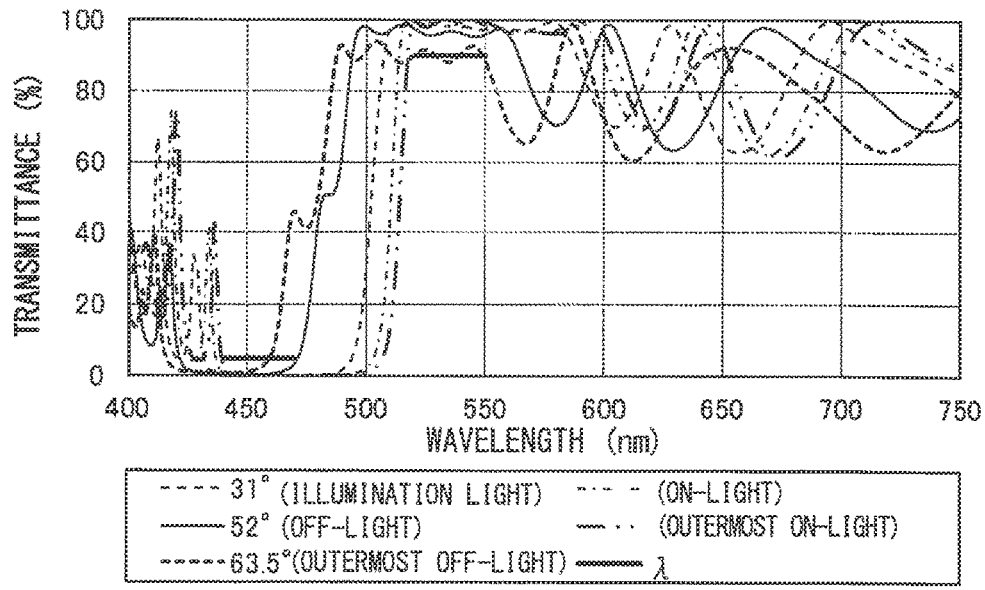

FIG.13

RED DF COMPARISON EXAMPLE 1
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Al_2O_3$ | 69.97 | 1.63 | 0.207 $\lambda_0$ |
| 2 | $Nb_2O_5$ | 88.29 | 2.38 | 0.382 $\lambda_0$ |
| 3 | $Al_2O_3$ | 110.79 | 1.63 | 0.327 $\lambda_0$ |
| 4 | $Nb_2O_5$ | 82.33 | 2.38 | 0.356 $\lambda_0$ |
| 5 | $Al_2O_3$ | 94.98 | 1.63 | 0.281 $\lambda_0$ |
| 6 | $Nb_2O_5$ | 85.42 | 2.38 | 0.369 $\lambda_0$ |
| 7 | $Al_2O_3$ | 87.00 | 1.63 | 0.257 $\lambda_0$ |
| 8 | $Nb_2O_5$ | 83.07 | 2.38 | 0.359 $\lambda_0$ |
| 9 | $Al_2O_3$ | 97.73 | 1.63 | 0.289 $\lambda_0$ |
| 10 | $Nb_2O_5$ | 73.98 | 2.38 | 0.32 $\lambda_0$ |
| 11 | $Al_2O_3$ | 111.52 | 1.63 | 0.329 $\lambda_0$ |
| 12 | $Nb_2O_5$ | 66.05 | 2.38 | 0.285 $\lambda_0$ |
| 13 | $Al_2O_3$ | 115.28 | 1.63 | 0.341 $\lambda_0$ |
| 14 | $Nb_2O_5$ | 68.45 | 2.38 | 0.296 $\lambda_0$ |
| 15 | $Al_2O_3$ | 106.58 | 1.63 | 0.315 $\lambda_0$ |
| 16 | $Nb_2O_5$ | 76.08 | 2.38 | 0.329 $\lambda_0$ |
| 17 | $Al_2O_3$ | 96.61 | 1.63 | 0.285 $\lambda_0$ |
| 18 | $Nb_2O_5$ | 78.85 | 2.38 | 0.341 $\lambda_0$ |
| 19 | $Al_2O_3$ | 99.35 | 1.63 | 0.294 $\lambda_0$ |
| 20 | $Nb_2O_5$ | 74.82 | 2.38 | 0.323 $\lambda_0$ |
| 21 | $Al_2O_3$ | 109.87 | 1.63 | 0.325 $\lambda_0$ |
| 22 | $Nb_2O_5$ | 69.38 | 2.38 | 0.3 $\lambda_0$ |
| 23 | $Al_2O_3$ | 117.76 | 1.63 | 0.348 $\lambda_0$ |
| 24 | $Nb_2O_5$ | 68.55 | 2.38 | 0.296 $\lambda_0$ |
| 25 | $Al_2O_3$ | 121.70 | 1.63 | 0.36 $\lambda_0$ |
| 26 | $Nb_2O_5$ | 71.93 | 2.38 | 0.311 $\lambda_0$ |
| 27 | $SiO_2$ | 72.24 | 1.47 | 0.193 $\lambda_0$ |
| | AIR | | 1.00 | |

FIG.14

RED OF PRACTICAL EXAMPLE 1-1 (2-1) (DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.9}Al_{1.1}O_3$ | 72.09 | 1.85 | 0.242 $\lambda_0$ |
| 2 | $TiO_2$ | 104.11 | 2.47 | 0.467 $\lambda_0$ |
| 3 | $La_{0.9}Al_{1.1}O_3$ | 138.22 | 1.85 | 0.464 $\lambda_0$ |
| 4 | $TiO_2$ | 110.61 | 2.47 | 0.496 $\lambda_0$ |
| 5 | $La_{0.9}Al_{1.1}O_3$ | 17.90 | 1.85 | 0.06 $\lambda_0$ |
| 6 | $TiO_2$ | 200.44 | 2.47 | 0.899 $\lambda_0$ |
| 7 | $La_{0.9}Al_{1.1}O_3$ | 112.35 | 1.85 | 0.377 $\lambda_0$ |
| 8 | $TiO_2$ | 75.53 | 2.47 | 0.339 $\lambda_0$ |
| 9 | $La_{0.9}Al_{1.1}O_3$ | 91.48 | 1.85 | 0.307 $\lambda_0$ |
| 10 | $TiO_2$ | 78.86 | 2.47 | 0.354 $\lambda_0$ |
| 11 | $La_{0.9}Al_{1.1}O_3$ | 88.58 | 1.85 | 0.297 $\lambda_0$ |
| 12 | $TiO_2$ | 76.28 | 2.47 | 0.342 $\lambda_0$ |
| 13 | $La_{0.9}Al_{1.1}O_3$ | 89.53 | 1.85 | 0.3 $\lambda_0$ |
| 14 | $TiO_2$ | 73.41 | 2.47 | 0.329 $\lambda_0$ |
| 15 | $La_{0.9}Al_{1.1}O_3$ | 92.54 | 1.85 | 0.31 $\lambda_0$ |
| 16 | $TiO_2$ | 72.89 | 2.47 | 0.327 $\lambda_0$ |
| 17 | $La_{0.9}Al_{1.1}O_3$ | 92.77 | 1.85 | 0.311 $\lambda_0$ |
| 18 | $TiO_2$ | 74.19 | 2.47 | 0.333 $\lambda_0$ |
| 19 | $La_{0.9}Al_{1.1}O_3$ | 86.75 | 1.85 | 0.291 $\lambda_0$ |
| 20 | $TiO_2$ | 76.41 | 2.47 | 0.343 $\lambda_0$ |
| 21 | $La_{0.9}Al_{1.1}O_3$ | 89.20 | 1.85 | 0.299 $\lambda_0$ |
| 22 | $TiO_2$ | 73.60 | 2.47 | 0.33 $\lambda_0$ |
| 23 | $La_{0.9}Al_{1.1}O_3$ | 94.32 | 1.85 | 0.316 $\lambda_0$ |
| 24 | $TiO_2$ | 72.22 | 2.47 | 0.324 $\lambda_0$ |
| 25 | $La_{0.9}Al_{1.1}O_3$ | 89.33 | 1.85 | 0.3 $\lambda_0$ |
| 26 | $Ta_2O_5$ | 74.26 | 2.47 | 0.333 $\lambda_0$ |
| 27 | $La_{0.9}Al_{1.1}O_3$ | 91.24 | 1.85 | 0.306 $\lambda_0$ |
| 28 | $TiO_2$ | 72.54 | 2.47 | 0.325 $\lambda_0$ |
| 29 | $La_{0.9}Al_{1.1}O_3$ | 94.11 | 1.85 | 0.316 $\lambda_0$ |
| 30 | $TiO_2$ | 75.27 | 2.47 | 0.338 $\lambda_0$ |
| 31 | $La_{0.9}Al_{1.1}O_3$ | 86.19 | 1.85 | 0.289 $\lambda_0$ |
| 32 | $TiO_2$ | 76.88 | 2.47 | 0.345 $\lambda_0$ |
| 33 | $La_{0.9}Al_{1.1}O_3$ | 93.85 | 1.85 | 0.315 $\lambda_0$ |
| 34 | $TiO_2$ | 69.52 | 2.47 | 0.312 $\lambda_0$ |
| 35 | $La_{0.9}Al_{1.1}O_3$ | 98.33 | 1.85 | 0.33 $\lambda_0$ |
| 36 | $TiO_2$ | 76.67 | 2.47 | 0.344 $\lambda_0$ |
| 37 | $La_{0.9}Al_{1.1}O_3$ | 82.15 | 1.85 | 0.276 $\lambda_0$ |
| 38 | $TiO_2$ | 100.68 | 2.47 | 0.452 $\lambda_0$ |
| 39 | $La_{0.9}Al_{1.1}O_3$ | 44.63 | 1.85 | 0.15 $\lambda_0$ |
| 40 | $TiO_2$ | 212.22 | 2.47 | 0.952 $\lambda_0$ |
| 41 | $La_{0.9}Al_{1.1}O_3$ | 38.26 | 1.85 | 0.128 $\lambda_0$ |
| 42 | $TiO_2$ | 127.23 | 2.47 | 0.571 $\lambda_0$ |
| 43 | $La_{0.9}Al_{1.1}O_3$ | 21.73 | 1.85 | 0.073 $\lambda_0$ |
| 44 | $TiO_2$ | 307.86 | 2.47 | 1.381 $\lambda_0$ |
| 45 | $La_{0.9}Al_{1.1}O_3$ | 100.62 | 1.85 | 0.338 $\lambda_0$ |
| 46 | $TiO_2$ | 82.93 | 2.47 | 0.372 $\lambda_0$ |
| 47 | $La_{0.9}Al_{1.1}O_3$ | 86.62 | 1.85 | 0.291 $\lambda_0$ |
| 48 | $TiO_2$ | 100.93 | 2.47 | 0.453 $\lambda_0$ |
| 49 | $La_{0.9}Al_{1.1}O_3$ | 27.14 | 1.85 | 0.091 $\lambda_0$ |
| 50 | $TiO_2$ | 83.91 | 2.47 | 0.376 $\lambda_0$ |
| 51 | $SiO_2$ | 87.15 | 1.47 | 0.233 $\lambda_0$ |
| | AIR | | 1.00 | |

FIG.15

RED DF PRACTICAL EXAMPLE 1-2 (2-5)
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 103.05 | 2.38 | 0.445 $\lambda_0$ |
| 2 | $La_{0.5}Al_{1.5}O_3$ | 78.95 | 1.74 | 0.243 $\lambda_0$ |
| 3 | $Nb_2O_5$ | 114.89 | 2.38 | 0.497 $\lambda_0$ |
| 4 | $La_{0.5}Al_{1.5}O_3$ | 43.96 | 1.74 | 0.139 $\lambda_0$ |
| 5 | $Nb_2O_5$ | 218.57 | 2.38 | 0.945 $\lambda_0$ |
| 6 | $La_{0.5}Al_{1.5}O_3$ | 50.88 | 1.74 | 0.161 $\lambda_0$ |
| 7 | $Nb_2O_5$ | 119.84 | 2.38 | 0.518 $\lambda_0$ |
| 8 | $La_{0.5}Al_{1.5}O_3$ | 49.66 | 1.74 | 0.157 $\lambda_0$ |
| 9 | $Nb_2O_5$ | 116.86 | 2.38 | 0.505 $\lambda_0$ |
| 10 | $La_{0.5}Al_{1.5}O_3$ | 160.66 | 1.74 | 0.507 $\lambda_0$ |
| 11 | $Nb_2O_5$ | 88.17 | 2.38 | 0.381 $\lambda_0$ |
| 12 | $La_{0.5}Al_{1.5}O_3$ | 107.39 | 1.74 | 0.339 $\lambda_0$ |
| 13 | $Nb_2O_5$ | 90.35 | 2.38 | 0.39 $\lambda_0$ |
| 14 | $La_{0.5}Al_{1.5}O_3$ | 61.89 | 1.74 | 0.195 $\lambda_0$ |
| 15 | $Nb_2O_5$ | 101.38 | 2.38 | 0.438 $\lambda_0$ |
| 16 | $La_{0.5}Al_{1.5}O_3$ | 61.91 | 1.74 | 0.196 $\lambda_0$ |
| 17 | $Nb_2O_5$ | 86.02 | 2.38 | 0.372 $\lambda_0$ |
| 18 | $La_{0.5}Al_{1.5}O_3$ | 103.69 | 1.74 | 0.327 $\lambda_0$ |
| 19 | $Nb_2O_5$ | 72.28 | 2.38 | 0.312 $\lambda_0$ |
| 20 | $La_{0.5}Al_{1.5}O_3$ | 102.00 | 1.74 | 0.322 $\lambda_0$ |
| 21 | $Nb_2O_5$ | 79.28 | 2.38 | 0.343 $\lambda_0$ |
| 22 | $La_{0.5}Al_{1.5}O_3$ | 91.66 | 1.74 | 0.289 $\lambda_0$ |
| 23 | $Nb_2O_5$ | 84.46 | 2.38 | 0.365 $\lambda_0$ |
| 24 | $La_{0.5}Al_{1.5}O_3$ | 105.81 | 1.74 | 0.334 $\lambda_0$ |
| 25 | $Nb_2O_5$ | 184.38 | 2.38 | 0.797 $\lambda_0$ |
| 26 | $La_{0.5}Al_{1.5}O_3$ | 109.49 | 1.74 | 0.346 $\lambda_0$ |
| 27 | $Nb_2O_5$ | 83.85 | 2.38 | 0.362 $\lambda_0$ |
| 28 | $La_{0.5}Al_{1.5}O_3$ | 90.15 | 1.74 | 0.285 $\lambda_0$ |
| 29 | $Nb_2O_5$ | 83.78 | 2.38 | 0.362 $\lambda_0$ |
| 30 | $La_{0.5}Al_{1.5}O_3$ | 91.22 | 1.74 | 0.288 $\lambda_0$ |
| 31 | $Nb_2O_5$ | 94.78 | 2.38 | 0.41 $\lambda_0$ |
| 32 | $La_{0.5}Al_{1.5}O_3$ | 61.02 | 1.74 | 0.193 $\lambda_0$ |
| 33 | $Nb_2O_5$ | 104.39 | 2.38 | 0.451 $\lambda_0$ |
| 34 | $La_{0.5}Al_{1.5}O_3$ | 68.91 | 1.74 | 0.218 $\lambda_0$ |
| 35 | $Nb_2O_5$ | 97.96 | 2.38 | 0.423 $\lambda_0$ |
| 36 | $La_{0.5}Al_{1.5}O_3$ | 104.91 | 1.74 | 0.331 $\lambda_0$ |
| 37 | $Nb_2O_5$ | 90.26 | 2.38 | 0.39 $\lambda_0$ |
| 38 | $La_{0.5}Al_{1.5}O_3$ | 136.76 | 1.74 | 0.432 $\lambda_0$ |
| 39 | $Nb_2O_5$ | 23.90 | 2.38 | 0.103 $\lambda_0$ |
| 40 | $La_{0.5}Al_{1.5}O_3$ | 158.59 | 1.74 | 0.501 $\lambda_0$ |
| 41 | $Nb_2O_5$ | 66.87 | 2.38 | 0.289 $\lambda_0$ |
| 42 | $La_{0.5}Al_{1.5}O_3$ | 156.02 | 1.74 | 0.493 $\lambda_0$ |
| 43 | $Nb_2O_5$ | 34.82 | 2.38 | 0.15 $\lambda_0$ |
| 44 | $La_{0.5}Al_{1.5}O_3$ | 173.55 | 1.74 | 0.548 $\lambda_0$ |
| 45 | $Nb_2O_5$ | 119.15 | 2.38 | 0.515 $\lambda_0$ |
| 46 | $La_{0.5}Al_{1.5}O_3$ | 125.32 | 1.74 | 0.396 $\lambda_0$ |
| 47 | $Nb_2O_5$ | 101.93 | 2.38 | 0.441 $\lambda_0$ |
| 48 | $La_{0.5}Al_{1.5}O_3$ | 22.95 | 1.74 | 0.072 $\lambda_0$ |
| 49 | $Nb_2O_5$ | 90.34 | 2.38 | 0.39 $\lambda_0$ |
| 50 | $La_{0.5}Al_{1.5}O_3$ | 127.99 | 1.74 | 0.404 $\lambda_0$ |
| 51 | $Nb_2O_5$ | 64.47 | 2.38 | 0.279 $\lambda_0$ |
| 52 | $SiO_2$ | 85.57 | 1.47 | 0.229 $\lambda_0$ |
| | AIR | | 1.00 | |

FIG.16

RED DF OF PRACTICAL EXAMPLE 1-3 (2-8) (DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
|  | PRISM BASE |  | 1.52 |  |
| 1 | $Nb_2O_5$ | 110.80 | 2.38 | 0.479 $\lambda_0$ |
| 2 | $SiO_2$ | 52.79 | 1.47 | 0.141 $\lambda_0$ |
| 3 | $Nb_2O_5$ | 120.11 | 2.38 | 0.519 $\lambda_0$ |
| 4 | $SiO_2$ | 64.83 | 1.47 | 0.173 $\lambda_0$ |
| 5 | $Nb_2O_5$ | 101.44 | 2.38 | 0.438 $\lambda_0$ |
| 6 | $SiO_2$ | 141.78 | 1.47 | 0.379 $\lambda_0$ |
| 7 | $Nb_2O_5$ | 105.28 | 2.38 | 0.455 $\lambda_0$ |
| 8 | $SiO_2$ | 221.15 | 1.47 | 0.591 $\lambda_0$ |
| 9 | $Nb_2O_5$ | 123.80 | 2.38 | 0.535 $\lambda_0$ |
| 10 | $SiO_2$ | 27.96 | 1.47 | 0.075 $\lambda_0$ |
| 11 | $Nb_2O_5$ | 236.01 | 2.38 | 1.02 $\lambda_0$ |
| 12 | $SiO_2$ | 34.49 | 1.47 | 0.092 $\lambda_0$ |
| 13 | $Nb_2O_5$ | 120.11 | 2.38 | 0.519 $\lambda_0$ |
| 14 | $SiO_2$ | 219.35 | 1.47 | 0.586 $\lambda_0$ |
| 15 | $Nb_2O_5$ | 119.80 | 2.38 | 0.518 $\lambda_0$ |
| 16 | $SiO_2$ | 52.72 | 1.47 | 0.141 $\lambda_0$ |
| 17 | $Nb_2O_5$ | 115.45 | 2.38 | 0.499 $\lambda_0$ |
| 18 | $SiO_2$ | 80.63 | 1.47 | 0.216 $\lambda_0$ |
| 19 | $Nb_2O_5$ | 117.56 | 2.38 | 0.508 $\lambda_0$ |
| 20 | $SiO_2$ | 39.32 | 1.47 | 0.105 $\lambda_0$ |
| 21 | $Nb_2O_5$ | 227.42 | 2.38 | 0.983 $\lambda_0$ |
| 22 | $SiO_2$ | 45.37 | 1.47 | 0.121 $\lambda_0$ |
| 23 | $Nb_2O_5$ | 109.07 | 2.38 | 0.471 $\lambda_0$ |
| 24 | $SiO_2$ | 102.17 | 1.47 | 0.273 $\lambda_0$ |
| 25 | $Nb_2O_5$ | 102.67 | 2.38 | 0.444 $\lambda_0$ |
| 26 | $SiO_2$ | 78.79 | 1.47 | 0.211 $\lambda_0$ |
| 27 | $Nb_2O_5$ | 114.54 | 2.38 | 0.495 $\lambda_0$ |
| 28 | $SiO_2$ | 51.44 | 1.47 | 0.137 $\lambda_0$ |
| 29 | $Nb_2O_5$ | 223.37 | 2.38 | 0.965 $\lambda_0$ |
| 30 | $SiO_2$ | 48.85 | 1.47 | 0.131 $\lambda_0$ |
| 31 | $Nb_2O_5$ | 116.32 | 2.38 | 0.503 $\lambda_0$ |
| 32 | $SiO_2$ | 87.65 | 1.47 | 0.234 $\lambda_0$ |
| 33 | $Nb_2O_5$ | 97.86 | 2.38 | 0.423 $\lambda_0$ |
| 34 | $SiO_2$ | 129.01 | 1.47 | 0.345 $\lambda_0$ |
| 35 | $Nb_2O_5$ | 109.83 | 2.38 | 0.475 $\lambda_0$ |
| 36 | $SiO_2$ | 50.45 | 1.47 | 0.135 $\lambda_0$ |
| 37 | $Nb_2O_5$ | 102.92 | 2.38 | 0.445 $\lambda_0$ |
| 38 | $SiO_2$ | 152.62 | 1.47 | 0.408 $\lambda_0$ |
| 39 | $Nb_2O_5$ | 104.88 | 2.38 | 0.453 $\lambda_0$ |
| 40 | $SiO_2$ | 30.28 | 1.47 | 0.081 $\lambda_0$ |
| 41 | $Nb_2O_5$ | 104.15 | 2.38 | 0.45 $\lambda_0$ |
| 42 | $SiO_2$ | 148.34 | 1.47 | 0.396 $\lambda_0$ |
| 43 | $Nb_2O_5$ | 95.04 | 2.38 | 0.411 $\lambda_0$ |
| 44 | $SiO_2$ | 54.73 | 1.47 | 0.146 $\lambda_0$ |
| 45 | $Nb_2O_5$ | 115.66 | 2.38 | 0.5 $\lambda_0$ |
| 46 | $SiO_2$ | 47.39 | 1.47 | 0.127 $\lambda_0$ |
| 47 | $Nb_2O_5$ | 103.57 | 2.38 | 0.448 $\lambda_0$ |
| 48 | $SiO_2$ | 126.34 | 1.47 | 0.338 $\lambda_0$ |
| 49 | $Nb_2O_5$ | 83.31 | 2.38 | 0.36 $\lambda_0$ |
| 50 | $SiO_2$ | 160.02 | 1.47 | 0.428 $\lambda_0$ |
| 51 | $Nb_2O_5$ | 97.34 | 2.38 | 0.421 $\lambda_0$ |
| 52 | $SiO_2$ | 183.71 | 1.47 | 0.491 $\lambda_0$ |
| 53 | $Nb_2O_5$ | 107.65 | 2.38 | 0.465 $\lambda_0$ |
| 54 | $SiO_2$ | 201.37 | 1.47 | 0.538 $\lambda_0$ |
| 55 | $Nb_2O_5$ | 117.13 | 2.38 | 0.506 $\lambda_0$ |
| 56 | $SiO_2$ | 103.43 | 1.47 | 0.276 $\lambda_0$ |
|  | AIR |  | 1.00 |  |

FIG.17

BLUE DF COMPARISON EXAMPLE 1
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| PRISM BASE | | | 1.52 | |
| 1 | $TiO_2$ | 23.91 | 2.47 | 0.107 $\lambda_0$ |
| 2 | $La_{0.5}Al_{1.5}O_3$ | 65.92 | 1.74 | 0.208 $\lambda_0$ |
| 3 | $TiO_2$ | 45.22 | 2.47 | 0.203 $\lambda_0$ |
| 4 | $La_{0.5}Al_{1.5}O_3$ | 68.44 | 1.74 | 0.216 $\lambda_0$ |
| 5 | $TiO_2$ | 41.87 | 2.47 | 0.188 $\lambda_0$ |
| 6 | $La_{0.5}Al_{1.5}O_3$ | 67.99 | 1.74 | 0.215 $\lambda_0$ |
| 7 | $TiO_2$ | 43.74 | 2.47 | 0.196 $\lambda_0$ |
| 8 | $La_{0.5}Al_{1.5}O_3$ | 70.60 | 1.74 | 0.223 $\lambda_0$ |
| 9 | $TiO_2$ | 44.07 | 2.47 | 0.198 $\lambda_0$ |
| 10 | $La_{0.5}Al_{1.5}O_3$ | 69.92 | 1.74 | 0.221 $\lambda_0$ |
| 11 | $TiO_2$ | 43.67 | 2.47 | 0.196 $\lambda_0$ |
| 12 | $La_{0.5}Al_{1.5}O_3$ | 70.30 | 1.74 | 0.222 $\lambda_0$ |
| 13 | $TiO_2$ | 44.25 | 2.47 | 0.198 $\lambda_0$ |
| 14 | $La_{0.5}Al_{1.5}O_3$ | 70.75 | 1.74 | 0.223 $\lambda_0$ |
| 15 | $TiO_2$ | 44.08 | 2.47 | 0.198 $\lambda_0$ |
| 16 | $La_{0.5}Al_{1.5}O_3$ | 70.22 | 1.74 | 0.222 $\lambda_0$ |
| 17 | $TiO_2$ | 43.95 | 2.47 | 0.197 $\lambda_0$ |
| 18 | $La_{0.5}Al_{1.5}O_3$ | 70.57 | 1.74 | 0.223 $\lambda_0$ |
| 19 | $TiO_2$ | 44.28 | 2.47 | 0.199 $\lambda_0$ |
| 20 | $La_{0.5}Al_{1.5}O_3$ | 70.54 | 1.74 | 0.223 $\lambda_0$ |
| 21 | $TiO_2$ | 43.83 | 2.47 | 0.197 $\lambda_0$ |
| 22 | $La_{0.5}Al_{1.5}O_3$ | 69.77 | 1.74 | 0.22 $\lambda_0$ |
| 23 | $TiO_2$ | 43.74 | 2.47 | 0.196 $\lambda_0$ |
| 24 | $La_{0.5}Al_{1.5}O_3$ | 70.29 | 1.74 | 0.222 $\lambda_0$ |
| 25 | $TiO_2$ | 44.05 | 2.47 | 0.198 $\lambda_0$ |
| 26 | $La_{0.5}Al_{1.5}O_3$ | 69.13 | 1.74 | 0.218 $\lambda_0$ |
| 27 | $TiO_2$ | 42.32 | 2.47 | 0.19 $\lambda_0$ |
| 28 | $La_{0.5}Al_{1.5}O_3$ | 65.76 | 1.74 | 0.208 $\lambda_0$ |
| 29 | $TiO_2$ | 41.03 | 2.47 | 0.184 $\lambda_0$ |
| 30 | $SiO_2$ | 140.10 | 1.47 | 0.374 $\lambda_0$ |
| AIR | | | 1.00 | |

FIG.18

BLUE OF PRACTICAL EXAMPLE 1-1
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 32.10 | 2.38 | 0.139 $\lambda_0$ |
| 2 | $La_{0.5}Al_{1.5}O_3$ | 54.01 | 1.74 | 0.171 $\lambda_0$ |
| 3 | $Nb_2O_5$ | 45.86 | 2.38 | 0.198 $\lambda_0$ |
| 4 | $La_{0.5}Al_{1.5}O_3$ | 69.68 | 1.74 | 0.22 $\lambda_0$ |
| 5 | $Nb_2O_5$ | 45.01 | 2.38 | 0.195 $\lambda_0$ |
| 6 | $La_{0.5}Al_{1.5}O_3$ | 71.30 | 1.74 | 0.225 $\lambda_0$ |
| 7 | $Nb_2O_5$ | 46.36 | 2.38 | 0.2 $\lambda_0$ |
| 8 | $La_{0.5}Al_{1.5}O_3$ | 64.24 | 1.74 | 0.203 $\lambda_0$ |
| 9 | $Nb_2O_5$ | 47.28 | 2.38 | 0.204 $\lambda_0$ |
| 10 | $La_{0.5}Al_{1.5}O_3$ | 63.95 | 1.74 | 0.202 $\lambda_0$ |
| 11 | $Nb_2O_5$ | 49.60 | 2.38 | 0.214 $\lambda_0$ |
| 12 | $La_{0.5}Al_{1.5}O_3$ | 66.28 | 1.74 | 0.209 $\lambda_0$ |
| 13 | $Nb_2O_5$ | 51.01 | 2.38 | 0.22 $\lambda_0$ |
| 14 | $La_{0.5}Al_{1.5}O_3$ | 67.11 | 1.74 | 0.212 $\lambda_0$ |
| 15 | $Nb_2O_5$ | 48.55 | 2.38 | 0.21 $\lambda_0$ |
| 16 | $La_{0.5}Al_{1.5}O_3$ | 67.79 | 1.74 | 0.214 $\lambda_0$ |
| 17 | $Nb_2O_5$ | 42.87 | 2.38 | 0.185 $\lambda_0$ |
| 18 | $La_{0.5}Al_{1.5}O_3$ | 73.78 | 1.74 | 0.233 $\lambda_0$ |
| 19 | $Nb_2O_5$ | 37.91 | 2.38 | 0.164 $\lambda_0$ |
| 20 | $La_{0.5}Al_{1.5}O_3$ | 78.72 | 1.74 | 0.249 $\lambda_0$ |
| 21 | $Nb_2O_5$ | 46.70 | 2.38 | 0.202 $\lambda_0$ |
| 22 | $La_{0.5}Al_{1.5}O_3$ | 72.41 | 1.74 | 0.229 $\lambda_0$ |
| 23 | $Nb_2O_5$ | 152.36 | 2.38 | 0.658 $\lambda_0$ |
| 24 | $La_{0.5}Al_{1.5}O_3$ | 67.90 | 1.74 | 0.214 $\lambda_0$ |
| 25 | $Nb_2O_5$ | 64.07 | 2.38 | 0.277 $\lambda_0$ |
| 26 | $La_{0.5}Al_{1.5}O_3$ | 27.67 | 1.74 | 0.087 $\lambda_0$ |
| 27 | $Nb_2O_5$ | 283.11 | 2.38 | 1.224 $\lambda_0$ |
| 28 | $La_{0.5}Al_{1.5}O_3$ | 72.65 | 1.74 | 0.229 $\lambda_0$ |
| 29 | $Nb_2O_5$ | 49.83 | 2.38 | 0.215 $\lambda_0$ |
| 30 | $La_{0.5}Al_{1.5}O_3$ | 132.00 | 1.74 | 0.417 $\lambda_0$ |
| 31 | $Nb_2O_5$ | 84.49 | 2.38 | 0.365 $\lambda_0$ |
| 32 | $La_{0.5}Al_{1.5}O_3$ | 126.09 | 1.74 | 0.398 $\lambda_0$ |
| 33 | $Nb_2O_5$ | 50.85 | 2.38 | 0.22 $\lambda_0$ |
| 34 | $La_{0.5}Al_{1.5}O_3$ | 69.03 | 1.74 | 0.218 $\lambda_0$ |
| 35 | $Nb_2O_5$ | 365.87 | 2.38 | 1.581 $\lambda_0$ |
| 36 | $La_{0.5}Al_{1.5}O_3$ | 95.61 | 1.74 | 0.302 $\lambda_0$ |
| 37 | $Nb_2O_5$ | 144.55 | 2.38 | 0.625 $\lambda_0$ |
| 38 | $La_{0.5}Al_{1.5}O_3$ | 53.20 | 1.74 | 0.168 $\lambda_0$ |
| 39 | $Nb_2O_5$ | 256.74 | 2.38 | 1.11 $\lambda_0$ |
| 40 | $La_{0.5}Al_{1.5}O_3$ | 96.93 | 1.74 | 0.306 $\lambda_0$ |
| 41 | $Nb_2O_5$ | 366.76 | 2.38 | 1.585 $\lambda_0$ |
| 42 | $La_{0.5}Al_{1.5}O_3$ | 18.36 | 1.74 | 0.058 $\lambda_0$ |
| 43 | $Nb_2O_5$ | 99.30 | 2.38 | 0.429 $\lambda_0$ |
| 44 | $SiO_2$ | 102.75 | 1.47 | 0.275 $\lambda_0$ |
| | AIR | | 1.00 | |

FIG.19

BLUE DF PRACTICAL EXAMPLE 1-2
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 135.70 | 2.38 | 0.586 $\lambda_0$ |
| 2 | $Al_2O_3$ | 52.34 | 1.63 | 0.155 $\lambda_0$ |
| 3 | $Nb_2O_5$ | 51.90 | 2.38 | 0.224 $\lambda_0$ |
| 4 | $Al_2O_3$ | 65.62 | 1.63 | 0.194 $\lambda_0$ |
| 5 | $Nb_2O_5$ | 142.06 | 2.38 | 0.614 $\lambda_0$ |
| 6 | $Al_2O_3$ | 44.15 | 1.63 | 0.13 $\lambda_0$ |
| 7 | $Nb_2O_5$ | 211.20 | 2.38 | 0.913 $\lambda_0$ |
| 8 | $Al_2O_3$ | 71.45 | 1.63 | 0.211 $\lambda_0$ |
| 9 | $Nb_2O_5$ | 153.52 | 2.38 | 0.663 $\lambda_0$ |
| 10 | $Al_2O_3$ | 49.69 | 1.63 | 0.147 $\lambda_0$ |
| 11 | $Nb_2O_5$ | 49.54 | 2.38 | 0.214 $\lambda_0$ |
| 12 | $Al_2O_3$ | 61.29 | 1.63 | 0.181 $\lambda_0$ |
| 13 | $Nb_2O_5$ | 53.72 | 2.38 | 0.232 $\lambda_0$ |
| 14 | $Al_2O_3$ | 78.99 | 1.63 | 0.233 $\lambda_0$ |
| 15 | $Nb_2O_5$ | 46.78 | 2.38 | 0.202 $\lambda_0$ |
| 16 | $Al_2O_3$ | 94.55 | 1.63 | 0.279 $\lambda_0$ |
| 17 | $Nb_2O_5$ | 13.13 | 2.38 | 0.057 $\lambda_0$ |
| 18 | $Al_2O_3$ | 93.02 | 1.63 | 0.275 $\lambda_0$ |
| 19 | $Nb_2O_5$ | 47.14 | 2.38 | 0.204 $\lambda_0$ |
| 20 | $Al_2O_3$ | 76.87 | 1.63 | 0.227 $\lambda_0$ |
| 21 | $Nb_2O_5$ | 56.67 | 2.38 | 0.245 $\lambda_0$ |
| 22 | $Al_2O_3$ | 67.49 | 1.63 | 0.199 $\lambda_0$ |
| 23 | $Nb_2O_5$ | 149.15 | 2.38 | 0.645 $\lambda_0$ |
| 24 | $Al_2O_3$ | 59.39 | 1.63 | 0.175 $\lambda_0$ |
| 25 | $Nb_2O_5$ | 63.43 | 2.38 | 0.274 $\lambda_0$ |
| 26 | $Al_2O_3$ | 65.96 | 1.63 | 0.195 $\lambda_0$ |
| 27 | $Nb_2O_5$ | 149.14 | 2.38 | 0.645 $\lambda_0$ |
| 28 | $Al_2O_3$ | 73.14 | 1.63 | 0.216 $\lambda_0$ |
| 29 | $Nb_2O_5$ | 78.54 | 2.38 | 0.339 $\lambda_0$ |
| 30 | $Al_2O_3$ | 7.54 | 1.63 | 0.022 $\lambda_0$ |
| 31 | $Nb_2O_5$ | 174.52 | 2.38 | 0.754 $\lambda_0$ |
| 32 | $Al_2O_3$ | 83.34 | 1.63 | 0.246 $\lambda_0$ |
| 33 | $Nb_2O_5$ | 280.12 | 2.38 | 1.211 $\lambda_0$ |
| 34 | $Al_2O_3$ | 9.05 | 1.63 | 0.027 $\lambda_0$ |
| 35 | $Nb_2O_5$ | 191.11 | 2.38 | 0.826 $\lambda_0$ |
| 36 | $Al_2O_3$ | 96.00 | 1.63 | 0.284 $\lambda_0$ |
| 37 | $Nb_2O_5$ | 249.13 | 2.38 | 1.077 $\lambda_0$ |
| 38 | $Al_2O_3$ | 54.56 | 1.63 | 0.161 $\lambda_0$ |
| 39 | $Nb_2O_5$ | 82.84 | 2.38 | 0.358 $\lambda_0$ |
| 40 | $Al_2O_3$ | 22.70 | 1.63 | 0.067 $\lambda_0$ |
| 41 | $Nb_2O_5$ | 264.82 | 2.38 | 1.145 $\lambda_0$ |
| 42 | $Al_2O_3$ | 108.50 | 1.63 | 0.321 $\lambda_0$ |
| 43 | $Nb_2O_5$ | 136.62 | 2.38 | 0.59 $\lambda_0$ |
| 44 | $SiO_2$ | 127.26 | 1.47 | 0.34 $\lambda_0$ |
| | AIR | | 1.00 | |

FIG.20

BLUE DF COMPARISON EXAMPLE 2
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $TiO_2$ | 31.04 | 2.47 | $0.139 \lambda_0$ |
| 2 | $La_{0.5}Al_{1.5}O_3$ | 47.20 | 1.74 | $0.149 \lambda_0$ |
| 3 | $TiO_2$ | 49.55 | 2.47 | $0.222 \lambda_0$ |
| 4 | $La_{0.5}Al_{1.5}O_3$ | 66.90 | 1.74 | $0.211 \lambda_0$ |
| 5 | $TiO_2$ | 43.96 | 2.47 | $0.197 \lambda_0$ |
| 6 | $La_{0.5}Al_{1.5}O_3$ | 55.51 | 1.74 | $0.175 \lambda_0$ |
| 7 | $TiO_2$ | 44.90 | 2.47 | $0.201 \lambda_0$ |
| 8 | $La_{0.5}Al_{1.5}O_3$ | 65.94 | 1.74 | $0.208 \lambda_0$ |
| 9 | $TiO_2$ | 47.16 | 2.47 | $0.212 \lambda_0$ |
| 10 | $La_{0.5}Al_{1.5}O_3$ | 61.58 | 1.74 | $0.194 \lambda_0$ |
| 11 | $TiO_2$ | 43.45 | 2.47 | $0.195 \lambda_0$ |
| 12 | $La_{0.5}Al_{1.5}O_3$ | 62.23 | 1.74 | $0.197 \lambda_0$ |
| 13 | $TiO_2$ | 46.98 | 2.47 | $0.211 \lambda_0$ |
| 14 | $La_{0.5}Al_{1.5}O_3$ | 65.09 | 1.74 | $0.206 \lambda_0$ |
| 15 | $TiO_2$ | 45.20 | 2.47 | $0.203 \lambda_0$ |
| 16 | $La_{0.5}Al_{1.5}O_3$ | 60.47 | 1.74 | $0.191 \lambda_0$ |
| 17 | $TiO_2$ | 45.13 | 2.47 | $0.202 \lambda_0$ |
| 18 | $La_{0.5}Al_{1.5}O_3$ | 64.67 | 1.74 | $0.204 \lambda_0$ |
| 19 | $TiO_2$ | 46.69 | 2.47 | $0.209 \lambda_0$ |
| 20 | $La_{0.5}Al_{1.5}O_3$ | 62.47 | 1.74 | $0.197 \lambda_0$ |
| 21 | $TiO_2$ | 44.18 | 2.47 | $0.198 \lambda_0$ |
| 22 | $La_{0.5}Al_{1.5}O_3$ | 61.86 | 1.74 | $0.195 \lambda_0$ |
| 23 | $TiO_2$ | 46.32 | 2.47 | $0.208 \lambda_0$ |
| 24 | $La_{0.5}Al_{1.5}O_3$ | 63.72 | 1.74 | $0.201 \lambda_0$ |
| 25 | $TiO_2$ | 44.82 | 2.47 | $0.201 \lambda_0$ |
| 26 | $La_{0.5}Al_{1.5}O_3$ | 59.84 | 1.74 | $0.189 \lambda_0$ |
| 27 | $TiO_2$ | 45.33 | 2.47 | $0.203 \lambda_0$ |
| 28 | $La_{0.5}Al_{1.5}O_3$ | 60.14 | 1.74 | $0.19 \lambda_0$ |
| 29 | $TiO_2$ | 38.56 | 2.47 | $0.173 \lambda_0$ |
| 30 | $SiO_2$ | 135.88 | 1.47 | $0.363 \lambda_0$ |
| | AIR | | 1.00 | |

FIG.21

BLUE DF PRACTICAL EXAMPLE 1-3
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | TiO$_2$ | 42.20 | 2.47 | 0.189 $\lambda_0$ |
| 2 | Al$_2$O$_3$ | 34.94 | 1.63 | 0.103 $\lambda_0$ |
| 3 | TiO$_2$ | 64.47 | 2.47 | 0.289 $\lambda_0$ |
| 4 | Al$_2$O$_3$ | 34.94 | 1.63 | 0.103 $\lambda_0$ |
| 5 | TiO$_2$ | 70.23 | 2.47 | 0.315 $\lambda_0$ |
| 6 | Al$_2$O$_3$ | 34.94 | 1.63 | 0.103 $\lambda_0$ |
| 7 | TiO$_2$ | 71.08 | 2.47 | 0.319 $\lambda_0$ |
| 8 | Al$_2$O$_3$ | 47.55 | 1.63 | 0.14 $\lambda_0$ |
| 9 | TiO$_2$ | 160.16 | 2.47 | 0.718 $\lambda_0$ |
| 10 | Al$_2$O$_3$ | 46.89 | 1.63 | 0.139 $\lambda_0$ |
| 11 | TiO$_2$ | 72.94 | 2.47 | 0.327 $\lambda_0$ |
| 12 | Al$_2$O$_3$ | 34.94 | 1.63 | 0.103 $\lambda_0$ |
| 13 | TiO$_2$ | 69.43 | 2.47 | 0.311 $\lambda_0$ |
| 14 | Al$_2$O$_3$ | 34.94 | 1.63 | 0.103 $\lambda_0$ |
| 15 | TiO$_2$ | 69.07 | 2.47 | 0.31 $\lambda_0$ |
| 16 | Al$_2$O$_3$ | 34.94 | 1.63 | 0.103 $\lambda_0$ |
| 17 | TiO$_2$ | 72.59 | 2.47 | 0.326 $\lambda_0$ |
| 18 | Al$_2$O$_3$ | 34.94 | 1.63 | 0.103 $\lambda_0$ |
| 19 | TiO$_2$ | 70.73 | 2.47 | 0.317 $\lambda_0$ |
| 20 | Al$_2$O$_3$ | 34.94 | 1.63 | 0.103 $\lambda_0$ |
| 21 | TiO$_2$ | 71.35 | 2.47 | 0.32 $\lambda_0$ |
| 22 | Al$_2$O$_3$ | 34.94 | 1.63 | 0.103 $\lambda_0$ |
| 23 | TiO$_2$ | 73.34 | 2.47 | 0.329 $\lambda_0$ |
| 24 | Al$_2$O$_3$ | 34.94 | 1.63 | 0.103 $\lambda_0$ |
| 25 | TiO$_2$ | 59.77 | 2.47 | 0.268 $\lambda_0$ |
| 26 | Al$_2$O$_3$ | 34.94 | 1.63 | 0.103 $\lambda_0$ |
| 27 | TiO$_2$ | 159.18 | 2.47 | 0.714 $\lambda_0$ |
| 28 | Al$_2$O$_3$ | 145.04 | 1.63 | 0.429 $\lambda_0$ |
| 29 | TiO$_2$ | 230.23 | 2.47 | 1.033 $\lambda_0$ |
| 30 | SiO$_2$ | 125.70 | 1.47 | 0.336 $\lambda_0$ |
| | AIR | | 1.00 | |

FIG.22

RED DF PRACTICAL EXAMPLE 2-2
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.5}Al_{1.5}O_3$ | 74.36 | 1.74 | 0.235 $\lambda_0$ |
| 2 | $TiO_2$ | 92.02 | 2.47 | 0.413 $\lambda_0$ |
| 3 | $La_{0.5}Al_{1.5}O_3$ | 126.07 | 1.74 | 0.398 $\lambda_0$ |
| 4 | $TiO_2$ | 102.72 | 2.47 | 0.461 $\lambda_0$ |
| 5 | $La_{0.5}Al_{1.5}O_3$ | 29.36 | 1.74 | 0.093 $\lambda_0$ |
| 6 | $TiO_2$ | 200.06 | 2.47 | 0.897 $\lambda_0$ |
| 7 | $La_{0.5}Al_{1.5}O_3$ | 114.58 | 1.74 | 0.362 $\lambda_0$ |
| 8 | $TiO_2$ | 85.43 | 2.47 | 0.383 $\lambda_0$ |
| 9 | $La_{0.5}Al_{1.5}O_3$ | 75.41 | 1.74 | 0.238 $\lambda_0$ |
| 10 | $TiO_2$ | 85.85 | 2.47 | 0.385 $\lambda_0$ |
| 11 | $La_{0.5}Al_{1.5}O_3$ | 96.84 | 1.74 | 0.306 $\lambda_0$ |
| 12 | $TiO_2$ | 73.84 | 2.47 | 0.331 $\lambda_0$ |
| 13 | $La_{0.5}Al_{1.5}O_3$ | 104.19 | 1.74 | 0.329 $\lambda_0$ |
| 14 | $TiO_2$ | 74.56 | 2.47 | 0.334 $\lambda_0$ |
| 15 | $La_{0.5}Al_{1.5}O_3$ | 90.42 | 1.74 | 0.286 $\lambda_0$ |
| 16 | $TiO_2$ | 84.79 | 2.47 | 0.38 $\lambda_0$ |
| 17 | $La_{0.5}Al_{1.5}O_3$ | 81.02 | 1.74 | 0.256 $\lambda_0$ |
| 18 | $TiO_2$ | 82.62 | 2.47 | 0.371 $\lambda_0$ |
| 19 | $La_{0.5}Al_{1.5}O_3$ | 90.83 | 1.74 | 0.287 $\lambda_0$ |
| 20 | $TiO_2$ | 79.35 | 2.47 | 0.356 $\lambda_0$ |
| 21 | $La_{0.5}Al_{1.5}O_3$ | 88.63 | 1.74 | 0.28 $\lambda_0$ |
| 22 | $TiO_2$ | 80.95 | 2.47 | 0.363 $\lambda_0$ |
| 23 | $La_{0.5}Al_{1.5}O_3$ | 95.43 | 1.74 | 0.301 $\lambda_0$ |
| 24 | $TiO_2$ | 75.41 | 2.47 | 0.338 $\lambda_0$ |
| 25 | $La_{0.5}Al_{1.5}O_3$ | 102.53 | 1.74 | 0.324 $\lambda_0$ |
| 26 | $TiO_2$ | 73.49 | 2.47 | 0.33 $\lambda_0$ |
| 27 | $La_{0.5}Al_{1.5}O_3$ | 96.29 | 1.74 | 0.304 $\lambda_0$ |
| 28 | $TiO_2$ | 83.54 | 2.47 | 0.375 $\lambda_0$ |
| 29 | $La_{0.5}Al_{1.5}O_3$ | 84.07 | 1.74 | 0.266 $\lambda_0$ |
| 30 | $TiO_2$ | 91.80 | 2.47 | 0.412 $\lambda_0$ |
| 31 | $La_{0.5}Al_{1.5}O_3$ | 50.25 | 1.74 | 0.159 $\lambda_0$ |
| 32 | $TiO_2$ | 91.73 | 2.47 | 0.411 $\lambda_0$ |
| 33 | $La_{0.5}Al_{1.5}O_3$ | 83.69 | 1.74 | 0.264 $\lambda_0$ |
| 34 | $TiO_2$ | 101.82 | 2.47 | 0.457 $\lambda_0$ |
| 35 | $La_{0.5}Al_{1.5}O_3$ | 45.69 | 1.74 | 0.144 $\lambda_0$ |
| 36 | $TiO_2$ | 211.36 | 2.47 | 0.948 $\lambda_0$ |
| 37 | $La_{0.5}Al_{1.5}O_3$ | 37.53 | 1.74 | 0.119 $\lambda_0$ |
| 38 | $TiO_2$ | 127.98 | 2.47 | 0.574 $\lambda_0$ |
| 39 | $La_{0.5}Al_{1.5}O_3$ | 21.95 | 1.74 | 0.069 $\lambda_0$ |
| 40 | $TiO_2$ | 305.73 | 2.47 | 1.371 $\lambda_0$ |
| 41 | $La_{0.5}Al_{1.5}O_3$ | 112.53 | 1.74 | 0.355 $\lambda_0$ |
| 42 | $TiO_2$ | 79.72 | 2.47 | 0.358 $\lambda_0$ |
| 43 | $La_{0.5}Al_{1.5}O_3$ | 104.58 | 1.74 | 0.33 $\lambda_0$ |
| 44 | $TiO_2$ | 100.11 | 2.47 | 0.449 $\lambda_0$ |
| 45 | $La_{0.5}Al_{1.5}O_3$ | 24.04 | 1.74 | 0.076 $\lambda_0$ |
| 46 | $TiO_2$ | 84.42 | 2.47 | 0.379 $\lambda_0$ |
| 47 | $SiO_2$ | 86.57 | 1.47 | 0.231 $\lambda_0$ |
| | AIR | | 1.00 | |

FIG.23

RED DF PRACTICAL EXAMPLE 2-3
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Al_2O_3$ | 85.67 | 1.63 | 0.253 $\lambda_0$ |
| 2 | $TiO_2$ | 89.77 | 2.47 | 0.403 $\lambda_0$ |
| 3 | $Al_2O_3$ | 129.66 | 1.63 | 0.383 $\lambda_0$ |
| 4 | $TiO_2$ | 104.15 | 2.47 | 0.467 $\lambda_0$ |
| 5 | $Al_2O_3$ | 37.80 | 1.63 | 0.112 $\lambda_0$ |
| 6 | $TiO_2$ | 108.33 | 2.47 | 0.486 $\lambda_0$ |
| 7 | $Al_2O_3$ | 159.63 | 1.63 | 0.472 $\lambda_0$ |
| 8 | $TiO_2$ | 88.59 | 2.47 | 0.397 $\lambda_0$ |
| 9 | $Al_2O_3$ | 152.57 | 1.63 | 0.451 $\lambda_0$ |
| 10 | $TiO_2$ | 179.12 | 2.47 | 0.803 $\lambda_0$ |
| 11 | $Al_2O_3$ | 138.17 | 1.63 | 0.408 $\lambda_0$ |
| 12 | $TiO_2$ | 99.17 | 2.47 | 0.445 $\lambda_0$ |
| 13 | $Al_2O_3$ | 34.90 | 1.63 | 0.103 $\lambda_0$ |
| 14 | $TiO_2$ | 113.28 | 2.47 | 0.508 $\lambda_0$ |
| 15 | $Al_2O_3$ | 26.24 | 1.63 | 0.078 $\lambda_0$ |
| 16 | $TiO_2$ | 96.53 | 2.47 | 0.433 $\lambda_0$ |
| 17 | $Al_2O_3$ | 136.78 | 1.63 | 0.404 $\lambda_0$ |
| 18 | $TiO_2$ | 76.70 | 2.47 | 0.344 $\lambda_0$ |
| 19 | $Al_2O_3$ | 138.59 | 1.63 | 0.409 $\lambda_0$ |
| 20 | $TiO_2$ | 91.90 | 2.47 | 0.412 $\lambda_0$ |
| 21 | $Al_2O_3$ | 27.82 | 1.63 | 0.082 $\lambda_0$ |
| 22 | $TiO_2$ | 113.11 | 2.47 | 0.507 $\lambda_0$ |
| 23 | $Al_2O_3$ | 47.42 | 1.63 | 0.14 $\lambda_0$ |
| 24 | $TiO_2$ | 107.83 | 2.47 | 0.484 $\lambda_0$ |
| 25 | $Al_2O_3$ | 54.64 | 1.63 | 0.161 $\lambda_0$ |
| 26 | $TiO_2$ | 104.08 | 2.47 | 0.467 $\lambda_0$ |
| 27 | $Al_2O_3$ | 50.52 | 1.63 | 0.149 $\lambda_0$ |
| 28 | $TiO_2$ | 104.28 | 2.47 | 0.468 $\lambda_0$ |
| 29 | $Al_2O_3$ | 58.18 | 1.63 | 0.172 $\lambda_0$ |
| 30 | $TiO_2$ | 97.00 | 2.47 | 0.435 $\lambda_0$ |
| 31 | $Al_2O_3$ | 64.51 | 1.63 | 0.25 $\lambda_0$ |
| 32 | $TiO_2$ | 95.12 | 2.47 | 0.427 $\lambda_0$ |
| 33 | $Al_2O_3$ | 61.47 | 1.63 | 0.182 $\lambda_0$ |
| 34 | $TiO_2$ | 101.13 | 2.47 | 0.454 $\lambda_0$ |
| 35 | $Al_2O_3$ | 64.04 | 1.63 | 0.189 $\lambda_0$ |
| 36 | $TiO_2$ | 102.60 | 2.47 | 0.46 $\lambda_0$ |
| 37 | $Al_2O_3$ | 48.40 | 1.63 | 0.143 $\lambda_0$ |
| 38 | $TiO_2$ | 104.65 | 2.47 | 0.469 $\lambda_0$ |
| 39 | $Al_2O_3$ | 42.80 | 1.63 | 0.126 $\lambda_0$ |
| 40 | $TiO_2$ | 116.45 | 2.47 | 0.522 $\lambda_0$ |
| 41 | $Al_2O_3$ | 35.07 | 1.63 | 0.104 $\lambda_0$ |
| 42 | $TiO_2$ | 216.40 | 2.47 | 0.971 $\lambda_0$ |
| 43 | $Al_2O_3$ | 32.99 | 1.63 | 0.097 $\lambda_0$ |
| 44 | $TiO_2$ | 130.80 | 2.47 | 0.587 $\lambda_0$ |
| 45 | $Al_2O_3$ | 19.23 | 1.63 | 0.057 $\lambda_0$ |
| 46 | $TiO_2$ | 308.95 | 2.47 | 1.386 $\lambda_0$ |
| 47 | $Al_2O_3$ | 128.87 | 1.63 | 0.381 $\lambda_0$ |
| 48 | $TiO_2$ | 77.42 | 2.47 | 0.347 $\lambda_0$ |
| 49 | $Al_2O_3$ | 120.39 | 1.63 | 0.356 $\lambda_0$ |
| 50 | $TiO_2$ | 97.07 | 2.47 | 0.435 $\lambda_0$ |
| 51 | $Al_2O_3$ | 30.09 | 1.63 | 0.089 $\lambda_0$ |
| 52 | $TiO_2$ | 87.44 | 2.47 | 0.392 $\lambda_0$ |
| 53 | $SiO_2$ | 80.43 | 1.47 | 0.215 $\lambda_0$ |
| | AIR | | 1.00 | |

FIG.24

RED OF PRACTICAL EXAMPLE 2-4 (DESIGN PRINCIPAL WAVELENGTH $\lambda_0$ = 550 nm)

| LAYER NO | MATERIAL | PHYSICAL THICKNESS (nm) | REFRACTIVE INDEX | OPTICAL THICKNESS |
|---|---|---|---|---|
|  | PRISM BASE |  | 1.52 |  |
| 1 | $Nb_2O_5$ | 101.76 | 2.38 | 0.44 $\lambda_0$ |
| 2 | $La_2Al_2O_3$ | 68.57 | 1.85 | 0.23 $\lambda_0$ |
| 3 | $Nb_2O_5$ | 83.72 | 2.38 | 0.362 $\lambda_0$ |
| 4 | $La_2Al_2O_3$ | 118.09 | 1.85 | 0.399 $\lambda_0$ |
| 5 | $Nb_2O_5$ | 50.52 | 2.38 | 0.218 $\lambda_0$ |
| 6 | $La_2Al_2O_3$ | 109.30 | 1.85 | 0.367 $\lambda_0$ |
| 7 | $Nb_2O_5$ | 83.06 | 2.38 | 0.359 $\lambda_0$ |
| 8 | $La_2Al_2O_3$ | 68.81 | 1.85 | 0.231 $\lambda_0$ |
| 9 | $Nb_2O_5$ | 110.47 | 2.38 | 0.477 $\lambda_0$ |
| 10 | $La_2Al_2O_3$ | 47.26 | 1.85 | 0.159 $\lambda_0$ |
| 11 | $Nb_2O_5$ | 97.31 | 2.38 | 0.421 $\lambda_0$ |
| 12 | $La_2Al_2O_3$ | 125.84 | 1.85 | 0.422 $\lambda_0$ |
| 13 | $Nb_2O_5$ | 203.72 | 2.38 | 0.88 $\lambda_0$ |
| 14 | $La_2Al_2O_3$ | 105.47 | 1.85 | 0.354 $\lambda_0$ |
| 15 | $Nb_2O_5$ | 88.26 | 2.38 | 0.381 $\lambda_0$ |
| 16 | $La_2Al_2O_3$ | 73.47 | 1.85 | 0.246 $\lambda_0$ |
| 17 | $Nb_2O_5$ | 84.50 | 2.38 | 0.365 $\lambda_0$ |
| 18 | $La_2Al_2O_3$ | 99.19 | 1.85 | 0.333 $\lambda_0$ |
| 19 | $Nb_2O_5$ | 62.30 | 2.38 | 0.289 $\lambda_0$ |
| 20 | $La_2Al_2O_3$ | 112.81 | 1.85 | 0.378 $\lambda_0$ |
| 21 | $Nb_2O_5$ | 58.36 | 2.38 | 0.257 $\lambda_0$ |
| 22 | $La_2Al_2O_3$ | 100.67 | 1.85 | 0.338 $\lambda_0$ |
| 23 | $Nb_2O_5$ | 81.70 | 2.38 | 0.353 $\lambda_0$ |
| 24 | $La_2Al_2O_3$ | 74.28 | 1.85 | 0.249 $\lambda_0$ |
| 25 | $Nb_2O_5$ | 81.96 | 2.38 | 0.354 $\lambda_0$ |
| 26 | $La_2Al_2O_3$ | 97.27 | 1.85 | 0.328 $\lambda_0$ |
| 27 | $Nb_2O_5$ | 61.36 | 2.38 | 0.265 $\lambda_0$ |
| 28 | $La_2Al_2O_3$ | 107.89 | 1.85 | 0.362 $\lambda_0$ |
| 29 | $Nb_2O_5$ | 75.61 | 2.38 | 0.327 $\lambda_0$ |
| 30 | $La_2Al_2O_3$ | 78.24 | 1.85 | 0.262 $\lambda_0$ |
| 31 | $Nb_2O_5$ | 85.12 | 2.38 | 0.366 $\lambda_0$ |
| 32 | $La_2Al_2O_3$ | 110.03 | 1.85 | 0.389 $\lambda_0$ |
| 33 | $Nb_2O_5$ | 37.02 | 2.38 | 0.16 $\lambda_0$ |
| 34 | $La_2Al_2O_3$ | 133.88 | 1.85 | 0.449 $\lambda_0$ |
| 35 | $Nb_2O_5$ | 69.14 | 2.38 | 0.299 $\lambda_0$ |
| 36 | $La_2Al_2O_3$ | 260.46 | 1.85 | 0.874 $\lambda_0$ |
| 37 | $Nb_2O_5$ | 75.60 | 2.38 | 0.327 $\lambda_0$ |
| 38 | $La_2Al_2O_3$ | 109.98 | 1.85 | 0.369 $\lambda_0$ |
| 39 | $Nb_2O_5$ | 101.39 | 2.38 | 0.438 $\lambda_0$ |
| 40 | $La_2Al_2O_3$ | 24.99 | 1.85 | 0.084 $\lambda_0$ |
| 41 | $Nb_2O_5$ | 241.91 | 2.38 | 1.045 $\lambda_0$ |
| 42 | $La_2Al_2O_3$ | 25.86 | 1.85 | 0.087 $\lambda_0$ |
| 43 | $Nb_2O_5$ | 42.69 | 2.38 | 0.184 $\lambda_0$ |
| 44 | $La_2Al_2O_3$ | 173.39 | 1.85 | 0.582 $\lambda_0$ |
| 45 | $Nb_2O_5$ | 20.07 | 2.38 | 0.087 $\lambda_0$ |
| 46 | $La_2Al_2O_3$ | 99.55 | 1.85 | 0.334 $\lambda_0$ |
| 47 | $Nb_2O_5$ | 103.01 | 2.38 | 0.445 $\lambda_0$ |
| 48 | $La_2Al_2O_3$ | 53.01 | 1.85 | 0.178 $\lambda_0$ |
| 49 | $Nb_2O_5$ | 93.64 | 2.38 | 0.405 $\lambda_0$ |
| 50 | $La_2Al_2O_3$ | 268.11 | 1.85 | 0.899 $\lambda_0$ |
| 51 | $Nb_2O_5$ | 54.71 | 2.38 | 0.236 $\lambda_0$ |
| 52 | $La_2Al_2O_3$ | 16.67 | 1.85 | 0.056 $\lambda_0$ |
| 53 | $Nb_2O_5$ | 139.67 | 2.38 | 0.604 $\lambda_0$ |
| 54 | $La_2Al_2O_3$ | 59.45 | 1.85 | 0.199 $\lambda_0$ |
| 55 | $Nb_2O_5$ | 24.42 | 2.38 | 0.106 $\lambda_0$ |
| 56 | $La_2Al_2O_3$ | 189.66 | 1.85 | 0.638 $\lambda_0$ |
| 57 | $Nb_2O_5$ | 25.46 | 2.38 | 0.11 $\lambda_0$ |
| 58 | $La_2Al_2O_3$ | 84.98 | 1.85 | 0.285 $\lambda_0$ |
| 59 | $Nb_2O_5$ | 112.55 | 2.38 | 0.486 $\lambda_0$ |
| 60 | $La_2Al_2O_3$ | 57.14 | 1.85 | 0.192 $\lambda_0$ |
| 61 | $Nb_2O_5$ | 30.92 | 2.38 | 0.134 $\lambda_0$ |
| 62 | $La_2Al_2O_3$ | 139.64 | 1.85 | 0.468 $\lambda_0$ |
| 63 | $Nb_2O_5$ | 87.06 | 2.38 | 0.376 $\lambda_0$ |
| 64 | $La_2Al_2O_3$ | 63.77 | 1.85 | 0.214 $\lambda_0$ |
| 65 | $Nb_2O_5$ | 112.61 | 2.38 | 0.487 $\lambda_0$ |
| 66 | $La_2Al_2O_3$ | 179.61 | 1.85 | 0.603 $\lambda_0$ |
| 67 | $Nb_2O_5$ | 57.26 | 2.38 | 0.248 $\lambda_0$ |
| 68 | $La_2Al_2O_3$ | 9.82 | 1.85 | 0.033 $\lambda_0$ |
| 69 | $Nb_2O_5$ | 146.33 | 2.38 | 0.632 $\lambda_0$ |
| 70 | $La_2Al_2O_3$ | 58.98 | 1.85 | 0.191 $\lambda_0$ |
| 71 | $Nb_2O_5$ | 102.00 | 2.38 | 0.441 $\lambda_0$ |
| 72 | $La_2Al_2O_3$ | 78.58 | 1.85 | 0.264 $\lambda_0$ |
| 73 | $Nb_2O_5$ | 70.73 | 2.38 | 0.306 $\lambda_0$ |
| 74 | $La_2Al_2O_3$ | 119.17 | 1.85 | 0.4 $\lambda_0$ |
| 75 | $Nb_2O_5$ | 196.50 | 2.38 | 0.48 $\lambda_0$ |
| 76 | $La_2Al_2O_3$ | 7.36 | 1.85 | 0.025 $\lambda_0$ |
| 77 | $Nb_2O_5$ | 310.38 | 2.38 | 1.341 $\lambda_0$ |
| 78 | $SiO_2$ | 96.12 | 1.47 | 0.257 $\lambda_0$ |
|  | AIR |  | 1.00 |  |

FIG.25

RED DF PRACTICAL EXAMPLE 2-6
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 105.62 | 2.38 | 0.456 $\lambda_0$ |
| 2 | $Al_2O_3$ | 68.08 | 1.63 | 0.201 $\lambda_0$ |
| 3 | $Nb_2O_5$ | 108.51 | 2.38 | 0.469 $\lambda_0$ |
| 4 | $Al_2O_3$ | 73.99 | 1.63 | 0.219 $\lambda_0$ |
| 5 | $Nb_2O_5$ | 92.84 | 2.38 | 0.401 $\lambda_0$ |
| 6 | $Al_2O_3$ | 126.36 | 1.63 | 0.373 $\lambda_0$ |
| 7 | $Nb_2O_5$ | 221.10 | 2.38 | 0.956 $\lambda_0$ |
| 8 | $Al_2O_3$ | 16.52 | 1.63 | 0.049 $\lambda_0$ |
| 9 | $Nb_2O_5$ | 342.36 | 2.38 | 1.48 $\lambda_0$ |
| 10 | $Al_2O_3$ | 31.69 | 1.63 | 0.094 $\lambda_0$ |
| 11 | $Nb_2O_5$ | 120.87 | 2.38 | 0.522 $\lambda_0$ |
| 12 | $Al_2O_3$ | 60.24 | 1.63 | 0.178 $\lambda_0$ |
| 13 | $Nb_2O_5$ | 104.11 | 2.38 | 0.45 $\lambda_0$ |
| 14 | $Al_2O_3$ | 83.90 | 1.63 | 0.248 $\lambda_0$ |
| 15 | $Nb_2O_5$ | 102.45 | 2.38 | 0.443 $\lambda_0$ |
| 16 | $Al_2O_3$ | 56.25 | 1.63 | 0.166 $\lambda_0$ |
| 17 | $Nb_2O_5$ | 113.61 | 2.38 | 0.491 $\lambda_0$ |
| 18 | $Al_2O_3$ | 49.04 | 1.63 | 0.145 $\lambda_0$ |
| 19 | $Nb_2O_5$ | 103.42 | 2.38 | 0.447 $\lambda_0$ |
| 20 | $Al_2O_3$ | 143.17 | 1.63 | 0.423 $\lambda_0$ |
| 21 | $Nb_2O_5$ | 99.30 | 2.38 | 0.429 $\lambda_0$ |
| 22 | $Al_2O_3$ | 124.47 | 1.63 | 0.368 $\lambda_0$ |
| 23 | $Nb_2O_5$ | 93.27 | 2.38 | 0.403 $\lambda_0$ |
| 24 | $Al_2O_3$ | 87.20 | 1.63 | 0.258 $\lambda_0$ |
| 25 | $Nb_2O_5$ | 101.41 | 2.38 | 0.438 $\lambda_0$ |
| 26 | $Al_2O_3$ | 62.45 | 1.63 | 0.185 $\lambda_0$ |
| 27 | $Nb_2O_5$ | 97.42 | 2.38 | 0.421 $\lambda_0$ |
| 28 | $Al_2O_3$ | 88.41 | 1.63 | 0.261 $\lambda_0$ |
| 29 | $Nb_2O_5$ | 96.09 | 2.38 | 0.415 $\lambda_0$ |
| 30 | $Al_2O_3$ | 67.79 | 1.63 | 0.2 $\lambda_0$ |
| 31 | $Nb_2O_5$ | 102.47 | 2.38 | 0.443 $\lambda_0$ |
| 32 | $Al_2O_3$ | 63.01 | 1.63 | 0.186 $\lambda_0$ |
| 33 | $Nb_2O_5$ | 98.48 | 2.38 | 0.426 $\lambda_0$ |
| 34 | $Al_2O_3$ | 76.14 | 1.63 | 0.225 $\lambda_0$ |
| 35 | $Nb_2O_5$ | 98.36 | 2.38 | 0.425 $\lambda_0$ |
| 36 | $Al_2O_3$ | 75.15 | 1.63 | 0.222 $\lambda_0$ |
| 37 | $Nb_2O_5$ | 105.17 | 2.38 | 0.455 $\lambda_0$ |
| 38 | $Al_2O_3$ | 47.60 | 1.63 | 0.141 $\lambda_0$ |
| 39 | $Nb_2O_5$ | 96.01 | 2.38 | 0.415 $\lambda_0$ |
| 40 | $Al_2O_3$ | 103.75 | 1.63 | 0.307 $\lambda_0$ |
| 41 | $Nb_2O_5$ | 93.83 | 2.38 | 0.406 $\lambda_0$ |
| 42 | $Al_2O_3$ | 76.73 | 1.63 | 0.227 $\lambda_0$ |
| 43 | $Nb_2O_5$ | 99.28 | 2.38 | 0.429 $\lambda_0$ |
| 44 | $Al_2O_3$ | 100.22 | 1.63 | 0.296 $\lambda_0$ |
| 45 | $Nb_2O_5$ | 115.05 | 2.38 | 0.497 $\lambda_0$ |
| 46 | $Al_2O_3$ | 29.16 | 1.63 | 0.086 $\lambda_0$ |
| 47 | $Nb_2O_5$ | 331.01 | 2.38 | 1.431 $\lambda_0$ |
| 48 | $Al_2O_3$ | 143.96 | 1.63 | 0.425 $\lambda_0$ |
| 49 | $Nb_2O_5$ | 74.51 | 2.38 | 0.322 $\lambda_0$ |
| 50 | $Al_2O_3$ | 147.67 | 1.63 | 0.436 $\lambda_0$ |
| 51 | $Nb_2O_5$ | 187.32 | 2.38 | 0.81 $\lambda_0$ |
| 52 | $Al_2O_3$ | 88.83 | 1.63 | 0.262 $\lambda_0$ |
| 53 | $Nb_2O_5$ | 187.79 | 2.38 | 0.812 $\lambda_0$ |
| 54 | $SiO_2$ | 89.46 | 1.47 | 0.239 $\lambda_0$ |
| | AIR | | 1.00 | |

FIG.26

RED OF PRACTICAL EXAMPLE 2-7
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | TiO$_2$ | 105.42 | 2.47 | 0.473 $\lambda_0$ |
| 2 | SiO$_2$ | 53.57 | 1.47 | 0.143 $\lambda_0$ |
| 3 | TiO$_2$ | 112.74 | 2.47 | 0.506 $\lambda_0$ |
| 4 | SiO$_2$ | 61.72 | 1.47 | 0.165 $\lambda_0$ |
| 5 | TiO$_2$ | 96.30 | 2.47 | 0.432 $\lambda_0$ |
| 6 | SiO$_2$ | 127.20 | 1.47 | 0.34 $\lambda_0$ |
| 7 | TiO$_2$ | 85.57 | 2.47 | 0.384 $\lambda_0$ |
| 8 | SiO$_2$ | 131.91 | 1.47 | 0.353 $\lambda_0$ |
| 9 | TiO$_2$ | 81.45 | 2.47 | 0.365 $\lambda_0$ |
| 10 | SiO$_2$ | 138.12 | 1.47 | 0.369 $\lambda_0$ |
| 11 | TiO$_2$ | 80.58 | 2.47 | 0.361 $\lambda_0$ |
| 12 | SiO$_2$ | 138.98 | 1.47 | 0.371 $\lambda_0$ |
| 13 | TiO$_2$ | 82.73 | 2.47 | 0.371 $\lambda_0$ |
| 14 | SiO$_2$ | 138.01 | 1.47 | 0.369 $\lambda_0$ |
| 15 | TiO$_2$ | 98.30 | 2.47 | 0.441 $\lambda_0$ |
| 16 | SiO$_2$ | 48.73 | 1.47 | 0.13 $\lambda_0$ |
| 17 | TiO$_2$ | 115.54 | 2.47 | 0.518 $\lambda_0$ |
| 18 | SiO$_2$ | 52.91 | 1.47 | 0.141 $\lambda_0$ |
| 19 | TiO$_2$ | 102.48 | 2.47 | 0.46 $\lambda_0$ |
| 20 | SiO$_2$ | 135.87 | 1.47 | 0.363 $\lambda_0$ |
| 21 | TiO$_2$ | 91.00 | 2.47 | 0.408 $\lambda_0$ |
| 22 | SiO$_2$ | 129.29 | 1.47 | 0.346 $\lambda_0$ |
| 23 | TiO$_2$ | 90.66 | 2.47 | 0.407 $\lambda_0$ |
| 24 | SiO$_2$ | 108.65 | 1.47 | 0.29 $\lambda_0$ |
| 25 | TiO$_2$ | 98.21 | 2.47 | 0.441 $\lambda_0$ |
| 26 | SiO$_2$ | 73.22 | 1.47 | 0.196 $\lambda_0$ |
| 27 | TiO$_2$ | 101.64 | 2.47 | 0.456 $\lambda_0$ |
| 28 | SiO$_2$ | 83.80 | 1.47 | 0.224 $\lambda_0$ |
| 29 | TiO$_2$ | 100.82 | 2.47 | 0.452 $\lambda_0$ |
| 30 | SiO$_2$ | 65.75 | 1.47 | 0.176 $\lambda_0$ |
| 31 | TiO$_2$ | 105.92 | 2.47 | 0.475 $\lambda_0$ |
| 32 | SiO$_2$ | 55.02 | 1.47 | 0.147 $\lambda_0$ |
| 33 | TiO$_2$ | 105.06 | 2.47 | 0.471 $\lambda_0$ |
| 34 | SiO$_2$ | 66.50 | 1.47 | 0.178 $\lambda_0$ |
| 35 | TiO$_2$ | 102.10 | 2.47 | 0.458 $\lambda_0$ |
| 36 | SiO$_2$ | 77.00 | 1.47 | 0.206 $\lambda_0$ |
| 37 | TiO$_2$ | 107.12 | 2.47 | 0.48 $\lambda_0$ |
| 38 | SiO$_2$ | 65.59 | 1.47 | 0.175 $\lambda_0$ |
| 39 | TiO$_2$ | 115.92 | 2.47 | 0.52 $\lambda_0$ |
| 40 | SiO$_2$ | 33.92 | 1.47 | 0.091 $\lambda_0$ |
| 41 | TiO$_2$ | 329.41 | 2.47 | 1.478 $\lambda_0$ |
| 42 | SiO$_2$ | 27.15 | 1.47 | 0.073 $\lambda_0$ |
| 43 | TiO$_2$ | 113.21 | 2.47 | 0.508 $\lambda_0$ |
| 44 | SiO$_2$ | 98.15 | 1.47 | 0.262 $\lambda_0$ |
| 45 | TiO$_2$ | 105.82 | 2.47 | 0.475 $\lambda_0$ |
| 46 | SiO$_2$ | 52.47 | 1.47 | 0.14 $\lambda_0$ |
| 47 | TiO$_2$ | 117.81 | 2.47 | 0.528 $\lambda_0$ |
| 48 | SiO$_2$ | 25.80 | 1.47 | 0.069 $\lambda_0$ |
| 49 | TiO$_2$ | 91.93 | 2.47 | 0.412 $\lambda_0$ |
| 50 | SiO$_2$ | 188.60 | 1.47 | 0.504 $\lambda_0$ |
| 51 | TiO$_2$ | 111.17 | 2.47 | 0.499 $\lambda_0$ |
| 52 | SiO$_2$ | 177.80 | 1.47 | 0.475 $\lambda_0$ |
| 53 | TiO$_2$ | 79.33 | 2.47 | 0.356 $\lambda_0$ |
| 54 | SiO$_2$ | 158.16 | 1.47 | 0.423 $\lambda_0$ |
| 55 | TiO$_2$ | 75.44 | 2.47 | 0.338 $\lambda_0$ |
| 56 | SiO$_2$ | 72.42 | 1.47 | 0.194 $\lambda_0$ |
| | AIR | | 1.00 | |

FIG.27

RED DF COMPARISON EXAMPLE 2
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | Al₂O₃ | 73.92 | 1.63 | 0.218 $\lambda_0$ |
| 2 | TiO₂ | 87.57 | 2.47 | 0.393 $\lambda_0$ |
| 3 | Al₂O₃ | 134.43 | 1.63 | 0.397 $\lambda_0$ |
| 4 | TiO₂ | 104.51 | 2.47 | 0.469 $\lambda_0$ |
| 5 | Al₂O₃ | 30.11 | 1.63 | 0.089 $\lambda_0$ |
| 6 | TiO₂ | 194.57 | 2.47 | 0.873 $\lambda_0$ |
| 7 | Al₂O₃ | 138.33 | 1.63 | 0.409 $\lambda_0$ |
| 8 | TiO₂ | 97.15 | 2.47 | 0.436 $\lambda_0$ |
| 9 | Al₂O₃ | 29.89 | 1.63 | 0.088 $\lambda_0$ |
| 10 | TiO₂ | 109.91 | 2.47 | 0.493 $\lambda_0$ |
| 11 | Al₂O₃ | 12.98 | 1.63 | 0.038 $\lambda_0$ |
| 12 | TiO₂ | 93.36 | 2.47 | 0.419 $\lambda_0$ |
| 13 | Al₂O₃ | 144.26 | 1.63 | 0.426 $\lambda_0$ |
| 14 | TiO₂ | 83.88 | 2.47 | 0.376 $\lambda_0$ |
| 15 | Al₂O₃ | 165.87 | 1.63 | 0.49 $\lambda_0$ |
| 16 | TiO₂ | 108.95 | 2.47 | 0.489 $\lambda_0$ |
| 17 | Al₂O₃ | 31.44 | 1.63 | 0.093 $\lambda_0$ |
| 18 | TiO₂ | 99.82 | 2.47 | 0.448 $\lambda_0$ |
| 19 | Al₂O₃ | 125.11 | 1.63 | 0.37 $\lambda_0$ |
| 20 | TiO₂ | 87.83 | 2.47 | 0.394 $\lambda_0$ |
| 21 | Al₂O₃ | 54.05 | 1.63 | 0.16 $\lambda_0$ |
| 22 | TiO₂ | 98.63 | 2.47 | 0.442 $\lambda_0$ |
| 23 | Al₂O₃ | 88.91 | 1.63 | 0.263 $\lambda_0$ |
| 24 | TiO₂ | 92.16 | 2.47 | 0.413 $\lambda_0$ |
| 25 | Al₂O₃ | 85.45 | 1.63 | 0.252 $\lambda_0$ |
| 26 | TiO₂ | 82.16 | 2.47 | 0.369 $\lambda_0$ |
| 27 | Al₂O₃ | 112.97 | 1.63 | 0.334 $\lambda_0$ |
| 28 | TiO₂ | 78.47 | 2.47 | 0.352 $\lambda_0$ |
| 29 | Al₂O₃ | 109.07 | 1.63 | 0.322 $\lambda_0$ |
| 30 | TiO₂ | 87.15 | 2.47 | 0.391 $\lambda_0$ |
| 31 | Al₂O₃ | 78.28 | 1.63 | 0.231 $\lambda_0$ |
| 32 | TiO₂ | 107.76 | 2.47 | 0.483 $\lambda_0$ |
| 33 | Al₂O₃ | 44.41 | 1.63 | 0.131 $\lambda_0$ |
| 34 | TiO₂ | 211.66 | 2.47 | 0.949 $\lambda_0$ |
| 35 | Al₂O₃ | 61.03 | 1.63 | 0.18 $\lambda_0$ |
| 36 | TiO₂ | 97.95 | 2.47 | 0.439 $\lambda_0$ |
| 37 | Al₂O₃ | 100.12 | 1.63 | 0.296 $\lambda_0$ |
| 38 | TiO₂ | 104.22 | 2.47 | 0.467 $\lambda_0$ |
| 39 | Al₂O₃ | 34.14 | 1.63 | 0.101 $\lambda_0$ |
| 40 | TiO₂ | 86.05 | 2.47 | 0.386 $\lambda_0$ |
| 41 | SiO₂ | 85.28 | 1.47 | 0.228 $\lambda_0$ |
| | AIR | | 1.00 | |

FIG.28

RED OF COMPARISON EXAMPLE 3
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 102.96 | 2.38 | 0.445 $\lambda_0$ |
| 2 | $La_{0.5}Al_{1.5}O_3$ | 75.39 | 1.74 | 0.238 $\lambda_0$ |
| 3 | $Nb_2O_5$ | 116.44 | 2.38 | 0.503 $\lambda_0$ |
| 4 | $La_{0.5}Al_{1.5}O_3$ | 36.63 | 1.74 | 0.116 $\lambda_0$ |
| 5 | $Nb_2O_5$ | 199.72 | 2.38 | 0.863 $\lambda_0$ |
| 6 | $La_{0.5}Al_{1.5}O_3$ | 119.69 | 1.74 | 0.378 $\lambda_0$ |
| 7 | $Nb_2O_5$ | 97.72 | 2.38 | 0.422 $\lambda_0$ |
| 8 | $La_{0.5}Al_{1.5}O_3$ | 27.36 | 1.74 | 0.086 $\lambda_0$ |
| 9 | $Nb_2O_5$ | 109.46 | 2.38 | 0.473 $\lambda_0$ |
| 10 | $La_{0.5}Al_{1.5}O_3$ | 185.88 | 1.74 | 0.587 $\lambda_0$ |
| 11 | $Nb_2O_5$ | 108.19 | 2.38 | 0.468 $\lambda_0$ |
| 12 | $La_{0.5}Al_{1.5}O_3$ | 79.26 | 1.74 | 0.25 $\lambda_0$ |
| 13 | $Nb_2O_5$ | 100.10 | 2.38 | 0.433 $\lambda_0$ |
| 14 | $La_{0.5}Al_{1.5}O_3$ | 61.03 | 1.74 | 0.193 $\lambda_0$ |
| 15 | $Nb_2O_5$ | 87.98 | 2.38 | 0.38 $\lambda_0$ |
| 16 | $La_{0.5}Al_{1.5}O_3$ | 98.84 | 1.74 | 0.312 $\lambda_0$ |
| 17 | $Nb_2O_5$ | 82.32 | 2.38 | 0.356 $\lambda_0$ |
| 18 | $La_{0.5}Al_{1.5}O_3$ | 83.33 | 1.74 | 0.263 $\lambda_0$ |
| 19 | $Nb_2O_5$ | 95.35 | 2.38 | 0.412 $\lambda_0$ |
| 20 | $La_{0.5}Al_{1.5}O_3$ | 51.41 | 1.74 | 0.162 $\lambda_0$ |
| 21 | $Nb_2O_5$ | 100.42 | 2.38 | 0.434 $\lambda_0$ |
| 22 | $La_{0.5}Al_{1.5}O_3$ | 62.09 | 1.74 | 0.196 $\lambda_0$ |
| 23 | $Nb_2O_5$ | 93.17 | 2.38 | 0.403 $\lambda_0$ |
| 24 | $La_{0.5}Al_{1.5}O_3$ | 86.16 | 1.74 | 0.272 $\lambda_0$ |
| 25 | $Nb_2O_5$ | 77.88 | 2.38 | 0.337 $\lambda_0$ |
| 26 | $La_{0.5}Al_{1.5}O_3$ | 110.33 | 1.74 | 0.348 $\lambda_0$ |
| 27 | $Nb_2O_5$ | 72.40 | 2.38 | 0.313 $\lambda_0$ |
| 28 | $La_{0.5}Al_{1.5}O_3$ | 141.22 | 1.74 | 0.446 $\lambda_0$ |
| 29 | $Nb_2O_5$ | 18.82 | 2.38 | 0.081 $\lambda_0$ |
| 30 | $La_{0.5}Al_{1.5}O_3$ | 163.72 | 1.74 | 0.517 $\lambda_0$ |
| 31 | $Nb_2O_5$ | 26.77 | 2.38 | 0.116 $\lambda_0$ |
| 32 | $La_{0.5}Al_{1.5}O_3$ | 148.28 | 1.74 | 0.468 $\lambda_0$ |
| 33 | $Nb_2O_5$ | 82.83 | 2.38 | 0.358 $\lambda_0$ |
| 34 | $La_{0.5}Al_{1.5}O_3$ | 171.43 | 1.74 | 0.541 $\lambda_0$ |
| 35 | $Nb_2O_5$ | 21.11 | 2.38 | 0.091 $\lambda_0$ |
| 36 | $La_{0.5}Al_{1.5}O_3$ | 181.22 | 1.74 | 0.572 $\lambda_0$ |
| 37 | $Nb_2O_5$ | 205.36 | 2.38 | 0.888 $\lambda_0$ |
| 38 | $La_{0.5}Al_{1.5}O_3$ | 109.33 | 1.74 | 0.345 $\lambda_0$ |
| 39 | $Nb_2O_5$ | 77.89 | 2.38 | 0.337 $\lambda_0$ |
| 40 | $La_{0.5}Al_{1.5}O_3$ | 112.76 | 1.74 | 0.356 $\lambda_0$ |
| 41 | $Nb_2O_5$ | 67.35 | 2.38 | 0.291 $\lambda_0$ |
| 42 | $La_{0.5}Al_{1.5}O_3$ | 126.55 | 1.74 | 0.4 $\lambda_0$ |
| 43 | $Nb_2O_5$ | 61.32 | 2.38 | 0.265 $\lambda_0$ |
| 44 | $SiO_2$ | 87.33 | 1.47 | 0.233 $\lambda_0$ |
| | AIR | | 1.00 | |

FIG.29

RED DF COMPARISON EXAMPLE 4
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.9}Al_{1.1}O_3$ | 48.36 | 1.85 | 0.162 $\lambda_0$ |
| 2 | $Ta_2O_5$ | 81.48 | 2.21 | 0.328 $\lambda_0$ |
| 3 | $La_{0.9}Al_{1.1}O_3$ | 98.94 | 1.85 | 0.332 $\lambda_0$ |
| 4 | $Ta_2O_5$ | 91.22 | 2.21 | 0.367 $\lambda_0$ |
| 5 | $La_{0.9}Al_{1.1}O_3$ | 109.43 | 1.85 | 0.367 $\lambda_0$ |
| 6 | $Ta_2O_5$ | 212.30 | 2.21 | 0.854 $\lambda_0$ |
| 7 | $La_{0.9}Al_{1.1}O_3$ | 113.57 | 1.85 | 0.381 $\lambda_0$ |
| 8 | $Ta_2O_5$ | 89.17 | 2.21 | 0.359 $\lambda_0$ |
| 9 | $La_{0.9}Al_{1.1}O_3$ | 102.87 | 1.85 | 0.345 $\lambda_0$ |
| 10 | $Ta_2O_5$ | 89.08 | 2.21 | 0.359 $\lambda_0$ |
| 11 | $La_{0.9}Al_{1.1}O_3$ | 102.20 | 1.85 | 0.343 $\lambda_0$ |
| 12 | $Ta_2O_5$ | 82.09 | 2.21 | 0.33 $\lambda_0$ |
| 13 | $La_{0.9}Al_{1.1}O_3$ | 98.28 | 1.85 | 0.33 $\lambda_0$ |
| 14 | $Ta_2O_5$ | 78.93 | 2.21 | 0.318 $\lambda_0$ |
| 15 | $La_{0.9}Al_{1.1}O_3$ | 97.82 | 1.85 | 0.328 $\lambda_0$ |
| 16 | $Ta_2O_5$ | 80.87 | 2.21 | 0.325 $\lambda_0$ |
| 17 | $La_{0.9}Al_{1.1}O_3$ | 97.20 | 1.85 | 0.326 $\lambda_0$ |
| 18 | $Ta_2O_5$ | 82.18 | 2.21 | 0.331 $\lambda_0$ |
| 19 | $La_{0.9}Al_{1.1}O_3$ | 99.97 | 1.85 | 0.335 $\lambda_0$ |
| 20 | $Ta_2O_5$ | 80.64 | 2.21 | 0.324 $\lambda_0$ |
| 21 | $La_{0.9}Al_{1.1}O_3$ | 103.81 | 1.85 | 0.348 $\lambda_0$ |
| 22 | $Ta_2O_5$ | 82.19 | 2.21 | 0.331 $\lambda_0$ |
| 23 | $La_{0.9}Al_{1.1}O_3$ | 105.26 | 1.85 | 0.353 $\lambda_0$ |
| 24 | $Ta_2O_5$ | 86.90 | 2.21 | 0.35 $\lambda_0$ |
| 25 | $La_{0.9}Al_{1.1}O_3$ | 101.71 | 1.85 | 0.341 $\lambda_0$ |
| 26 | $Ta_2O_5$ | 85.24 | 2.21 | 0.343 $\lambda_0$ |
| 27 | $La_{0.9}Al_{1.1}O_3$ | 97.47 | 1.85 | 0.327 $\lambda_0$ |
| 28 | $Ta_2O_5$ | 80.44 | 2.21 | 0.324 $\lambda_0$ |
| 29 | $La_{0.9}Al_{1.1}O_3$ | 95.18 | 1.85 | 0.319 $\lambda_0$ |
| 30 | $Ta_2O_5$ | 80.36 | 2.21 | 0.323 $\lambda_0$ |
| 31 | $La_{0.9}Al_{1.1}O_3$ | 92.49 | 1.85 | 0.31 $\lambda_0$ |
| 32 | $Ta_2O_5$ | 79.34 | 2.21 | 0.319 $\lambda_0$ |
| 33 | $La_{0.9}Al_{1.1}O_3$ | 93.38 | 1.85 | 0.313 $\lambda_0$ |
| 34 | $Ta_2O_5$ | 78.89 | 2.21 | 0.317 $\lambda_0$ |
| 35 | $La_{0.9}Al_{1.1}O_3$ | 91.32 | 1.85 | 0.308 $\lambda_0$ |
| 36 | $Ta_2O_5$ | 78.73 | 2.21 | 0.317 $\lambda_0$ |
| 37 | $La_{0.9}Al_{1.1}O_3$ | 90.39 | 1.85 | 0.303 $\lambda_0$ |
| 38 | $Ta_2O_5$ | 78.21 | 2.21 | 0.315 $\lambda_0$ |
| 39 | $La_{0.9}Al_{1.1}O_3$ | 88.43 | 1.85 | 0.297 $\lambda_0$ |
| 40 | $Ta_2O_5$ | 81.54 | 2.21 | 0.328 $\lambda_0$ |
| 41 | $La_{0.9}Al_{1.1}O_3$ | 82.30 | 1.85 | 0.276 $\lambda_0$ |
| 42 | $Ta_2O_5$ | 89.10 | 2.21 | 0.359 $\lambda_0$ |
| 43 | $La_{0.9}Al_{1.1}O_3$ | 69.29 | 1.85 | 0.232 $\lambda_0$ |
| 44 | $Ta_2O_5$ | 98.45 | 2.21 | 0.396 $\lambda_0$ |
| 45 | $La_{0.9}Al_{1.1}O_3$ | 55.63 | 1.85 | 0.187 $\lambda_0$ |
| 46 | $Ta_2O_5$ | 91.13 | 2.21 | 0.367 $\lambda_0$ |
| 47 | $La_{0.9}Al_{1.1}O_3$ | 86.96 | 1.85 | 0.292 $\lambda_0$ |
| 48 | $Ta_2O_5$ | 77.58 | 2.21 | 0.312 $\lambda_0$ |
| 49 | $La_{0.9}Al_{1.1}O_3$ | 87.47 | 1.85 | 0.293 $\lambda_0$ |
| 50 | $Ta_2O_5$ | 84.68 | 2.21 | 0.341 $\lambda_0$ |
| 51 | $La_{0.9}Al_{1.1}O_3$ | 91.79 | 1.85 | 0.308 $\lambda_0$ |
| 52 | $Ta_2O_5$ | 204.39 | 2.21 | 0.822 $\lambda_0$ |
| 53 | $La_{0.9}Al_{1.1}O_3$ | 93.61 | 1.85 | 0.314 $\lambda_0$ |
| 54 | $Ta_2O_5$ | 86.64 | 2.21 | 0.349 $\lambda_0$ |
| 55 | $La_{0.9}Al_{1.1}O_3$ | 91.44 | 1.85 | 0.307 $\lambda_0$ |
| 56 | $Ta_2O_5$ | 197.98 | 2.21 | 0.797 $\lambda_0$ |
| 57 | $La_{0.9}Al_{1.1}O_3$ | 83.34 | 1.85 | 0.28 $\lambda_0$ |
| 58 | $Ta_2O_5$ | 98.03 | 2.21 | 0.394 $\lambda_0$ |
| 59 | $La_{0.9}Al_{1.1}O_3$ | 75.37 | 1.85 | 0.253 $\lambda_0$ |
| 60 | $Ta_2O_5$ | 83.09 | 2.21 | 0.334 $\lambda_0$ |
| 61 | $La_{0.9}Al_{1.1}O_3$ | 106.62 | 1.85 | 0.358 $\lambda_0$ |
| 62 | $Ta_2O_5$ | 54.23 | 2.21 | 0.218 $\lambda_0$ |
| 63 | $SiO_2$ | 89.13 | 1.47 | 0.238 $\lambda_0$ |
| | AIR | | 1.00 | |

FIG.30

RED DF COMPARISON EXAMPLE 5
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.5}Al_{1.5}O_3$ | 43.45 | 1.74 | 0.137 $\lambda_0$ |
| 2 | $Ta_2O_5$ | 96.38 | 2.21 | 0.388 $\lambda_0$ |
| 3 | $La_{0.5}Al_{1.5}O_3$ | 109.57 | 1.74 | 0.346 $\lambda_0$ |
| 4 | $Ta_2O_5$ | 124.30 | 2.21 | 0.5 $\lambda_0$ |
| 5 | $La_{0.5}Al_{1.5}O_3$ | 32.57 | 1.74 | 0.103 $\lambda_0$ |
| 6 | $Ta_2O_5$ | 242.26 | 2.21 | 0.975 $\lambda_0$ |
| 7 | $La_{0.5}Al_{1.5}O_3$ | 142.45 | 1.74 | 0.45 $\lambda_0$ |
| 8 | $Ta_2O_5$ | 86.80 | 2.21 | 0.349 $\lambda_0$ |
| 9 | $La_{0.5}Al_{1.5}O_3$ | 115.49 | 1.74 | 0.365 $\lambda_0$ |
| 10 | $Ta_2O_5$ | 88.49 | 2.21 | 0.356 $\lambda_0$ |
| 11 | $La_{0.5}Al_{1.5}O_3$ | 90.60 | 1.74 | 0.286 $\lambda_0$ |
| 12 | $Ta_2O_5$ | 94.82 | 2.21 | 0.382 $\lambda_0$ |
| 13 | $La_{0.5}Al_{1.5}O_3$ | 82.71 | 1.74 | 0.261 $\lambda_0$ |
| 14 | $Ta_2O_5$ | 94.00 | 2.21 | 0.378 $\lambda_0$ |
| 15 | $La_{0.5}Al_{1.5}O_3$ | 85.36 | 1.74 | 0.27 $\lambda_0$ |
| 16 | $Ta_2O_5$ | 99.63 | 2.21 | 0.401 $\lambda_0$ |
| 17 | $La_{0.5}Al_{1.5}O_3$ | 75.89 | 1.74 | 0.24 $\lambda_0$ |
| 18 | $Ta_2O_5$ | 102.45 | 2.21 | 0.412 $\lambda_0$ |
| 19 | $La_{0.5}Al_{1.5}O_3$ | 99.84 | 1.74 | 0.315 $\lambda_0$ |
| 20 | $Ta_2O_5$ | 97.86 | 2.21 | 0.394 $\lambda_0$ |
| 21 | $La_{0.5}Al_{1.5}O_3$ | 116.00 | 1.74 | 0.366 $\lambda_0$ |
| 22 | $Ta_2O_5$ | 92.88 | 2.21 | 0.374 $\lambda_0$ |
| 23 | $La_{0.5}Al_{1.5}O_3$ | 105.86 | 1.74 | 0.334 $\lambda_0$ |
| 24 | $Ta_2O_5$ | 89.44 | 2.21 | 0.36 $\lambda_0$ |
| 25 | $La_{0.5}Al_{1.5}O_3$ | 90.68 | 1.74 | 0.286 $\lambda_0$ |
| 26 | $Ta_2O_5$ | 93.77 | 2.21 | 0.377 $\lambda_0$ |
| 27 | $La_{0.5}Al_{1.5}O_3$ | 80.16 | 1.74 | 0.253 $\lambda_0$ |
| 28 | $Ta_2O_5$ | 92.38 | 2.21 | 0.372 $\lambda_0$ |
| 29 | $La_{0.5}Al_{1.5}O_3$ | 89.18 | 1.74 | 0.282 $\lambda_0$ |
| 30 | $Ta_2O_5$ | 88.75 | 2.21 | 0.357 $\lambda_0$ |
| 31 | $La_{0.5}Al_{1.5}O_3$ | 83.65 | 1.74 | 0.264 $\lambda_0$ |
| 32 | $Ta_2O_5$ | 91.89 | 2.21 | 0.37 $\lambda_0$ |
| 33 | $La_{0.5}Al_{1.5}O_3$ | 84.16 | 1.74 | 0.266 $\lambda_0$ |
| 34 | $Ta_2O_5$ | 89.37 | 2.21 | 0.36 $\lambda_0$ |
| 35 | $La_{0.5}Al_{1.5}O_3$ | 88.03 | 1.74 | 0.278 $\lambda_0$ |
| 36 | $Ta_2O_5$ | 89.83 | 2.21 | 0.361 $\lambda_0$ |
| 37 | $La_{0.5}Al_{1.5}O_3$ | 81.08 | 1.74 | 0.256 $\lambda_0$ |
| 38 | $Ta_2O_5$ | 90.07 | 2.21 | 0.362 $\lambda_0$ |
| 39 | $La_{0.5}Al_{1.5}O_3$ | 86.68 | 1.74 | 0.274 $\lambda_0$ |
| 40 | $Ta_2O_5$ | 91.44 | 2.21 | 0.368 $\lambda_0$ |
| 41 | $La_{0.5}Al_{1.5}O_3$ | 75.72 | 1.74 | 0.239 $\lambda_0$ |
| 42 | $Ta_2O_5$ | 99.59 | 2.21 | 0.401 $\lambda_0$ |
| 43 | $La_{0.5}Al_{1.5}O_3$ | 86.21 | 1.74 | 0.272 $\lambda_0$ |
| 44 | $Ta_2O_5$ | 214.82 | 2.21 | 0.864 $\lambda_0$ |
| 45 | $La_{0.5}Al_{1.5}O_3$ | 78.04 | 1.74 | 0.246 $\lambda_0$ |
| 46 | $Ta_2O_5$ | 104.32 | 2.21 | 0.42 $\lambda_0$ |
| 47 | $La_{0.5}Al_{1.5}O_3$ | 86.78 | 1.74 | 0.274 $\lambda_0$ |
| 48 | $Ta_2O_5$ | 209.47 | 2.21 | 0.843 $\lambda_0$ |
| 49 | $La_{0.5}Al_{1.5}O_3$ | 83.97 | 1.74 | 0.265 $\lambda_0$ |
| 50 | $Ta_2O_5$ | 100.24 | 2.21 | 0.403 $\lambda_0$ |
| 51 | $La_{0.5}Al_{1.5}O_3$ | 84.33 | 1.74 | 0.266 $\lambda_0$ |
| 52 | $Ta_2O_5$ | 86.23 | 2.21 | 0.347 $\lambda_0$ |
| 53 | $La_{0.5}Al_{1.5}O_3$ | 105.08 | 1.74 | 0.332 $\lambda_0$ |
| 54 | $Ta_2O_5$ | 69.30 | 2.21 | 0.279 $\lambda_0$ |
| 55 | $SiO_2$ | 81.18 | 1.47 | 0.217 $\lambda_0$ |
| | AIR | | 1.00 | |

FIG.31

RED DF COMPARISON EXAMPLE 6
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Al_2O_3$ | 65.95 | 1.63 | 0.195 $\lambda_0$ |
| 2 | $Ta_2O_5$ | 100.34 | 2.21 | 0.404 $\lambda_0$ |
| 3 | $Al_2O_3$ | 131.07 | 1.63 | 0.387 $\lambda_0$ |
| 4 | $Ta_2O_5$ | 114.56 | 2.21 | 0.461 $\lambda_0$ |
| 5 | $Al_2O_3$ | 35.41 | 1.63 | 0.105 $\lambda_0$ |
| 6 | $Ta_2O_5$ | 114.17 | 2.21 | 0.459 $\lambda_0$ |
| 7 | $Al_2O_3$ | 131.50 | 1.63 | 0.389 $\lambda_0$ |
| 8 | $Ta_2O_5$ | 93.93 | 2.21 | 0.378 $\lambda_0$ |
| 9 | $Al_2O_3$ | 139.44 | 1.63 | 0.412 $\lambda_0$ |
| 10 | $Ta_2O_5$ | 211.50 | 2.21 | 0.851 $\lambda_0$ |
| 11 | $Al_2O_3$ | 121.31 | 1.63 | 0.358 $\lambda_0$ |
| 12 | $Ta_2O_5$ | 102.20 | 2.21 | 0.411 $\lambda_0$ |
| 13 | $Al_2O_3$ | 71.97 | 1.63 | 0.213 $\lambda_0$ |
| 14 | $Ta_2O_5$ | 115.95 | 2.21 | 0.467 $\lambda_0$ |
| 15 | $Al_2O_3$ | 59.32 | 1.63 | 0.175 $\lambda_0$ |
| 16 | $Ta_2O_5$ | 103.87 | 2.21 | 0.418 $\lambda_0$ |
| 17 | $Al_2O_3$ | 121.92 | 1.63 | 0.36 $\lambda_0$ |
| 18 | $Ta_2O_5$ | 89.96 | 2.21 | 0.362 $\lambda_0$ |
| 19 | $Al_2O_3$ | 126.66 | 1.63 | 0.374 $\lambda_0$ |
| 20 | $Ta_2O_5$ | 92.28 | 2.21 | 0.371 $\lambda_0$ |
| 21 | $Al_2O_3$ | 116.38 | 1.63 | 0.344 $\lambda_0$ |
| 22 | $Ta_2O_5$ | 99.68 | 2.21 | 0.401 $\lambda_0$ |
| 23 | $Al_2O_3$ | 75.91 | 1.63 | 0.224 $\lambda_0$ |
| 24 | $Ta_2O_5$ | 109.93 | 2.21 | 0.442 $\lambda_0$ |
| 25 | $Al_2O_3$ | 72.85 | 1.63 | 0.215 $\lambda_0$ |
| 26 | $Ta_2O_5$ | 111.40 | 2.21 | 0.448 $\lambda_0$ |
| 27 | $Al_2O_3$ | 52.12 | 1.63 | 0.154 $\lambda_0$ |
| 28 | $Ta_2O_5$ | 109.42 | 2.21 | 0.44 $\lambda_0$ |
| 29 | $Al_2O_3$ | 75.09 | 1.63 | 0.222 $\lambda_0$ |
| 30 | $Ta_2O_5$ | 106.76 | 2.21 | 0.43 $\lambda_0$ |
| 31 | $Al_2O_3$ | 70.09 | 1.63 | 0.207 $\lambda_0$ |
| 32 | $Ta_2O_5$ | 106.94 | 2.21 | 0.43 $\lambda_0$ |
| 33 | $Al_2O_3$ | 63.96 | 1.63 | 0.189 $\lambda_0$ |
| 34 | $Ta_2O_5$ | 108.47 | 2.21 | 0.436 $\lambda_0$ |
| 35 | $Al_2O_3$ | 76.29 | 1.63 | 0.225 $\lambda_0$ |
| 36 | $Ta_2O_5$ | 108.94 | 2.21 | 0.438 $\lambda_0$ |
| 37 | $Al_2O_3$ | 50.31 | 1.63 | 0.149 $\lambda_0$ |
| 38 | $Ta_2O_5$ | 107.43 | 2.21 | 0.432 $\lambda_0$ |
| 39 | $Al_2O_3$ | 74.57 | 1.63 | 0.22 $\lambda_0$ |
| 40 | $Ta_2O_5$ | 112.91 | 2.21 | 0.454 $\lambda_0$ |
| 41 | $Al_2O_3$ | 73.15 | 1.63 | 0.216 $\lambda_0$ |
| 42 | $Ta_2O_5$ | 230.62 | 2.21 | 0.928 $\lambda_0$ |
| 43 | $Al_2O_3$ | 66.80 | 1.63 | 0.197 $\lambda_0$ |
| 44 | $Ta_2O_5$ | 129.75 | 2.21 | 0.522 $\lambda_0$ |
| 45 | $Al_2O_3$ | 44.69 | 1.63 | 0.132 $\lambda_0$ |
| 46 | $Ta_2O_5$ | 347.12 | 2.21 | 1.397 $\lambda_0$ |
| 47 | $Al_2O_3$ | 122.60 | 1.63 | 0.362 $\lambda_0$ |
| 48 | $Ta_2O_5$ | 96.42 | 2.21 | 0.388 $\lambda_0$ |
| 49 | $Al_2O_3$ | 82.27 | 1.63 | 0.243 $\lambda_0$ |
| 50 | $Ta_2O_5$ | 98.67 | 2.21 | 0.397 $\lambda_0$ |
| 51 | $Al_2O_3$ | 102.09 | 1.63 | 0.302 $\lambda_0$ |
| 52 | $Ta_2O_5$ | 79.60 | 2.21 | 0.32 $\lambda_0$ |
| 53 | $SiO_2$ | 77.41 | 1.47 | 0.207 $\lambda_0$ |
| | AIR | | 1.00 | |

FIG.32

RED DF COMPARISON EXAMPLE 7
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Ta_2O_5$ | 105.75 | 2.21 | 0.425 $\lambda_0$ |
| 2 | $SiO_2$ | 133.87 | 1.47 | 0.358 $\lambda_0$ |
| 3 | $Ta_2O_5$ | 112.96 | 2.21 | 0.455 $\lambda_0$ |
| 4 | $SiO_2$ | 56.10 | 1.47 | 0.15 $\lambda_0$ |
| 5 | $Ta_2O_5$ | 112.30 | 2.21 | 0.452 $\lambda_0$ |
| 6 | $SiO_2$ | 136.58 | 1.47 | 0.365 $\lambda_0$ |
| 7 | $Ta_2O_5$ | 93.31 | 2.21 | 0.375 $\lambda_0$ |
| 8 | $SiO_2$ | 161.35 | 1.47 | 0.431 $\lambda_0$ |
| 9 | $Ta_2O_5$ | 219.44 | 2.21 | 0.883 $\lambda_0$ |
| 10 | $SiO_2$ | 146.98 | 1.47 | 0.393 $\lambda_0$ |
| 11 | $Ta_2O_5$ | 105.10 | 2.21 | 0.423 $\lambda_0$ |
| 12 | $SiO_2$ | 80.36 | 1.47 | 0.215 $\lambda_0$ |
| 13 | $Ta_2O_5$ | 121.06 | 2.21 | 0.487 $\lambda_0$ |
| 14 | $SiO_2$ | 57.80 | 1.47 | 0.154 $\lambda_0$ |
| 15 | $Ta_2O_5$ | 100.93 | 2.21 | 0.406 $\lambda_0$ |
| 16 | $SiO_2$ | 147.12 | 1.47 | 0.393 $\lambda_0$ |
| 17 | $Ta_2O_5$ | 74.90 | 2.21 | 0.301 $\lambda_0$ |
| 18 | $SiO_2$ | 162.41 | 1.47 | 0.434 $\lambda_0$ |
| 19 | $Ta_2O_5$ | 72.88 | 2.21 | 0.293 $\lambda_0$ |
| 20 | $SiO_2$ | 157.34 | 1.47 | 0.421 $\lambda_0$ |
| 21 | $Ta_2O_5$ | 79.33 | 2.21 | 0.319 $\lambda_0$ |
| 22 | $SiO_2$ | 139.24 | 1.47 | 0.372 $\lambda_0$ |
| 23 | $Ta_2O_5$ | 98.99 | 2.21 | 0.398 $\lambda_0$ |
| 24 | $SiO_2$ | 66.36 | 1.47 | 0.177 $\lambda_0$ |
| 25 | $Ta_2O_5$ | 117.24 | 2.21 | 0.472 $\lambda_0$ |
| 26 | $SiO_2$ | 69.44 | 1.47 | 0.186 $\lambda_0$ |
| 27 | $Ta_2O_5$ | 116.51 | 2.21 | 0.469 $\lambda_0$ |
| 28 | $SiO_2$ | 60.05 | 1.47 | 0.16 $\lambda_0$ |
| 29 | $Ta_2O_5$ | 116.67 | 2.21 | 0.469 $\lambda_0$ |
| 30 | $SiO_2$ | 60.75 | 1.47 | 0.162 $\lambda_0$ |
| 31 | $Ta_2O_5$ | 118.48 | 2.21 | 0.477 $\lambda_0$ |
| 32 | $SiO_2$ | 59.10 | 1.47 | 0.158 $\lambda_0$ |
| 33 | $Ta_2O_5$ | 119.98 | 2.21 | 0.483 $\lambda_0$ |
| 34 | $SiO_2$ | 57.27 | 1.47 | 0.153 $\lambda_0$ |
| 35 | $Ta_2O_5$ | 119.85 | 2.21 | 0.482 $\lambda_0$ |
| 36 | $SiO_2$ | 46.57 | 1.47 | 0.124 $\lambda_0$ |
| 37 | $Ta_2O_5$ | 120.67 | 2.21 | 0.486 $\lambda_0$ |
| 38 | $SiO_2$ | 54.21 | 1.47 | 0.145 $\lambda_0$ |
| 39 | $Ta_2O_5$ | 129.23 | 2.21 | 0.52 $\lambda_0$ |
| 40 | $SiO_2$ | 51.17 | 1.47 | 0.137 $\lambda_0$ |
| 41 | $Ta_2O_5$ | 244.95 | 2.21 | 0.986 $\lambda_0$ |
| 42 | $SiO_2$ | 44.74 | 1.47 | 0.12 $\lambda_0$ |
| 43 | $Ta_2O_5$ | 144.70 | 2.21 | 0.582 $\lambda_0$ |
| 44 | $SiO_2$ | 33.19 | 1.47 | 0.089 $\lambda_0$ |
| 45 | $Ta_2O_5$ | 348.93 | 2.21 | 1.404 $\lambda_0$ |
| 46 | $SiO_2$ | 152.21 | 1.47 | 0.407 $\lambda_0$ |
| 47 | $Ta_2O_5$ | 105.41 | 2.21 | 0.424 $\lambda_0$ |
| 48 | $SiO_2$ | 54.08 | 1.47 | 0.145 $\lambda_0$ |
| 49 | $Ta_2O_5$ | 112.05 | 2.21 | 0.451 $\lambda_0$ |
| 50 | $SiO_2$ | 118.71 | 1.47 | 0.317 $\lambda_0$ |
| 51 | $Ta_2O_5$ | 89.30 | 2.21 | 0.359 $\lambda_0$ |
| 52 | $SiO_2$ | 64.31 | 1.47 | 0.172 $\lambda_0$ |
| | AIR | | 1.00 | |

FIG.33

BLUE DF PRACTICAL EXAMPLE 2-1
(DESIGN PRINCIPAL WAVELENGTH $\lambda_0$ = 550 nm)

| LAYER NO | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $TiO_2$ | 12.49 | 2.47 | 0.056 $\lambda_0$ |
| 2 | $La_{0.9}Al_{1.1}O_3$ | 67.30 | 1.85 | 0.226 $\lambda_0$ |
| 3 | $TiO_2$ | 62.95 | 2.47 | 0.282 $\lambda_0$ |
| 4 | $La_{0.9}Al_{1.1}O_3$ | 27.48 | 1.85 | 0.092 $\lambda_0$ |
| 5 | $TiO_2$ | 73.70 | 2.47 | 0.331 $\lambda_0$ |
| 6 | $La_{0.9}Al_{1.1}O_3$ | 17.90 | 1.85 | 0.06 $\lambda_0$ |
| 7 | $TiO_2$ | 179.35 | 2.47 | 0.804 $\lambda_0$ |
| 8 | $La_{0.9}Al_{1.1}O_3$ | 44.01 | 1.85 | 0.148 $\lambda_0$ |
| 9 | $TiO_2$ | 72.83 | 2.47 | 0.327 $\lambda_0$ |
| 10 | $La_{0.9}Al_{1.1}O_3$ | 34.20 | 1.85 | 0.115 $\lambda_0$ |
| 11 | $TiO_2$ | 157.97 | 2.47 | 0.709 $\lambda_0$ |
| 12 | $La_{0.9}Al_{1.1}O_3$ | 44.49 | 1.85 | 0.149 $\lambda_0$ |
| 13 | $TiO_2$ | 67.33 | 2.47 | 0.302 $\lambda_0$ |
| 14 | $La_{0.9}Al_{1.1}O_3$ | 45.10 | 1.85 | 0.151 $\lambda_0$ |
| 15 | $TiO_2$ | 67.98 | 2.47 | 0.305 $\lambda_0$ |
| 16 | $La_{0.9}Al_{1.1}O_3$ | 33.09 | 1.85 | 0.111 $\lambda_0$ |
| 17 | $TiO_2$ | 156.38 | 2.47 | 0.701 $\lambda_0$ |
| 18 | $La_{0.9}Al_{1.1}O_3$ | 54.98 | 1.85 | 0.184 $\lambda_0$ |
| 19 | $TiO_2$ | 66.19 | 2.47 | 0.297 $\lambda_0$ |
| 20 | $La_{0.9}Al_{1.1}O_3$ | 56.25 | 1.85 | 0.189 $\lambda_0$ |
| 21 | $TiO_2$ | 154.85 | 2.47 | 0.695 $\lambda_0$ |
| 22 | $La_{0.9}Al_{1.1}O_3$ | 47.60 | 1.85 | 0.16 $\lambda_0$ |
| 23 | $TiO_2$ | 64.14 | 2.47 | 0.288 $\lambda_0$ |
| 24 | $La_{0.9}Al_{1.1}O_3$ | 38.97 | 1.85 | 0.131 $\lambda_0$ |
| 25 | $TiO_2$ | 62.87 | 2.47 | 0.282 $\lambda_0$ |
| 26 | $La_{0.9}Al_{1.1}O_3$ | 45.50 | 1.85 | 0.153 $\lambda_0$ |
| 27 | $TiO_2$ | 59.77 | 2.47 | 0.268 $\lambda_0$ |
| 28 | $La_{0.9}Al_{1.1}O_3$ | 50.49 | 1.85 | 0.169 $\lambda_0$ |
| 29 | $TiO_2$ | 58.16 | 2.47 | 0.261 $\lambda_0$ |
| 30 | $La_{0.9}Al_{1.1}O_3$ | 46.47 | 1.85 | 0.156 $\lambda_0$ |
| 31 | $TiO_2$ | 59.56 | 2.47 | 0.267 $\lambda_0$ |
| 32 | $La_{0.9}Al_{1.1}O_3$ | 39.69 | 1.85 | 0.133 $\lambda_0$ |
| 33 | $TiO_2$ | 60.83 | 2.47 | 0.273 $\lambda_0$ |
| 34 | $La_{0.9}Al_{1.1}O_3$ | 52.44 | 1.85 | 0.176 $\lambda_0$ |
| 35 | $TiO_2$ | 59.87 | 2.47 | 0.269 $\lambda_0$ |
| 36 | $La_{0.9}Al_{1.1}O_3$ | 48.54 | 1.85 | 0.163 $\lambda_0$ |
| 37 | $TiO_2$ | 59.02 | 2.47 | 0.265 $\lambda_0$ |
| 38 | $La_{0.9}Al_{1.1}O_3$ | 40.02 | 1.85 | 0.134 $\lambda_0$ |
| 39 | $TiO_2$ | 54.35 | 2.47 | 0.244 $\lambda_0$ |
| 40 | $La_{0.9}Al_{1.1}O_3$ | 42.06 | 1.85 | 0.141 $\lambda_0$ |
| 41 | $TiO_2$ | 53.48 | 2.47 | 0.24 $\lambda_0$ |
| 42 | $La_{0.9}Al_{1.1}O_3$ | 55.81 | 1.85 | 0.187 $\lambda_0$ |
| 43 | $TiO_2$ | 128.03 | 2.47 | 0.574 $\lambda_0$ |
| 44 | $La_{0.9}Al_{1.1}O_3$ | 55.24 | 1.85 | 0.185 $\lambda_0$ |
| 45 | $TiO_2$ | 133.11 | 2.47 | 0.597 $\lambda_0$ |
| 46 | $La_{0.9}Al_{1.1}O_3$ | 66.93 | 1.85 | 0.225 $\lambda_0$ |
| 47 | $TiO_2$ | 143.21 | 2.47 | 0.642 $\lambda_0$ |
| 48 | $La_{0.9}Al_{1.1}O_3$ | 48.52 | 1.85 | 0.163 $\lambda_0$ |
| 49 | $TiO_2$ | 47.14 | 2.47 | 0.211 $\lambda_0$ |
| 50 | $SiO_2$ | 123.29 | 1.47 | 0.329 $\lambda_0$ |
| | AIR | | 1.00 | |

FIG.34

BLUE OF PRACTICAL EXAMPLE 2-2
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.5}Al_{1.5}O_3$ | 142.13 | 1.74 | 0.449 $\lambda_0$ |
| 2 | $TiO_2$ | 29.03 | 2.47 | 0.13 $\lambda_0$ |
| 3 | $La_{0.5}Al_{1.5}O_3$ | 59.01 | 1.74 | 0.186 $\lambda_0$ |
| 4 | $TiO_2$ | 38.93 | 2.47 | 0.175 $\lambda_0$ |
| 5 | $La_{0.5}Al_{1.5}O_3$ | 78.87 | 1.74 | 0.249 $\lambda_0$ |
| 6 | $TiO_2$ | 35.20 | 2.47 | 0.158 $\lambda_0$ |
| 7 | $La_{0.5}Al_{1.5}O_3$ | 75.66 | 1.74 | 0.239 $\lambda_0$ |
| 8 | $TiO_2$ | 35.23 | 2.47 | 0.158 $\lambda_0$ |
| 9 | $La_{0.5}Al_{1.5}O_3$ | 74.26 | 1.74 | 0.235 $\lambda_0$ |
| 10 | $TiO_2$ | 44.19 | 2.47 | 0.198 $\lambda_0$ |
| 11 | $La_{0.5}Al_{1.5}O_3$ | 66.61 | 1.74 | 0.21 $\lambda_0$ |
| 12 | $TiO_2$ | 51.66 | 2.47 | 0.232 $\lambda_0$ |
| 13 | $La_{0.5}Al_{1.5}O_3$ | 47.37 | 1.74 | 0.15 $\lambda_0$ |
| 14 | $TiO_2$ | 59.70 | 2.47 | 0.268 $\lambda_0$ |
| 15 | $La_{0.5}Al_{1.5}O_3$ | 38.42 | 1.74 | 0.121 $\lambda_0$ |
| 16 | $TiO_2$ | 63.41 | 2.47 | 0.284 $\lambda_0$ |
| 17 | $La_{0.5}Al_{1.5}O_3$ | 55.25 | 1.74 | 0.174 $\lambda_0$ |
| 18 | $TiO_2$ | 66.80 | 2.47 | 0.3 $\lambda_0$ |
| 19 | $La_{0.5}Al_{1.5}O_3$ | 35.68 | 1.74 | 0.113 $\lambda_0$ |
| 20 | $TiO_2$ | 72.86 | 2.47 | 0.327 $\lambda_0$ |
| 21 | $La_{0.5}Al_{1.5}O_3$ | 15.00 | 1.74 | 0.047 $\lambda_0$ |
| 22 | $TiO_2$ | 70.14 | 2.47 | 0.315 $\lambda_0$ |
| 23 | $La_{0.5}Al_{1.5}O_3$ | 55.08 | 1.74 | 0.174 $\lambda_0$ |
| 24 | $TiO_2$ | 61.91 | 2.47 | 0.278 $\lambda_0$ |
| 25 | $La_{0.5}Al_{1.5}O_3$ | 61.02 | 1.74 | 0.193 $\lambda_0$ |
| 26 | $TiO_2$ | 149.91 | 2.47 | 0.672 $\lambda_0$ |
| 27 | $La_{0.5}Al_{1.5}O_3$ | 37.56 | 1.74 | 0.119 $\lambda_0$ |
| 28 | $TiO_2$ | 67.50 | 2.47 | 0.303 $\lambda_0$ |
| 29 | $La_{0.5}Al_{1.5}O_3$ | 64.00 | 1.74 | 0.202 $\lambda_0$ |
| 30 | $TiO_2$ | 251.79 | 2.47 | 1.129 $\lambda_0$ |
| 31 | $La_{0.5}Al_{1.5}O_3$ | 74.02 | 1.74 | 0.234 $\lambda_0$ |
| 32 | $TiO_2$ | 160.82 | 2.47 | 0.721 $\lambda_0$ |
| 33 | $La_{0.5}Al_{1.5}O_3$ | 23.67 | 1.74 | 0.075 $\lambda_0$ |
| 34 | $TiO_2$ | 72.18 | 2.47 | 0.324 $\lambda_0$ |
| 35 | $La_{0.5}Al_{1.5}O_3$ | 47.35 | 1.74 | 0.15 $\lambda_0$ |
| 36 | $TiO_2$ | 265.54 | 2.47 | 1.191 $\lambda_0$ |
| 37 | $La_{0.5}Al_{1.5}O_3$ | 52.32 | 1.74 | 0.165 $\lambda_0$ |
| 38 | $TiO_2$ | 67.84 | 2.47 | 0.304 $\lambda_0$ |
| 39 | $La_{0.5}Al_{1.5}O_3$ | 15.21 | 1.74 | 0.048 $\lambda_0$ |
| 40 | $TiO_2$ | 63.58 | 2.47 | 0.285 $\lambda_0$ |
| 41 | $SiO_2$ | 130.85 | 1.47 | 0.35 $\lambda_0$ |
| | AIR | | 1.00 | |

FIG. 35

BLUE DF PRACTICAL EXAMPLE 2-3
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | TiO$_2$ | 142.26 | 2.47 | 0.638 $\lambda_0$ |
| 2 | Al$_2$O$_3$ | 31.40 | 1.63 | 0.093 $\lambda_0$ |
| 3 | TiO$_2$ | 68.84 | 2.47 | 0.309 $\lambda_0$ |
| 4 | Al$_2$O$_3$ | 36.77 | 1.63 | 0.109 $\lambda_0$ |
| 5 | TiO$_2$ | 278.50 | 2.47 | 1.249 $\lambda_0$ |
| 6 | Al$_2$O$_3$ | 40.98 | 1.63 | 0.121 $\lambda_0$ |
| 7 | TiO$_2$ | 160.08 | 2.47 | 0.718 $\lambda_0$ |
| 8 | Al$_2$O$_3$ | 55.77 | 1.63 | 0.165 $\lambda_0$ |
| 9 | TiO$_2$ | 152.66 | 2.47 | 0.685 $\lambda_0$ |
| 10 | Al$_2$O$_3$ | 69.79 | 1.63 | 0.206 $\lambda_0$ |
| 11 | TiO$_2$ | 155.64 | 2.47 | 0.698 $\lambda_0$ |
| 12 | Al$_2$O$_3$ | 20.22 | 1.63 | 0.06 $\lambda_0$ |
| 13 | TiO$_2$ | 78.18 | 2.47 | 0.351 $\lambda_0$ |
| 14 | Al$_2$O$_3$ | 76.68 | 1.63 | 0.227 $\lambda_0$ |
| 15 | TiO$_2$ | 250.66 | 2.47 | 1.124 $\lambda_0$ |
| 16 | Al$_2$O$_3$ | 58.72 | 1.63 | 0.173 $\lambda_0$ |
| 17 | TiO$_2$ | 71.58 | 2.47 | 0.321 $\lambda_0$ |
| 18 | Al$_2$O$_3$ | 17.12 | 1.63 | 0.051 $\lambda_0$ |
| 19 | TiO$_2$ | 70.52 | 2.47 | 0.316 $\lambda_0$ |
| 20 | Al$_2$O$_3$ | 64.05 | 1.63 | 0.189 $\lambda_0$ |
| 21 | TiO$_2$ | 143.46 | 2.47 | 0.643 $\lambda_0$ |
| 22 | Al$_2$O$_3$ | 56.29 | 1.63 | 0.166 $\lambda_0$ |
| 23 | TiO$_2$ | 61.97 | 2.47 | 0.278 $\lambda_0$ |
| 24 | Al$_2$O$_3$ | 65.62 | 1.63 | 0.194 $\lambda_0$ |
| 25 | TiO$_2$ | 144.78 | 2.47 | 0.649 $\lambda_0$ |
| 26 | Al$_2$O$_3$ | 34.39 | 1.63 | 0.102 $\lambda_0$ |
| 27 | TiO$_2$ | 68.14 | 2.47 | 0.306 $\lambda_0$ |
| 28 | Al$_2$O$_3$ | 35.67 | 1.63 | 0.105 $\lambda_0$ |
| 29 | TiO$_2$ | 232.38 | 2.47 | 1.042 $\lambda_0$ |
| 30 | Al$_2$O$_3$ | 71.73 | 1.63 | 0.212 $\lambda_0$ |
| 31 | TiO$_2$ | 126.77 | 2.47 | 0.569 $\lambda_0$ |
| 32 | Al$_2$O$_3$ | 70.68 | 1.63 | 0.209 $\lambda_0$ |
| 33 | TiO$_2$ | 116.27 | 2.47 | 0.522 $\lambda_0$ |
| 34 | Al$_2$O$_3$ | 0.00 | 1.63 | 0 $\lambda_0$ |
| 35 | TiO$_2$ | 42.92 | 2.47 | 0.193 $\lambda_0$ |
| 36 | Al$_2$O$_3$ | 37.55 | 1.63 | 0.111 $\lambda_0$ |
| 37 | TiO$_2$ | 45.88 | 2.47 | 0.206 $\lambda_0$ |
| 38 | SiO$_2$ | 135.04 | 1.47 | 0.361 $\lambda_0$ |
| | AIR | | 1.00 | |

FIG.36

BLUE DF PRACTICAL EXAMPLE 2-4
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 137.76 | 2.38 | $0.595 \lambda_0$ |
| 2 | $La_{0.9}Al_{1.1}O_3$ | 27.48 | 1.85 | $0.092 \lambda_0$ |
| 3 | $Nb_2O_5$ | 82.34 | 2.38 | $0.356 \lambda_0$ |
| 4 | $La_{0.9}Al_{1.1}O_3$ | 81.80 | 1.85 | $0.274 \lambda_0$ |
| 5 | $Nb_2O_5$ | 249.95 | 2.38 | $1.08 \lambda_0$ |
| 6 | $La_{0.9}Al_{1.1}O_3$ | 62.93 | 1.85 | $0.211 \lambda_0$ |
| 7 | $Nb_2O_5$ | 161.39 | 2.38 | $0.697 \lambda_0$ |
| 8 | $La_{0.9}Al_{1.1}O_3$ | 55.82 | 1.85 | $0.187 \lambda_0$ |
| 9 | $Nb_2O_5$ | 170.99 | 2.38 | $0.739 \lambda_0$ |
| 10 | $La_{0.9}Al_{1.1}O_3$ | 33.86 | 1.85 | $0.114 \lambda_0$ |
| 11 | $Nb_2O_5$ | 173.54 | 2.38 | $0.75 \lambda_0$ |
| 12 | $La_{0.9}Al_{1.1}O_3$ | 58.96 | 1.85 | $0.198 \lambda_0$ |
| 13 | $Nb_2O_5$ | 62.34 | 2.38 | $0.269 \lambda_0$ |
| 14 | $La_{0.9}Al_{1.1}O_3$ | 52.32 | 1.85 | $0.176 \lambda_0$ |
| 15 | $Nb_2O_5$ | 149.53 | 2.38 | $0.646 \lambda_0$ |
| 16 | $La_{0.9}Al_{1.1}O_3$ | 55.70 | 1.85 | $0.187 \lambda_0$ |
| 17 | $Nb_2O_5$ | 70.65 | 2.38 | $0.305 \lambda_0$ |
| 18 | $La_{0.9}Al_{1.1}O_3$ | 57.38 | 1.85 | $0.192 \lambda_0$ |
| 19 | $Nb_2O_5$ | 177.58 | 2.38 | $0.767 \lambda_0$ |
| 20 | $La_{0.9}Al_{1.1}O_3$ | 26.05 | 1.85 | $0.087 \lambda_0$ |
| 21 | $Nb_2O_5$ | 70.41 | 2.38 | $0.304 \lambda_0$ |
| 22 | $La_{0.9}Al_{1.1}O_3$ | 45.12 | 1.85 | $0.151 \lambda_0$ |
| 23 | $Nb_2O_5$ | 63.32 | 2.38 | $0.274 \lambda_0$ |
| 24 | $La_{0.9}Al_{1.1}O_3$ | 50.93 | 1.85 | $0.171 \lambda_0$ |
| 25 | $Nb_2O_5$ | 60.74 | 2.38 | $0.263 \lambda_0$ |
| 26 | $La_{0.9}Al_{1.1}O_3$ | 50.02 | 1.85 | $0.168 \lambda_0$ |
| 27 | $Nb_2O_5$ | 59.57 | 2.38 | $0.257 \lambda_0$ |
| 28 | $La_{0.9}Al_{1.1}O_3$ | 48.11 | 1.85 | $0.161 \lambda_0$ |
| 29 | $Nb_2O_5$ | 58.84 | 2.38 | $0.254 \lambda_0$ |
| 30 | $La_{0.9}Al_{1.1}O_3$ | 52.06 | 1.85 | $0.175 \lambda_0$ |
| 31 | $Nb_2O_5$ | 58.16 | 2.38 | $0.251 \lambda_0$ |
| 32 | $La_{0.9}Al_{1.1}O_3$ | 55.41 | 1.85 | $0.186 \lambda_0$ |
| 33 | $Nb_2O_5$ | 56.51 | 2.38 | $0.244 \lambda_0$ |
| 34 | $La_{0.9}Al_{1.1}O_3$ | 54.78 | 1.85 | $0.184 \lambda_0$ |
| 35 | $Nb_2O_5$ | 53.28 | 2.38 | $0.23 \lambda_0$ |
| 36 | $La_{0.9}Al_{1.1}O_3$ | 54.76 | 1.85 | $0.184 \lambda_0$ |
| 37 | $Nb_2O_5$ | 50.81 | 2.38 | $0.22 \lambda_0$ |
| 38 | $La_{0.9}Al_{1.1}O_3$ | 59.46 | 1.85 | $0.199 \lambda_0$ |
| 39 | $Nb_2O_5$ | 49.64 | 2.38 | $0.215 \lambda_0$ |
| 40 | $La_{0.9}Al_{1.1}O_3$ | 56.61 | 1.85 | $0.19 \lambda_0$ |
| 41 | $Nb_2O_5$ | 40.94 | 2.38 | $0.177 \lambda_0$ |
| 42 | $La_{0.9}Al_{1.1}O_3$ | 51.46 | 1.85 | $0.173 \lambda_0$ |
| 43 | $Nb_2O_5$ | 150.60 | 2.38 | $0.651 \lambda_0$ |
| 44 | $La_{0.9}Al_{1.1}O_3$ | 67.69 | 1.85 | $0.227 \lambda_0$ |
| 45 | $Nb_2O_5$ | 138.41 | 2.38 | $0.598 \lambda_0$ |
| 46 | $La_{0.9}Al_{1.1}O_3$ | 52.99 | 1.85 | $0.178 \lambda_0$ |
| 47 | $Nb_2O_5$ | 154.06 | 2.38 | $0.666 \lambda_0$ |
| 48 | $SiO_2$ | 122.32 | 1.47 | $0.327 \lambda_0$ |
| | AIR | | 1.00 | |

FIG.37

BLUE DF PRACTICAL EXAMPLE 2-5
(DESIGN PRINCIPAL WAVELENGTH $\lambda_0$ = 550 nm)

| LAYER NO | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 26.10 | 2.38 | 0.113 $\lambda_0$ |
| 2 | $La_{0.5}Al_{1.5}O_3$ | 45.13 | 1.74 | 0.143 $\lambda_0$ |
| 3 | $Nb_2O_5$ | 62.55 | 2.38 | 0.27 $\lambda_0$ |
| 4 | $La_{0.5}Al_{1.5}O_3$ | 53.26 | 1.74 | 0.168 $\lambda_0$ |
| 5 | $Nb_2O_5$ | 60.85 | 2.38 | 0.263 $\lambda_0$ |
| 6 | $La_{0.5}Al_{1.5}O_3$ | 42.17 | 1.74 | 0.133 $\lambda_0$ |
| 7 | $Nb_2O_5$ | 52.50 | 2.38 | 0.227 $\lambda_0$ |
| 8 | $La_{0.5}Al_{1.5}O_3$ | 68.00 | 1.74 | 0.215 $\lambda_0$ |
| 9 | $Nb_2O_5$ | 41.89 | 2.38 | 0.181 $\lambda_0$ |
| 10 | $La_{0.5}Al_{1.5}O_3$ | 80.74 | 1.74 | 0.255 $\lambda_0$ |
| 11 | $Nb_2O_5$ | 38.49 | 2.38 | 0.166 $\lambda_0$ |
| 12 | $La_{0.5}Al_{1.5}O_3$ | 81.02 | 1.74 | 0.256 $\lambda_0$ |
| 13 | $Nb_2O_5$ | 37.42 | 2.38 | 0.162 $\lambda_0$ |
| 14 | $La_{0.5}Al_{1.5}O_3$ | 78.58 | 1.74 | 0.248 $\lambda_0$ |
| 15 | $Nb_2O_5$ | 39.59 | 2.38 | 0.171 $\lambda_0$ |
| 16 | $La_{0.5}Al_{1.5}O_3$ | 78.11 | 1.74 | 0.247 $\lambda_0$ |
| 17 | $Nb_2O_5$ | 42.97 | 2.38 | 0.186 $\lambda_0$ |
| 18 | $La_{0.5}Al_{1.5}O_3$ | 75.29 | 1.74 | 0.238 $\lambda_0$ |
| 19 | $Nb_2O_5$ | 46.39 | 2.38 | 0.2 $\lambda_0$ |
| 20 | $La_{0.5}Al_{1.5}O_3$ | 62.80 | 1.74 | 0.198 $\lambda_0$ |
| 21 | $Nb_2O_5$ | 55.64 | 2.38 | 0.24 $\lambda_0$ |
| 22 | $La_{0.5}Al_{1.5}O_3$ | 43.35 | 1.74 | 0.137 $\lambda_0$ |
| 23 | $Nb_2O_5$ | 63.42 | 2.38 | 0.274 $\lambda_0$ |
| 24 | $La_{0.5}Al_{1.5}O_3$ | 53.34 | 1.74 | 0.168 $\lambda_0$ |
| 25 | $Nb_2O_5$ | 66.61 | 2.38 | 0.288 $\lambda_0$ |
| 26 | $La_{0.5}Al_{1.5}O_3$ | 51.30 | 1.74 | 0.162 $\lambda_0$ |
| 27 | $Nb_2O_5$ | 158.22 | 2.38 | 0.684 $\lambda_0$ |
| 28 | $La_{0.5}Al_{1.5}O_3$ | 51.86 | 1.74 | 0.164 $\lambda_0$ |
| 29 | $Nb_2O_5$ | 67.28 | 2.38 | 0.291 $\lambda_0$ |
| 30 | $La_{0.5}Al_{1.5}O_3$ | 62.25 | 1.74 | 0.197 $\lambda_0$ |
| 31 | $Nb_2O_5$ | 260.36 | 2.38 | 1.125 $\lambda_0$ |
| 32 | $La_{0.5}Al_{1.5}O_3$ | 65.62 | 1.74 | 0.207 $\lambda_0$ |
| 33 | $Nb_2O_5$ | 72.36 | 2.38 | 0.313 $\lambda_0$ |
| 34 | $La_{0.5}Al_{1.5}O_3$ | 41.16 | 1.74 | 0.13 $\lambda_0$ |
| 35 | $Nb_2O_5$ | 166.36 | 2.38 | 0.719 $\lambda_0$ |
| 36 | $La_{0.5}Al_{1.5}O_3$ | 22.82 | 1.74 | 0.072 $\lambda_0$ |
| 37 | $Nb_2O_5$ | 81.44 | 2.38 | 0.352 $\lambda_0$ |
| 38 | $La_{0.5}Al_{1.5}O_3$ | 63.29 | 1.74 | 0.2 $\lambda_0$ |
| 39 | $Nb_2O_5$ | 176.45 | 2.38 | 0.763 $\lambda_0$ |
| 40 | $La_{0.5}Al_{1.5}O_3$ | 28.62 | 1.74 | 0.09 $\lambda_0$ |
| 41 | $Nb_2O_5$ | 167.40 | 2.38 | 0.723 $\lambda_0$ |
| 42 | $La_{0.5}Al_{1.5}O_3$ | 66.70 | 1.74 | 0.211 $\lambda_0$ |
| 43 | $Nb_2O_5$ | 165.96 | 2.38 | 0.717 $\lambda_0$ |
| 44 | $La_{0.5}Al_{1.5}O_3$ | 41.17 | 1.74 | 0.13 $\lambda_0$ |
| 45 | $Nb_2O_5$ | 272.28 | 2.38 | 1.177 $\lambda_0$ |
| 46 | $La_{0.5}Al_{1.5}O_3$ | 72.29 | 1.74 | 0.228 $\lambda_0$ |
| 47 | $Nb_2O_5$ | 182.54 | 2.38 | 0.789 $\lambda_0$ |
| 48 | $La_{0.5}Al_{1.5}O_3$ | 9.07 | 1.74 | 0.029 $\lambda_0$ |
| 49 | $Nb_2O_5$ | 187.66 | 2.38 | 0.811 $\lambda_0$ |
| 50 | $La_{0.5}Al_{1.5}O_3$ | 35.50 | 1.74 | 0.112 $\lambda_0$ |
| 51 | $Nb_2O_5$ | 59.46 | 2.38 | 0.257 $\lambda_0$ |
| 52 | $SiO_2$ | 118.11 | 1.47 | 0.316 $\lambda_0$ |
| | AIR | | 1.00 | |

FIG.38

BLUE DF PRACTICAL EXAMPLE 2-6
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
|  | PRISM BASE |  | 1.52 |  |
| 1 | $Nb_2O_5$ | 144.42 | 2.38 | 0.624 $\lambda_0$ |
| 2 | $Al_2O_3$ | 33.87 | 1.63 | 0.1 $\lambda_0$ |
| 3 | $Nb_2O_5$ | 61.53 | 2.38 | 0.266 $\lambda_0$ |
| 4 | $Al_2O_3$ | 73.08 | 1.63 | 0.216 $\lambda_0$ |
| 5 | $Nb_2O_5$ | 140.90 | 2.38 | 0.609 $\lambda_0$ |
| 6 | $Al_2O_3$ | 38.20 | 1.63 | 0.113 $\lambda_0$ |
| 7 | $Nb_2O_5$ | 207.36 | 2.38 | 0.896 $\lambda_0$ |
| 8 | $Al_2O_3$ | 74.82 | 1.63 | 0.221 $\lambda_0$ |
| 9 | $Nb_2O_5$ | 142.31 | 2.38 | 0.615 $\lambda_0$ |
| 10 | $Al_2O_3$ | 71.38 | 1.63 | 0.211 $\lambda_0$ |
| 11 | $Nb_2O_5$ | 45.74 | 2.38 | 0.198 $\lambda_0$ |
| 12 | $Al_2O_3$ | 75.66 | 1.63 | 0.224 $\lambda_0$ |
| 13 | $Nb_2O_5$ | 39.52 | 2.38 | 0.171 $\lambda_0$ |
| 14 | $Al_2O_3$ | 83.86 | 1.63 | 0.248 $\lambda_0$ |
| 15 | $Nb_2O_5$ | 37.24 | 2.38 | 0.161 $\lambda_0$ |
| 16 | $Al_2O_3$ | 79.74 | 1.63 | 0.236 $\lambda_0$ |
| 17 | $Nb_2O_5$ | 44.60 | 2.38 | 0.193 $\lambda_0$ |
| 18 | $Al_2O_3$ | 60.11 | 1.63 | 0.178 $\lambda_0$ |
| 19 | $Nb_2O_5$ | 60.40 | 2.38 | 0.261 $\lambda_0$ |
| 20 | $Al_2O_3$ | 46.02 | 1.63 | 0.136 $\lambda_0$ |
| 21 | $Nb_2O_5$ | 68.72 | 2.38 | 0.297 $\lambda_0$ |
| 22 | $Al_2O_3$ | 54.00 | 1.63 | 0.16 $\lambda_0$ |
| 23 | $Nb_2O_5$ | 155.66 | 2.38 | 0.673 $\lambda_0$ |
| 24 | $Al_2O_3$ | 63.60 | 1.63 | 0.188 $\lambda_0$ |
| 25 | $Nb_2O_5$ | 71.13 | 2.38 | 0.307 $\lambda_0$ |
| 26 | $Al_2O_3$ | 45.38 | 1.63 | 0.134 $\lambda_0$ |
| 27 | $Nb_2O_5$ | 157.07 | 2.38 | 0.679 $\lambda_0$ |
| 28 | $Al_2O_3$ | 64.64 | 1.63 | 0.191 $\lambda_0$ |
| 29 | $Nb_2O_5$ | 79.85 | 2.38 | 0.345 $\lambda_0$ |
| 30 | $Al_2O_3$ | 15.60 | 1.63 | 0.046 $\lambda_0$ |
| 31 | $Nb_2O_5$ | 172.30 | 2.38 | 0.745 $\lambda_0$ |
| 32 | $Al_2O_3$ | 70.52 | 1.63 | 0.208 $\lambda_0$ |
| 33 | $Nb_2O_5$ | 81.25 | 2.38 | 0.351 $\lambda_0$ |
| 34 | $Al_2O_3$ | 11.36 | 1.63 | 0.034 $\lambda_0$ |
| 35 | $Nb_2O_5$ | 185.78 | 2.38 | 0.803 $\lambda_0$ |
| 36 | $Al_2O_3$ | 27.67 | 1.63 | 0.082 $\lambda_0$ |
| 37 | $Nb_2O_5$ | 181.28 | 2.38 | 0.783 $\lambda_0$ |
| 38 | $Al_2O_3$ | 69.08 | 1.63 | 0.204 $\lambda_0$ |
| 39 | $Nb_2O_5$ | 269.33 | 2.38 | 1.164 $\lambda_0$ |
| 40 | $Al_2O_3$ | 23.58 | 1.63 | 0.07 $\lambda_0$ |
| 41 | $Nb_2O_5$ | 80.27 | 2.38 | 0.347 $\lambda_0$ |
| 42 | $Al_2O_3$ | 74.15 | 1.63 | 0.219 $\lambda_0$ |
| 43 | $Nb_2O_5$ | 250.97 | 2.38 | 1.085 $\lambda_0$ |
| 44 | $Al_2O_3$ | 71.15 | 1.63 | 0.21 $\lambda_0$ |
| 45 | $Nb_2O_5$ | 77.69 | 2.38 | 0.336 $\lambda_0$ |
| 46 | $Al_2O_3$ | 4.57 | 1.63 | 0.014 $\lambda_0$ |
| 47 | $Nb_2O_5$ | 70.25 | 2.38 | 0.304 $\lambda_0$ |
| 48 | $SiO_2$ | 128.43 | 1.47 | 0.343 $\lambda_0$ |
|  | AIR |  | 1.00 |  |

FIG.39

BLUE DF PRACTICAL EXAMPLE 2-7
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | Nb$_2$O$_5$ | 231.94 | 2.38 | 1.002 $\lambda_0$ |
| 2 | SiO$_2$ | 77.75 | 1.47 | 0.208 $\lambda_0$ |
| 3 | Nb$_2$O$_5$ | 117.99 | 2.38 | 0.51 $\lambda_0$ |
| 4 | SiO$_2$ | 108.33 | 1.47 | 0.29 $\lambda_0$ |
| 5 | Nb$_2$O$_5$ | 229.63 | 2.38 | 0.992 $\lambda_0$ |
| 6 | SiO$_2$ | 190.04 | 1.47 | 0.508 $\lambda_0$ |
| 7 | Nb$_2$O$_5$ | 137.03 | 2.38 | 0.592 $\lambda_0$ |
| 8 | SiO$_2$ | 56.71 | 1.47 | 0.152 $\lambda_0$ |
| 9 | Nb$_2$O$_5$ | 148.58 | 2.38 | 0.642 $\lambda_0$ |
| 10 | SiO$_2$ | 95.48 | 1.47 | 0.255 $\lambda_0$ |
| 11 | Nb$_2$O$_5$ | 141.19 | 2.38 | 0.61 $\lambda_0$ |
| 12 | SiO$_2$ | 86.09 | 1.47 | 0.23 $\lambda_0$ |
| 13 | Nb$_2$O$_5$ | 34.00 | 2.38 | 0.147 $\lambda_0$ |
| 14 | SiO$_2$ | 91.07 | 1.47 | 0.243 $\lambda_0$ |
| 15 | Nb$_2$O$_5$ | 146.35 | 2.38 | 0.632 $\lambda_0$ |
| 16 | SiO$_2$ | 73.81 | 1.47 | 0.197 $\lambda_0$ |
| 17 | Nb$_2$O$_5$ | 66.69 | 2.38 | 0.288 $\lambda_0$ |
| 18 | SiO$_2$ | 35.29 | 1.47 | 0.094 $\lambda_0$ |
| 19 | Nb$_2$O$_5$ | 158.11 | 2.38 | 0.683 $\lambda_0$ |
| 20 | SiO$_2$ | 93.49 | 1.47 | 0.25 $\lambda_0$ |
| 21 | Nb$_2$O$_5$ | 252.52 | 2.38 | 1.091 $\lambda_0$ |
| 22 | SiO$_2$ | 94.94 | 1.47 | 0.254 $\lambda_0$ |
| 23 | Nb$_2$O$_5$ | 267.64 | 2.38 | 1.157 $\lambda_0$ |
| 24 | SiO$_2$ | 33.62 | 1.47 | 0.09 $\lambda_0$ |
| 25 | Nb$_2$O$_5$ | 187.14 | 2.38 | 0.809 $\lambda_0$ |
| 26 | SiO$_2$ | 42.57 | 1.47 | 0.114 $\lambda_0$ |
| 27 | Nb$_2$O$_5$ | 374.25 | 2.38 | 1.617 $\lambda_0$ |
| 28 | SiO$_2$ | 104.44 | 1.47 | 0.279 $\lambda_0$ |
| 29 | Nb$_2$O$_5$ | 250.30 | 2.38 | 1.082 $\lambda_0$ |
| 30 | SiO$_2$ | 60.43 | 1.47 | 0.162 $\lambda_0$ |
| 31 | Nb$_2$O$_5$ | 158.50 | 2.38 | 0.685 $\lambda_0$ |
| 32 | SiO$_2$ | 124.55 | 1.47 | 0.333 $\lambda_0$ |
| | AIR | | 1.00 | |

FIG.40

BLUE DF PRACTICAL EXAMPLE 2-8
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.5}Al_{1.5}O_3$ | 17.89 | 1.74 | 0.056 $\lambda_0$ |
| 2 | $Ta_2O_5$ | 17.35 | 2.21 | 0.07 $\lambda_0$ |
| 3 | $La_{0.5}Al_{1.5}O_3$ | 57.28 | 1.74 | 0.181 $\lambda_0$ |
| 4 | $Ta_2O_5$ | 58.16 | 2.21 | 0.234 $\lambda_0$ |
| 5 | $La_{0.5}Al_{1.5}O_3$ | 68.25 | 1.74 | 0.216 $\lambda_0$ |
| 6 | $Ta_2O_5$ | 168.49 | 2.21 | 0.678 $\lambda_0$ |
| 7 | $La_{0.5}Al_{1.5}O_3$ | 64.65 | 1.74 | 0.204 $\lambda_0$ |
| 8 | $Ta_2O_5$ | 59.04 | 2.21 | 0.238 $\lambda_0$ |
| 9 | $La_{0.5}Al_{1.5}O_3$ | 59.27 | 1.74 | 0.187 $\lambda_0$ |
| 10 | $Ta_2O_5$ | 57.38 | 2.21 | 0.231 $\lambda_0$ |
| 11 | $La_{0.5}Al_{1.5}O_3$ | 60.61 | 1.74 | 0.191 $\lambda_0$ |
| 12 | $Ta_2O_5$ | 56.71 | 2.21 | 0.228 $\lambda_0$ |
| 13 | $La_{0.5}Al_{1.5}O_3$ | 65.95 | 1.74 | 0.208 $\lambda_0$ |
| 14 | $Ta_2O_5$ | 55.34 | 2.21 | 0.223 $\lambda_0$ |
| 15 | $La_{0.5}Al_{1.5}O_3$ | 68.65 | 1.74 | 0.217 $\lambda_0$ |
| 16 | $Ta_2O_5$ | 53.37 | 2.21 | 0.215 $\lambda_0$ |
| 17 | $La_{0.5}Al_{1.5}O_3$ | 69.66 | 1.74 | 0.22 $\lambda_0$ |
| 18 | $Ta_2O_5$ | 52.01 | 2.21 | 0.209 $\lambda_0$ |
| 19 | $La_{0.5}Al_{1.5}O_3$ | 70.38 | 1.74 | 0.222 $\lambda_0$ |
| 20 | $Ta_2O_5$ | 52.36 | 2.21 | 0.211 $\lambda_0$ |
| 21 | $La_{0.5}Al_{1.5}O_3$ | 70.31 | 1.74 | 0.222 $\lambda_0$ |
| 22 | $Ta_2O_5$ | 53.78 | 2.21 | 0.216 $\lambda_0$ |
| 23 | $La_{0.5}Al_{1.5}O_3$ | 67.79 | 1.74 | 0.214 $\lambda_0$ |
| 24 | $Ta_2O_5$ | 55.80 | 2.21 | 0.225 $\lambda_0$ |
| 25 | $La_{0.5}Al_{1.5}O_3$ | 61.50 | 1.74 | 0.194 $\lambda_0$ |
| 26 | $Ta_2O_5$ | 59.49 | 2.21 | 0.239 $\lambda_0$ |
| 27 | $La_{0.5}Al_{1.5}O_3$ | 54.45 | 1.74 | 0.172 $\lambda_0$ |
| 28 | $Ta_2O_5$ | 65.41 | 2.21 | 0.263 $\lambda_0$ |
| 29 | $La_{0.5}Al_{1.5}O_3$ | 52.99 | 1.74 | 0.167 $\lambda_0$ |
| 30 | $Ta_2O_5$ | 79.80 | 2.21 | 0.321 $\lambda_0$ |
| 31 | $La_{0.5}Al_{1.5}O_3$ | 27.97 | 1.74 | 0.088 $\lambda_0$ |
| 32 | $Ta_2O_5$ | 319.26 | 2.21 | 1.285 $\lambda_0$ |
| 33 | $La_{0.5}Al_{1.5}O_3$ | 50.71 | 1.74 | 0.16 $\lambda_0$ |
| 34 | $Ta_2O_5$ | 72.26 | 2.21 | 0.291 $\lambda_0$ |
| 35 | $La_{0.5}Al_{1.5}O_3$ | 54.18 | 1.74 | 0.171 $\lambda_0$ |
| 36 | $Ta_2O_5$ | 282.19 | 2.21 | 1.135 $\lambda_0$ |
| 37 | $La_{0.5}Al_{1.5}O_3$ | 60.98 | 1.74 | 0.193 $\lambda_0$ |
| 38 | $Ta_2O_5$ | 93.07 | 2.21 | 0.374 $\lambda_0$ |
| 39 | $La_{0.5}Al_{1.5}O_3$ | 45.12 | 1.74 | 0.142 $\lambda_0$ |
| 40 | $Ta_2O_5$ | 294.60 | 2.21 | 1.185 $\lambda_0$ |
| 41 | $La_{0.5}Al_{1.5}O_3$ | 38.48 | 1.74 | 0.122 $\lambda_0$ |
| 42 | $Ta_2O_5$ | 79.25 | 2.21 | 0.319 $\lambda_0$ |
| 43 | $La_{0.5}Al_{1.5}O_3$ | 51.94 | 1.74 | 0.164 $\lambda_0$ |
| 44 | $Ta_2O_5$ | 417.49 | 2.21 | 1.68 $\lambda_0$ |
| 45 | $La_{0.5}Al_{1.5}O_3$ | 60.29 | 1.74 | 0.19 $\lambda_0$ |
| 46 | $Ta_2O_5$ | 186.32 | 2.21 | 0.75 $\lambda_0$ |
| 47 | $La_{0.5}Al_{1.5}O_3$ | 34.24 | 1.74 | 0.108 $\lambda_0$ |
| 48 | $Ta_2O_5$ | 200.25 | 2.21 | 0.806 $\lambda_0$ |
| 49 | $La_{0.5}Al_{1.5}O_3$ | 32.69 | 1.74 | 0.103 $\lambda_0$ |
| 50 | $Ta_2O_5$ | 315.04 | 2.21 | 1.269 $\lambda_0$ |
| 51 | $La_{0.5}Al_{1.5}O_3$ | 44.89 | 1.74 | 0.142 $\lambda_0$ |
| 52 | $Ta_2O_5$ | 59.44 | 2.21 | 0.239 $\lambda_0$ |
| 53 | $SiO_2$ | 125.47 | 1.47 | 0.335 $\lambda_0$ |
| | AIR | | 1.00 | |

FIG.41

BLUE DF COMPARISON EXAMPLE 3
(DESIGN PRINCIPAL WAVELENGTH $\lambda_0 = 550$ nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $TiO_2$ | 147.08 | 2.47 | $0.66 \lambda_0$ |
| 2 | $Al_2O_3$ | 31.40 | 1.63 | $0.093 \lambda_0$ |
| 3 | $TiO_2$ | 64.32 | 2.47 | $0.289 \lambda_0$ |
| 4 | $Al_2O_3$ | 30.00 | 1.63 | $0.089 \lambda_0$ |
| 5 | $TiO_2$ | 190.21 | 2.47 | $0.853 \lambda_0$ |
| 6 | $Al_2O_3$ | 37.19 | 1.63 | $0.11 \lambda_0$ |
| 7 | $TiO_2$ | 158.13 | 2.47 | $0.709 \lambda_0$ |
| 8 | $Al_2O_3$ | 47.75 | 1.63 | $0.141 \lambda_0$ |
| 9 | $TiO_2$ | 153.73 | 2.47 | $0.69 \lambda_0$ |
| 10 | $Al_2O_3$ | 83.32 | 1.63 | $0.246 \lambda_0$ |
| 11 | $TiO_2$ | 254.41 | 2.47 | $1.141 \lambda_0$ |
| 12 | $Al_2O_3$ | 43.41 | 1.63 | $0.128 \lambda_0$ |
| 13 | $TiO_2$ | 74.44 | 2.47 | $0.334 \lambda_0$ |
| 14 | $Al_2O_3$ | 30.00 | 1.63 | $0.089 \lambda_0$ |
| 15 | $TiO_2$ | 76.51 | 2.47 | $0.343 \lambda_0$ |
| 16 | $Al_2O_3$ | 39.99 | 1.63 | $0.118 \lambda_0$ |
| 17 | $TiO_2$ | 144.94 | 2.47 | $0.65 \lambda_0$ |
| 18 | $Al_2O_3$ | 68.58 | 1.63 | $0.203 \lambda_0$ |
| 19 | $TiO_2$ | 61.64 | 2.47 | $0.276 \lambda_0$ |
| 20 | $Al_2O_3$ | 67.93 | 1.63 | $0.201 \lambda_0$ |
| 21 | $TiO_2$ | 142.77 | 2.47 | $0.64 \lambda_0$ |
| 22 | $Al_2O_3$ | 34.89 | 1.63 | $0.103 \lambda_0$ |
| 23 | $TiO_2$ | 67.60 | 2.47 | $0.303 \lambda_0$ |
| 24 | $Al_2O_3$ | 60.25 | 1.63 | $0.178 \lambda_0$ |
| 25 | $TiO_2$ | 227.34 | 2.47 | $1.02 \lambda_0$ |
| 26 | $Al_2O_3$ | 64.44 | 1.63 | $0.19 \lambda_0$ |
| 27 | $TiO_2$ | 121.89 | 2.47 | $0.547 \lambda_0$ |
| 28 | $Al_2O_3$ | 70.45 | 1.63 | $0.208 \lambda_0$ |
| 29 | $TiO_2$ | 156.14 | 2.47 | $0.7 \lambda_0$ |
| 30 | $Al_2O_3$ | 39.84 | 1.63 | $0.118 \lambda_0$ |
| 31 | $TiO_2$ | 41.90 | 2.47 | $0.188 \lambda_0$ |
| 32 | $SiO_2$ | 139.65 | 1.47 | $0.373 \lambda_0$ |
| | AIR | | 1.00 | |

FIG.42

BLUE DF COMPARISON EXAMPLE 4
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Nb_2O_5$ | 137.34 | 2.38 | 0.594 $\lambda_0$ |
| 2 | $La_{0.9}Al_{1.1}O_3$ | 57.21 | 1.85 | 0.192 $\lambda_0$ |
| 3 | $Nb_2O_5$ | 72.27 | 2.38 | 0.312 $\lambda_0$ |
| 4 | $La_{0.9}Al_{1.1}O_3$ | 35.05 | 1.85 | 0.118 $\lambda_0$ |
| 5 | $Nb_2O_5$ | 169.18 | 2.38 | 0.731 $\lambda_0$ |
| 6 | $La_{0.9}Al_{1.1}O_3$ | 44.03 | 1.85 | 0.148 $\lambda_0$ |
| 7 | $Nb_2O_5$ | 67.82 | 2.38 | 0.293 $\lambda_0$ |
| 8 | $La_{0.9}Al_{1.1}O_3$ | 55.13 | 1.85 | 0.185 $\lambda_0$ |
| 9 | $Nb_2O_5$ | 158.16 | 2.38 | 0.684 $\lambda_0$ |
| 10 | $La_{0.9}Al_{1.1}O_3$ | 56.46 | 1.85 | 0.189 $\lambda_0$ |
| 11 | $Nb_2O_5$ | 60.62 | 2.38 | 0.262 $\lambda_0$ |
| 12 | $La_{0.9}Al_{1.1}O_3$ | 50.35 | 1.85 | 0.169 $\lambda_0$ |
| 13 | $Nb_2O_5$ | 62.35 | 2.38 | 0.269 $\lambda_0$ |
| 14 | $La_{0.9}Al_{1.1}O_3$ | 42.92 | 1.85 | 0.144 $\lambda_0$ |
| 15 | $Nb_2O_5$ | 63.49 | 2.38 | 0.274 $\lambda_0$ |
| 16 | $La_{0.9}Al_{1.1}O_3$ | 45.05 | 1.85 | 0.151 $\lambda_0$ |
| 17 | $Nb_2O_5$ | 62.66 | 2.38 | 0.271 $\lambda_0$ |
| 18 | $La_{0.9}Al_{1.1}O_3$ | 49.67 | 1.85 | 0.167 $\lambda_0$ |
| 19 | $Nb_2O_5$ | 60.93 | 2.38 | 0.263 $\lambda_0$ |
| 20 | $La_{0.9}Al_{1.1}O_3$ | 50.67 | 1.85 | 0.17 $\lambda_0$ |
| 21 | $Nb_2O_5$ | 59.23 | 2.38 | 0.256 $\lambda_0$ |
| 22 | $La_{0.9}Al_{1.1}O_3$ | 50.46 | 1.85 | 0.169 $\lambda_0$ |
| 23 | $Nb_2O_5$ | 57.29 | 2.38 | 0.248 $\lambda_0$ |
| 24 | $La_{0.9}Al_{1.1}O_3$ | 52.28 | 1.85 | 0.175 $\lambda_0$ |
| 25 | $Nb_2O_5$ | 54.65 | 2.38 | 0.236 $\lambda_0$ |
| 26 | $La_{0.9}Al_{1.1}O_3$ | 53.50 | 1.85 | 0.179 $\lambda_0$ |
| 27 | $Nb_2O_5$ | 47.55 | 2.38 | 0.206 $\lambda_0$ |
| 28 | $La_{0.9}Al_{1.1}O_3$ | 46.86 | 1.85 | 0.157 $\lambda_0$ |
| 29 | $Nb_2O_5$ | 42.84 | 2.38 | 0.185 $\lambda_0$ |
| 30 | $La_{0.9}Al_{1.1}O_3$ | 51.90 | 1.85 | 0.174 $\lambda_0$ |
| 31 | $Nb_2O_5$ | 136.51 | 2.38 | 0.59 $\lambda_0$ |
| 32 | $La_{0.9}Al_{1.1}O_3$ | 59.85 | 1.85 | 0.201 $\lambda_0$ |
| 33 | $Nb_2O_5$ | 144.00 | 2.38 | 0.622 $\lambda_0$ |
| 34 | $SiO_2$ | 128.75 | 1.47 | 0.344 $\lambda_0$ |
| | AIR | | 1.00 | |

FIG.43

BLUE DF COMPARISON EXAMPLE 5
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | TiO$_2$ | 117.28 | 2.47 | 0.526 $\lambda_0$ |
| 2 | SiO$_2$ | 305.76 | 1.47 | 0.817 $\lambda_0$ |
| 3 | TiO$_2$ | 132.78 | 2.47 | 0.596 $\lambda_0$ |
| 4 | SiO$_2$ | 71.73 | 1.47 | 0.192 $\lambda_0$ |
| 5 | TiO$_2$ | 50.02 | 2.47 | 0.224 $\lambda_0$ |
| 6 | SiO$_2$ | 54.30 | 1.47 | 0.145 $\lambda_0$ |
| 7 | TiO$_2$ | 46.89 | 2.47 | 0.21 $\lambda_0$ |
| 8 | SiO$_2$ | 59.49 | 1.47 | 0.159 $\lambda_0$ |
| 9 | TiO$_2$ | 53.10 | 2.47 | 0.238 $\lambda_0$ |
| 10 | SiO$_2$ | 65.09 | 1.47 | 0.174 $\lambda_0$ |
| 11 | TiO$_2$ | 63.10 | 2.47 | 0.283 $\lambda_0$ |
| 12 | SiO$_2$ | 18.48 | 1.47 | 0.049 $\lambda_0$ |
| 13 | TiO$_2$ | 63.81 | 2.47 | 0.286 $\lambda_0$ |
| 14 | SiO$_2$ | 88.94 | 1.47 | 0.238 $\lambda_0$ |
| 15 | TiO$_2$ | 66.76 | 2.47 | 0.299 $\lambda_0$ |
| 16 | SiO$_2$ | 9.15 | 1.47 | 0.024 $\lambda_0$ |
| 17 | TiO$_2$ | 66.58 | 2.47 | 0.299 $\lambda_0$ |
| 18 | SiO$_2$ | 76.51 | 1.47 | 0.204 $\lambda_0$ |
| 19 | TiO$_2$ | 48.60 | 2.47 | 0.218 $\lambda_0$ |
| 20 | SiO$_2$ | 50.97 | 1.47 | 0.136 $\lambda_0$ |
| 21 | TiO$_2$ | 48.76 | 2.47 | 0.219 $\lambda_0$ |
| 22 | SiO$_2$ | 63.22 | 1.47 | 0.169 $\lambda_0$ |
| 23 | TiO$_2$ | 51.37 | 2.47 | 0.23 $\lambda_0$ |
| 24 | SiO$_2$ | 53.74 | 1.47 | 0.144 $\lambda_0$ |
| 25 | TiO$_2$ | 43.35 | 2.47 | 0.194 $\lambda_0$ |
| 26 | SiO$_2$ | 69.42 | 1.47 | 0.186 $\lambda_0$ |
| 27 | TiO$_2$ | 37.03 | 2.47 | 0.166 $\lambda_0$ |
| 28 | SiO$_2$ | 86.81 | 1.47 | 0.232 $\lambda_0$ |
| 29 | TiO$_2$ | 28.42 | 2.47 | 0.127 $\lambda_0$ |
| 30 | SiO$_2$ | 74.12 | 1.47 | 0.198 $\lambda_0$ |
| 31 | TiO$_2$ | 30.42 | 2.47 | 0.136 $\lambda_0$ |
| 32 | SiO$_2$ | 293.10 | 1.47 | 0.783 $\lambda_0$ |
| 33 | TiO$_2$ | 133.29 | 2.47 | 0.598 $\lambda_0$ |
| 34 | SiO$_2$ | 78.20 | 1.47 | 0.209 $\lambda_0$ |
| 35 | TiO$_2$ | 244.48 | 2.47 | 1.097 $\lambda_0$ |
| 36 | SiO$_2$ | 99.32 | 1.47 | 0.265 $\lambda_0$ |
| 37 | TiO$_2$ | 238.95 | 2.47 | 1.072 $\lambda_0$ |
| 38 | SiO$_2$ | 79.91 | 1.47 | 0.214 $\lambda_0$ |
| 39 | TiO$_2$ | 71.42 | 2.47 | 0.32 $\lambda_0$ |
| 40 | SiO$_2$ | 8.63 | 1.47 | 0.023 $\lambda_0$ |
| 41 | TiO$_2$ | 269.91 | 2.47 | 1.211 $\lambda_0$ |
| 42 | SiO$_2$ | 96.98 | 1.47 | 0.259 $\lambda_0$ |
| 43 | TiO$_2$ | 248.17 | 2.47 | 1.113 $\lambda_0$ |
| 44 | SiO$_2$ | 40.48 | 1.47 | 0.108 $\lambda_0$ |
| 45 | TiO$_2$ | 58.22 | 2.47 | 0.261 $\lambda_0$ |
| 46 | SiO$_2$ | 116.72 | 1.47 | 0.312 $\lambda_0$ |
| | AIR | | 1.00 | |

FIG.44

BLUE DF COMPARISON EXAMPLE 6
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $La_{0.9}Al_{1.1}O_3$ | 119.22 | 1.85 | 0.4 $\lambda_0$ |
| 2 | $Ta_2O_5$ | 48.35 | 2.21 | 0.195 $\lambda_0$ |
| 3 | $La_{0.9}Al_{1.1}O_3$ | 59.38 | 1.85 | 0.199 $\lambda_0$ |
| 4 | $Ta_2O_5$ | 50.89 | 2.21 | 0.205 $\lambda_0$ |
| 5 | $La_{0.9}Al_{1.1}O_3$ | 62.95 | 1.85 | 0.211 $\lambda_0$ |
| 6 | $Ta_2O_5$ | 51.04 | 2.21 | 0.205 $\lambda_0$ |
| 7 | $La_{0.9}Al_{1.1}O_3$ | 61.76 | 1.85 | 0.207 $\lambda_0$ |
| 8 | $Ta_2O_5$ | 46.93 | 2.21 | 0.189 $\lambda_0$ |
| 9 | $La_{0.9}Al_{1.1}O_3$ | 58.63 | 1.85 | 0.197 $\lambda_0$ |
| 10 | $Ta_2O_5$ | 48.10 | 2.21 | 0.194 $\lambda_0$ |
| 11 | $La_{0.9}Al_{1.1}O_3$ | 62.53 | 1.85 | 0.21 $\lambda_0$ |
| 12 | $Ta_2O_5$ | 156.55 | 2.21 | 0.63 $\lambda_0$ |
| 13 | $La_{0.9}Al_{1.1}O_3$ | 60.47 | 1.85 | 0.203 $\lambda_0$ |
| 14 | $Ta_2O_5$ | 48.48 | 2.21 | 0.195 $\lambda_0$ |
| 15 | $La_{0.9}Al_{1.1}O_3$ | 56.48 | 1.85 | 0.189 $\lambda_0$ |
| 16 | $Ta_2O_5$ | 49.98 | 2.21 | 0.201 $\lambda_0$ |
| 17 | $La_{0.9}Al_{1.1}O_3$ | 61.73 | 1.85 | 0.207 $\lambda_0$ |
| 18 | $Ta_2O_5$ | 53.14 | 2.21 | 0.214 $\lambda_0$ |
| 19 | $La_{0.9}Al_{1.1}O_3$ | 64.30 | 1.85 | 0.216 $\lambda_0$ |
| 20 | $Ta_2O_5$ | 53.59 | 2.21 | 0.216 $\lambda_0$ |
| 21 | $La_{0.9}Al_{1.1}O_3$ | 64.48 | 1.85 | 0.216 $\lambda_0$ |
| 22 | $Ta_2O_5$ | 53.38 | 2.21 | 0.215 $\lambda_0$ |
| 23 | $La_{0.9}Al_{1.1}O_3$ | 64.28 | 1.85 | 0.216 $\lambda_0$ |
| 24 | $Ta_2O_5$ | 53.73 | 2.21 | 0.216 $\lambda_0$ |
| 25 | $La_{0.9}Al_{1.1}O_3$ | 64.62 | 1.85 | 0.217 $\lambda_0$ |
| 26 | $Ta_2O_5$ | 54.79 | 2.21 | 0.22 $\lambda_0$ |
| 27 | $La_{0.9}Al_{1.1}O_3$ | 65.07 | 1.85 | 0.218 $\lambda_0$ |
| 28 | $Ta_2O_5$ | 55.94 | 2.21 | 0.225 $\lambda_0$ |
| 29 | $La_{0.9}Al_{1.1}O_3$ | 64.73 | 1.85 | 0.217 $\lambda_0$ |
| 30 | $Ta_2O_5$ | 56.85 | 2.21 | 0.229 $\lambda_0$ |
| 31 | $La_{0.9}Al_{1.1}O_3$ | 62.33 | 1.85 | 0.209 $\lambda_0$ |
| 32 | $Ta_2O_5$ | 56.99 | 2.21 | 0.229 $\lambda_0$ |
| 33 | $La_{0.9}Al_{1.1}O_3$ | 58.85 | 1.85 | 0.197 $\lambda_0$ |
| 34 | $Ta_2O_5$ | 57.96 | 2.21 | 0.233 $\lambda_0$ |
| 35 | $La_{0.9}Al_{1.1}O_3$ | 65.29 | 1.85 | 0.219 $\lambda_0$ |
| 36 | $Ta_2O_5$ | 59.11 | 2.21 | 0.238 $\lambda_0$ |
| 37 | $La_{0.9}Al_{1.1}O_3$ | 69.05 | 1.85 | 0.232 $\lambda_0$ |
| 38 | $Ta_2O_5$ | 281.48 | 2.21 | 1.133 $\lambda_0$ |
| 39 | $La_{0.9}Al_{1.1}O_3$ | 68.52 | 1.85 | 0.23 $\lambda_0$ |
| 40 | $Ta_2O_5$ | 56.98 | 2.21 | 0.229 $\lambda_0$ |
| 41 | $La_{0.9}Al_{1.1}O_3$ | 68.61 | 1.85 | 0.23 $\lambda_0$ |
| 42 | $Ta_2O_5$ | 280.65 | 2.21 | 1.129 $\lambda_0$ |
| 43 | $La_{0.9}Al_{1.1}O_3$ | 69.22 | 1.85 | 0.232 $\lambda_0$ |
| 44 | $Ta_2O_5$ | 60.84 | 2.21 | 0.245 $\lambda_0$ |
| 45 | $La_{0.9}Al_{1.1}O_3$ | 66.14 | 1.85 | 0.222 $\lambda_0$ |
| 46 | $Ta_2O_5$ | 278.56 | 2.21 | 1.121 $\lambda_0$ |
| 47 | $La_{0.9}Al_{1.1}O_3$ | 52.92 | 1.85 | 0.178 $\lambda_0$ |
| 48 | $Ta_2O_5$ | 341.82 | 2.21 | 1.375 $\lambda_0$ |
| 49 | $La_{0.9}Al_{1.1}O_3$ | 36.94 | 1.85 | 0.124 $\lambda_0$ |
| 50 | $Ta_2O_5$ | 179.88 | 2.21 | 0.724 $\lambda_0$ |
| 51 | $La_{0.9}Al_{1.1}O_3$ | 33.01 | 1.85 | 0.111 $\lambda_0$ |
| 52 | $Ta_2O_5$ | 128.10 | 2.21 | 0.515 $\lambda_0$ |
| 53 | $La_{0.9}Al_{1.1}O_3$ | 14.70 | 1.85 | 0.049 $\lambda_0$ |
| 54 | $Ta_2O_5$ | 177.01 | 2.21 | 0.712 $\lambda_0$ |
| 55 | $La_{0.9}Al_{1.1}O_3$ | 55.36 | 1.85 | 0.186 $\lambda_0$ |
| 56 | $Ta_2O_5$ | 54.62 | 2.21 | 0.22 $\lambda_0$ |
| 57 | $SiO_2$ | 120.57 | 1.47 | 0.322 $\lambda_0$ |
| | AIR | | 1.00 | |

FIG.45

BLUE DF COMPARISON EXAMPLE 7
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Al_2O_3$ | 140.74 | 1.63 | 0.416 $\lambda_0$ |
| 2 | $Ta_2O_5$ | 66.34 | 2.21 | 0.267 $\lambda_0$ |
| 3 | $Al_2O_3$ | 23.82 | 1.63 | 0.07 $\lambda_0$ |
| 4 | $Ta_2O_5$ | 73.79 | 2.21 | 0.297 $\lambda_0$ |
| 5 | $Al_2O_3$ | 36.95 | 1.63 | 0.109 $\lambda_0$ |
| 6 | $Ta_2O_5$ | 76.78 | 2.21 | 0.309 $\lambda_0$ |
| 7 | $Al_2O_3$ | 54.11 | 1.63 | 0.16 $\lambda_0$ |
| 8 | $Ta_2O_5$ | 80.59 | 2.21 | 0.324 $\lambda_0$ |
| 9 | $Al_2O_3$ | 21.19 | 1.63 | 0.063 $\lambda_0$ |
| 10 | $Ta_2O_5$ | 80.52 | 2.21 | 0.324 $\lambda_0$ |
| 11 | $Al_2O_3$ | 45.61 | 1.63 | 0.135 $\lambda_0$ |
| 12 | $Ta_2O_5$ | 70.71 | 2.21 | 0.285 $\lambda_0$ |
| 13 | $Al_2O_3$ | 57.62 | 1.63 | 0.17 $\lambda_0$ |
| 14 | $Ta_2O_5$ | 63.32 | 2.21 | 0.255 $\lambda_0$ |
| 15 | $Al_2O_3$ | 63.44 | 1.63 | 0.187 $\lambda_0$ |
| 16 | $Ta_2O_5$ | 56.00 | 2.21 | 0.225 $\lambda_0$ |
| 17 | $Al_2O_3$ | 63.04 | 1.63 | 0.186 $\lambda_0$ |
| 18 | $Ta_2O_5$ | 53.37 | 2.21 | 0.215 $\lambda_0$ |
| 19 | $Al_2O_3$ | 63.35 | 1.63 | 0.187 $\lambda_0$ |
| 20 | $Ta_2O_5$ | 60.87 | 2.21 | 0.245 $\lambda_0$ |
| 21 | $Al_2O_3$ | 62.16 | 1.63 | 0.184 $\lambda_0$ |
| 22 | $Ta_2O_5$ | 69.35 | 2.21 | 0.279 $\lambda_0$ |
| 23 | $Al_2O_3$ | 53.70 | 1.63 | 0.159 $\lambda_0$ |
| 24 | $Ta_2O_5$ | 169.54 | 2.21 | 0.682 $\lambda_0$ |
| 25 | $Al_2O_3$ | 58.11 | 1.63 | 0.172 $\lambda_0$ |
| 26 | $Ta_2O_5$ | 76.29 | 2.21 | 0.307 $\lambda_0$ |
| 27 | $Al_2O_3$ | 63.34 | 1.63 | 0.187 $\lambda_0$ |
| 28 | $Ta_2O_5$ | 308.63 | 2.21 | 1.242 $\lambda_0$ |
| 29 | $Al_2O_3$ | 4.75 | 1.63 | 0.014 $\lambda_0$ |
| 30 | $Ta_2O_5$ | 92.12 | 2.21 | 0.371 $\lambda_0$ |
| 31 | $Al_2O_3$ | 64.31 | 1.63 | 0.19 $\lambda_0$ |
| 32 | $Ta_2O_5$ | 84.99 | 2.21 | 0.342 $\lambda_0$ |
| 33 | $Al_2O_3$ | 33.38 | 1.63 | 0.099 $\lambda_0$ |
| 34 | $Ta_2O_5$ | 296.11 | 2.21 | 1.191 $\lambda_0$ |
| 35 | $Al_2O_3$ | 37.12 | 1.63 | 0.11 $\lambda_0$ |
| 36 | $Ta_2O_5$ | 95.63 | 2.21 | 0.385 $\lambda_0$ |
| 37 | $Al_2O_3$ | 56.41 | 1.63 | 0.167 $\lambda_0$ |
| 38 | $Ta_2O_5$ | 299.70 | 2.21 | 1.206 $\lambda_0$ |
| 39 | $Al_2O_3$ | 12.60 | 1.63 | 0.037 $\lambda_0$ |
| 40 | $Ta_2O_5$ | 93.73 | 2.21 | 0.377 $\lambda_0$ |
| 41 | $Al_2O_3$ | 68.25 | 1.63 | 0.202 $\lambda_0$ |
| 42 | $Ta_2O_5$ | 410.30 | 2.21 | 1.651 $\lambda_0$ |
| 43 | $Al_2O_3$ | 58.09 | 1.63 | 0.172 $\lambda_0$ |
| 44 | $Ta_2O_5$ | 191.02 | 2.21 | 0.769 $\lambda_0$ |
| 45 | $Al_2O_3$ | 18.66 | 1.63 | 0.055 $\lambda_0$ |
| 46 | $Ta_2O_5$ | 79.16 | 2.21 | 0.319 $\lambda_0$ |
| 47 | $SiO_2$ | 127.49 | 1.47 | 0.341 $\lambda_0$ |
| | AIR | | 1.00 | |

FIG.46

BLUE DF COMPARISON EXAMPLE 8
(DESIGN PRINCIPAL WAVELENGTH $\lambda_0$ = 550 nm)

| LAYER NO. | MATERIAL | PHYSICAL THICKNESS (nm) | REFRACTIVE INDEX | OPTICAL THICKNESS |
|---|---|---|---|---|
| | PRISM BASE | | 1.52 | |
| 1 | $Ta_2O_5$ | 264.49 | 2.21 | 1.064 $\lambda_0$ |
| 2 | $SiO_2$ | 98.19 | 1.47 | 0.262 $\lambda_0$ |
| 3 | $Ta_2O_5$ | 151.06 | 2.21 | 0.608 $\lambda_0$ |
| 4 | $SiO_2$ | 68.56 | 1.47 | 0.183 $\lambda_0$ |
| 5 | $Ta_2O_5$ | 171.93 | 2.21 | 0.692 $\lambda_0$ |
| 6 | $SiO_2$ | 72.69 | 1.47 | 0.194 $\lambda_0$ |
| 7 | $Ta_2O_5$ | 39.17 | 2.21 | 0.158 $\lambda_0$ |
| 8 | $SiO_2$ | 62.87 | 1.47 | 0.168 $\lambda_0$ |
| 9 | $Ta_2O_5$ | 50.16 | 2.21 | 0.202 $\lambda_0$ |
| 10 | $SiO_2$ | 59.48 | 1.47 | 0.159 $\lambda_0$ |
| 11 | $Ta_2O_5$ | 45.22 | 2.21 | 0.182 $\lambda_0$ |
| 12 | $SiO_2$ | 83.26 | 1.47 | 0.223 $\lambda_0$ |
| 13 | $Ta_2O_5$ | 31.04 | 2.21 | 0.125 $\lambda_0$ |
| 14 | $SiO_2$ | 79.16 | 1.47 | 0.212 $\lambda_0$ |
| 15 | $Ta_2O_5$ | 50.88 | 2.21 | 0.205 $\lambda_0$ |
| 16 | $SiO_2$ | 71.22 | 1.47 | 0.19 $\lambda_0$ |
| 17 | $Ta_2O_5$ | 163.56 | 2.21 | 0.658 $\lambda_0$ |
| 18 | $SiO_2$ | 83.90 | 1.47 | 0.224 $\lambda_0$ |
| 19 | $Ta_2O_5$ | 168.36 | 2.21 | 0.677 $\lambda_0$ |
| 20 | $SiO_2$ | 82.76 | 1.47 | 0.221 $\lambda_0$ |
| 21 | $Ta_2O_5$ | 166.03 | 2.21 | 0.668 $\lambda_0$ |
| 22 | $SiO_2$ | 68.59 | 1.47 | 0.183 $\lambda_0$ |
| 23 | $Ta_2O_5$ | 66.35 | 2.21 | 0.267 $\lambda_0$ |
| 24 | $SiO_2$ | 74.02 | 1.47 | 0.198 $\lambda_0$ |
| 25 | $Ta_2O_5$ | 42.33 | 2.21 | 0.17 $\lambda_0$ |
| 26 | $SiO_2$ | 53.08 | 1.47 | 0.142 $\lambda_0$ |
| 27 | $Ta_2O_5$ | 65.58 | 2.21 | 0.264 $\lambda_0$ |
| 28 | $SiO_2$ | 77.76 | 1.47 | 0.208 $\lambda_0$ |
| 29 | $Ta_2O_5$ | 198.45 | 2.21 | 0.798 $\lambda_0$ |
| 30 | $SiO_2$ | 20.67 | 1.47 | 0.055 $\lambda_0$ |
| 31 | $Ta_2O_5$ | 184.14 | 2.21 | 0.741 $\lambda_0$ |
| 32 | $SiO_2$ | 84.47 | 1.47 | 0.226 $\lambda_0$ |
| 33 | $Ta_2O_5$ | 91.88 | 2.21 | 0.37 $\lambda_0$ |
| 34 | $SiO_2$ | 4.75 | 1.47 | 0.013 $\lambda_0$ |
| 35 | $Ta_2O_5$ | 300.81 | 2.21 | 1.21 $\lambda_0$ |
| 36 | $SiO_2$ | 93.77 | 1.47 | 0.251 $\lambda_0$ |
| 37 | $Ta_2O_5$ | 395.25 | 2.21 | 1.59 $\lambda_0$ |
| 38 | $SiO_2$ | 85.69 | 1.47 | 0.23 $\lambda_0$ |
| 39 | $Ta_2O_5$ | 401.83 | 2.21 | 1.617 $\lambda_0$ |
| 40 | $SiO_2$ | 69.04 | 1.47 | 0.185 $\lambda_0$ |
| 41 | $Ta_2O_5$ | 311.35 | 2.21 | 1.253 $\lambda_0$ |
| 42 | $SiO_2$ | 15.88 | 1.47 | 0.042 $\lambda_0$ |
| 43 | $Ta_2O_5$ | 210.07 | 2.21 | 0.845 $\lambda_0$ |
| 44 | $SiO_2$ | 50.08 | 1.47 | 0.134 $\lambda_0$ |
| 45 | $Ta_2O_5$ | 297.11 | 2.21 | 1.195 $\lambda_0$ |
| 46 | $SiO_2$ | 34.24 | 1.47 | 0.092 $\lambda_0$ |
| 47 | $Ta_2O_5$ | 84.61 | 2.21 | 0.34 $\lambda_0$ |
| 48 | $SiO_2$ | 116.12 | 1.47 | 0.31 $\lambda_0$ |
| | AIR | | 1.00 | |

COLOR SPLITTING/COMBINING PRISM, AND OPTICAL SYSTEM AND PROJECTOR THEREWITH

INCORPORATION BY REFERENCE

This application is based on PCT Patent Application No. PCT/JP2015/055331 filed internationally on Feb. 25, 2015, which is based on Japanese Patent Application No. 2014-038114 filed on Feb. 28, 2014 and Japanese Patent Application No. 2014-110907 filed on May 29, 2014, the contents of all of which are hereby incorporated by reference.

BACKGROUND

The present disclosure relates to a color splitting/combining prism that is provided in a projector. More particularly, the present disclosure relates to a color splitting/combining prism suitable for a projector that employs a laser light source as an illumination light source, and relates also to an optical system and a projector that employ such a color splitting/combining prism.

There are conventionally known projectors that employ image display elements such as liquid crystal display panels and DMDs (digital micro-mirror devices) as devices for projecting digital information such as video stored in recording devices and documents and images stored in personal computers. A projector comprises an illumination light source that radiates illumination light, an illumination optical system that directs the illumination light from the illumination light source to an image display element, and a projection optical system that directs the projection light from the image display element to a projection lens.

The illumination light emitted from the illumination light source is directed via the illumination optical system to be split apart into light of three colors of red, blue, and green, and is then shone on image display elements corresponding to those colors respectively. The illumination light shone on the image display elements emerges from them as projection light, which is then combined back together, and is then directed through the projection optical system to the projection lens to be projected onto a screen.

To split apart and combine together illumination light, a color splitting/combining prism is used. Thus, a color splitting/combining prism is an optical component that is used in both the optical system that directs illumination light and the optical system that directs the projection light, and is composed of a plurality of prisms each in the shape of a triangular prism. For the purpose of splitting apart and combining together light, dichroic films are formed on predetermined faces. Via those dichroic films, light of predetermined wavelengths is reflected and light of other wavelengths is transmitted, and thereby the illumination light is split apart and combined together.

As illumination light sources, high-intensity xenon lamps and high-pressure mercury lamps are conventionally used. Today, laser light sources are in practical use that employ LEDs (light-emitting diodes) and semiconductor lasers as these have come to offer improved emission efficiency and increased emission intensity. In particular, after the advent of blue laser light sources, there have been developed illumination light sources that employ laser light sources of three primary colors, namely a blue laser light source combined with a green and a red laser light source.

In a projector that employs a DMD, OFF-light (unnecessary light) is produced as a result of, at pixels at which a particular color is not to be projected, illumination light being reflected in the direction opposite to that of the projection optical path. The OFF-light is supposed to be expelled from the front face of a color splitting/combining prism to outside the projection optical path. However, the characteristics at the angle at which the OFF-light is incident on a dichroic film differ from those for the projection light (ON-light) due to angle dependence of the dichroic film; thus, the OFF-light may be directed in an unintended direction, such as upward, instead of to the front face of the color splitting/combining prism.

Thus, with illumination that employs a laser light source that produces extremely intense light compared with ordinary lamp light, the OFF-light may be discharged in an unintended direction, raising the temperature of components nearby and becoming stray light which is directed to the projection lens to cause ghosts and low contrast.

There has already been proposed, in Japanese Patent Application Publication No. 2000-258725, a projection optical system in which, of a dichroic surface on a color splitting/combining prism, a region struck by ON-light is provided with a dichroic film having characteristics optimized for rays having an incidence angle similar to that of ON-light and a region struck by OFF-light is provided with a dichroic film having characteristics optimized for rays having an incidence angle similar to that of OFF-light.

A common dichroic film has angle dependence; by providing, instead, a dichroic film that exhibits predetermined characteristics at a particular incidence angle, it is possible to reflect light in a predetermined wavelength band satisfactorily and transmit other light satisfactorily.

In the optical system disclosed in Japanese Patent Application Publication No. 2000-258725, in both of the regions of the dichroic surface that are struck by ON-light and OFF-light respectively, the characteristics with respect to light corresponding to the respective incidence angles are adjusted. Thus, when ON-light and OFF-light are incident at predetermined angles respectively, desired characteristics are exhibited so that satisfactory reflectances and transmittance can be obtained. However, it is not easy to divide into a plurality of regions and form a plurality of different dichroic films, and doing so is disadvantages also in terms of production cost. In addition, if given light is incident at a position away from a predetermined region, desired characteristics may not be obtained.

Thus, in a color splitting/combining prism, a dichroic surface is required not only to achieve satisfactory wavelength separation with respect to projection light as a principal light beam but also to achieve satisfactory wavelength separation even when struck by OFF-light with a larger incidence angle than projection light. In other words, a dichroic surface is required to achieve wavelength separation for all of a plurality of light beams that each have a different incidence angle and a predetermined spread angle.

In particular, in a case where high-output laser light is used, if OFF-light, which is incident at a still larger angle, becomes stray light, not only does light leaking in the direction of projection light degrade imaging performance, but also light reflected elsewhere than toward a prism optical surface may be absorbed by adhesive and the like, producing heat and hence unnecessary damage.

The present disclosure is directed to a projector provided with an illumination light source that radiates laser light and a color splitting/combining prism, and a color splitting/combining prism, and an optical system and a projector that employ it, that can reduce unnecessary reflected light, prevent damage to optical components and adhesive, suppress image degradation due to stray light, and enhance light use efficiency.

SUMMARY

According to one aspect of the present disclosure, a color splitting/combining prism is incorporated in a projector including: a laser light source that radiates laser light in a first wavelength range as a blue range, a second wavelength range as a green range, and a third wavelength range as a red range; an illumination optical system that directs illumination light emitted from the laser light source to an image display element; and a projection optical system that directs projection light from the image display element to a projection lens. The color splitting/combining prism has a function of splitting apart illumination light and combining together projection light. Moreover, the color splitting/combining prism lets a part of the illumination light that is not used as the projection light emerge as OFF-light via the image display element in a direction different from the projection light. Furthermore, the color splitting/combining prism includes a dichroic film of which the cutoff wavelength at which it exhibits a transmittance of 50% when splitting two different colors between reflection and transmission is provided in a wavelength range in which satisfactory wavelength separation is possible for all of the illumination light, the projection light, and the OFF-light that are incident at different incidence angles respectively. Moreover, let $\lambda_R$ be the oscillation wavelength for red, let $\lambda_G$ be the oscillation wavelength for green, and let $\lambda_{50}$ be the cutoff wavelength at which the dichroic film exhibits a transmittance of 50% when splitting two colors of red and green between reflection and transmission in the dichroic film characteristics observed with the projection light incident, then conditional formula (1) below is fulfilled:

$$0.2 \le (\lambda_R - \lambda_{50})/(\lambda_R - \lambda_G) \le 0.4 \quad (1).$$

According to another aspect of the present disclosure, a color splitting/combining prism includes a dichroic film in which let $\lambda_G$ be an oscillation wavelength for green, let $\lambda_B$ be an oscillation wavelength for blue, and let $\lambda_{50}$ be the cutoff wavelength at which the dichroic film exhibits a transmittance of 50% when splitting two colors of green and blue between reflection and transmission in dichroic film characteristics observed with the projection light incident, then conditional formula (2') below is fulfilled:

$$0.18 \le (\lambda_G - \lambda_{50})/(\lambda_G - \lambda_B) \le 0.22 \quad (2').$$

According to yet another aspect of the present disclosure, a color splitting/combining prism includes a dichroic surface on which a dichroic film is formed, the dichroic film being provided with a function of achieving wavelength separation, with respect to the central optical axis of the OFF-light, with a transmittance of 90% or more for light of wavelengths to be transmitted and with a transmittance of 5% or less for light of wavelengths to be reflected. Moreover, the incidence angle of the illumination light with respect to the dichroic surface is 39°±2°, the incidence angle of the projection light with respect to the dichroic surface is 28°±2° and the incidence angle of the OFF-light with respect to the dichroic surface is 58°±2°. Furthermore, let θ be the one-side spread angle of a light beam, then the f-number of the light beam as given by 1/(2 sin θ) is 2.5 or less.

According to still another aspect of the present disclosure, an optical system includes a color splitting/combining prism as described above.

According to a further aspect of the present disclosure, a projector includes a color splitting/combining prism as described above.

BRIEF DESCRIPTION OF THE DRAWINGS

FIG. 12 is a diagram showing the transmittance of Blue DF Practical Example 1-3;

FIG. 13 is a diagram showing the structure of Red DF Comparison Example 1;

FIG. 14 is a diagram showing the structure of Red DF Practical Example 1-1 (2-1);

FIG. 15 is a diagram showing the structure of Red DF Practical Example 1-2 (2-5);

FIG. 16 is a diagram showing the structure of Red DF Practical Example 1-3 (2-8);

FIG. 17 is a diagram showing the structure of Blue DF Comparison Example 1;

FIG. 18 is a diagram showing the structure of Blue DF Practical Example 1-1;

FIG. 19 is a diagram showing the structure of Blue DF Practical Example 1-2;

FIG. 20 is a diagram showing the structure of Blue DF Comparison Example 2;

FIG. 21 is a diagram showing the structure of Blue DF Practical Example 1-3

FIG. 22 is a diagram showing the structure of Red DF Practical Example 2-2;

FIG. 23 is a diagram showing the structure of Red DF Practical Example 2-3;

FIG. 24 is a diagram showing the structure of Red DF Practical Example 2-4;

FIG. 25 is a diagram showing the structure of Red DF Practical Example 2-6;

FIG. 26 is a diagram showing the structure of Red DF Practical Example 2-7;

FIG. 27 is a diagram showing the structure of Red DF Comparison Example 2;

FIG. 28 is a diagram showing the structure of Red DF Comparison Example 3;

FIG. 29 is a diagram showing the structure of Red DF Comparison Example 4;

FIG. 30 is a diagram showing the structure of Red DF Comparison Example 5;

FIG. 31 is a diagram showing the structure of Red DF Comparison Example 6;

FIG. 32 is a diagram showing the structure of Red DF Comparison Example 7;

FIG. 33 is a diagram showing the structure of Blue DF Practical Example 2-1;

FIG. 34 is a diagram showing the structure of Blue DF Practical Example 2-2;

FIG. 35 is a diagram showing the structure of Blue DF Practical Example 2-3;

FIG. 36 is a diagram showing the structure of Blue DF Practical Example 2-4;

FIG. 37 is a diagram showing the structure of Blue DF Practical Example 2-5;

FIG. 38 is a diagram showing the structure of Blue DF Practical Example 2-6;

FIG. 39 is a diagram showing the structure of Blue DF Practical Example 2-7;

FIG. 40 is a diagram showing the structure of Blue DF Practical Example 2-8;

FIG. 41 is a diagram showing the structure of Blue DF Comparison Example 3;

FIG. 42 is a diagram showing the structure of Blue DF Comparison Example 4;

FIG. 43 is a diagram showing the structure of Blue DF Comparison Example 5;

FIG. 44 is a diagram showing the structure of Blue DF Comparison Example 6;

FIG. 45 is a diagram showing the structure of Blue DF Comparison Example 7;

FIG. 46 is a diagram showing the structure of Blue DF Comparison Example 8; and

DETAILED DESCRIPTION

Embodiments of the present disclosure will be described below with reference to the accompanying drawings. These embodiments are not meant to limit the scope of the present disclosure in any way. The same components will be identified consistently by the same reference signs, and no overlapping description will be repeated unless necessary.

Figure 1:
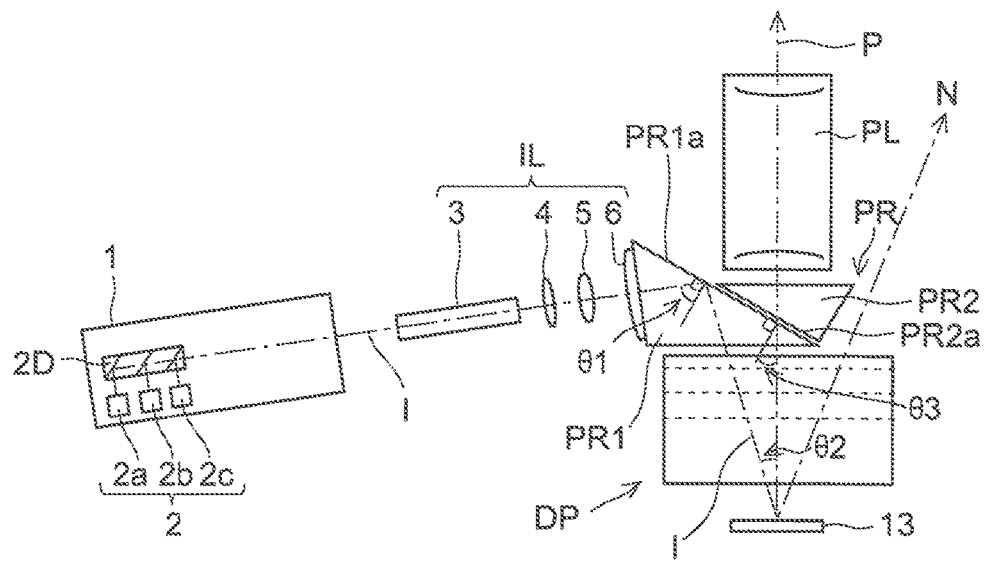
FIG. 1 is an outline illustrative diagram showing an outline of an optical system employing a color splitting/combining prism according to the present disclosure.

A color splitting/combining prism according to the present disclosure, and an optical system incorporating such a color splitting/combining prism, is, for example, an optical system for use in a projector, and is a color splitting/combining prism that can be suitably applied to a projector. It is one that can be suitably applied to a projector that uses laser light as an illumination light source. For example, as shown in FIG. 1, it includes an illumination optical system IL that directs illumination light I from an illumination light source 1 that radiates laser light, a projection optical system prism PR, a color splitting/combining prism DP, an image display element 13, and a projection optical system PL that directs projection light P from the image display element 13 to a projection screen.

The illumination light source 1 includes a laser light source 2 composed of semiconductor lasers of three primary colors, namely a blue laser light source 2a that emits blue light in a first wavelength range, a green laser light source 2b that emits green light in a second wavelength range, and a red laser light source 3c that emits light in a third wavelength range. The laser light from the plurality of light sources are integrated into a single beam of illumination light I via a light-combining means 2D. As the light-combining means 2D, a conventionally known device can be used, one example being a combination of dichroic mirrors that reflect light of different colors.

The illumination light I radiated from the illumination light source 1 travels through the illumination optical system IL, enters the projection optical system prism PR, is totally reflected on a first face PR1a toward the color splitting/combining prism DP, travels through the color splitting/combining prism DP, and is incident on the image display element 13. The light modulated by the image display element 13 exits from it, as projection light, toward the color splitting/combining prism DP, is transmitted through the color splitting/combining prism DP and then through the projection optical system prism PR, and is then projected via the projection optical system PL onto an unillustrated screen.

In one or more embodiments, as the image display element, a DMD is used. Accordingly, the following description assumes a DMD as the image display element. Specifically, the image display element 13 is a DMD 13. A DMD has a mirror surface composed of a huge number of mirror elements (micromirrors) arrayed on a substrate. The mirror elements of the DMD can each be inclined at ±12°. When inclined at 12° toward the optical axis of the illumination light I, they let the illumination light, which is incident at an incidence angle $\theta 2=24°$, emerge as projection light (ON-light) in a direction perpendicular to the DMD (in the optical axis direction of the projection light P); when inclined at 12° in the direction opposite from the optical axis of the illumination light I, they let the illumination light emerge as OFF-light N at an emergence angle of 48°. In this way, light modulation is achieved.

Here, the illumination optical system IL includes, for example, a rod integrator 3, a converging lens 4, and a relay lens 5. The laser light from the illumination light source 1 enters the rod integrator 3, and is repeatedly reflected inside it to emerge with an even light amount distribution. The light then travels through the converging lens 4 and then through the relay lens 5, and enters the projection optical system prism (total-reflection prism) PR via an entrance lens 6 arranged on the entrance side of the projection optical system prism PR.

The projection optical system prism PR is composed of a first prism PR1 and a second prism PR2, which are each substantially in the shape of a triangular prism, and has a first face PR1a on which the illumination light I is totally reflected. Through the first face PR1a, the projection light P is transmitted. The projection optical system prism PR also has a second face PR2a that faces the first face PR1a across an air gap. The projection light P that emerges from the first face PR1a is transmitted through the second face PR2a.

Thus, the projection optical system prism PR has a first face PR1a, on which the illumination light I is totally reflected and through which the projection light P is transmitted, and a second face PR2a, on which the projection light P is incident across an air gap and through which it is transmitted. The first face PR1a totally reflects the illumination light I and transmits the projection light P. This is achieved by setting the incidence angle $\theta 1$ of the illumination light I with respect to the first face PR1a equal to or larger than the total reflection angle and setting the incidence angle $\theta 3$ of the projection light P with respect to the first face PR1a smaller than the total reflection angle.

As described above, the projection optical system prism PR separates input light and output light from each other with respect to the DMD 13. The first prism PR1 totally reflects, on the first face PR1a, the illumination light I from the illumination optical system IL to make it enter the color splitting/combining prism DP.

In the color splitting/combining prism DP, the illumination light I is split apart into red, green, and blue light, and concurrently the light of the different colors modulated by the DMD 13 are combined together.

Figure 2:
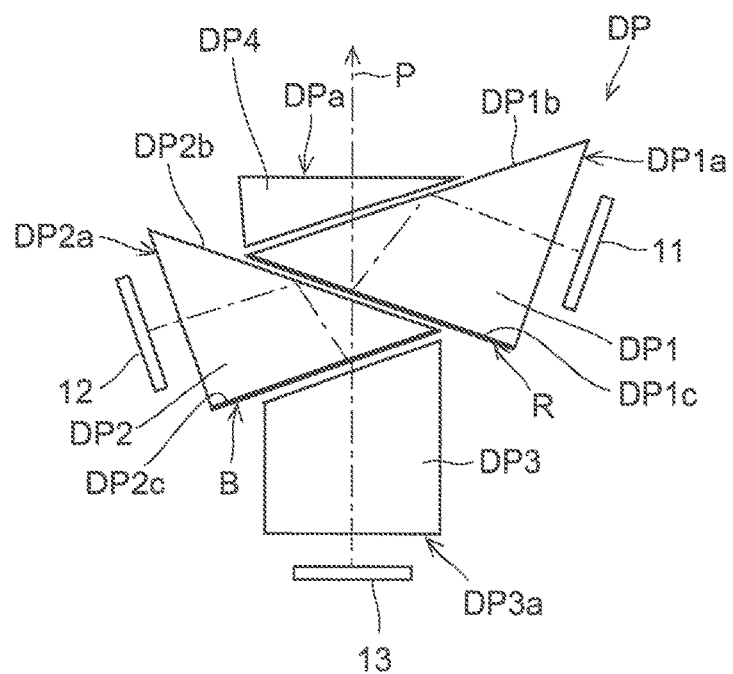
FIG. 2 is a vertical sectional view of a color splitting/combining prism provided in the optical system shown in FIG. 1.

Next, with reference to FIG. 2, one example of the color splitting/combining prism DP will be described. The color splitting/combining prism DP is composed of a combination of the following four prisms: a first prism DP1 and a second prism DP2, which are each substantially in the shape of a triangular prism with a triangular cross-section; a third prism DP3, which is substantially in the shape of a quadrangular prism with a quadrangular cross-section; and a clear prism DP4, which is substantially in the shape of a triangular prism. The face of the first prism DP1 that faces the second prism DP2 functions as a first dichroic surface DP1c, and on this face is formed a red dichroic film R that reflects red light. Between the first and second prisms DP1 and DP2, an air gap is provided. The face of the second prism DP2 that faces the third prism DP3 functions as a second dichroic surface DP2c, and on this face is formed a blue dichroic film B.

Also between the second and third prisms DP2 and DP3, an air gap is provided. Although, in one or more embodiments, a clear prism DP4 is used in the color splitting/combining prism DP, the use of the clear prism DP4 is optional.

Of the illumination light I that has entered the clear prism DP4 via its top face, namely an entrance/exit face DPa, red light is reflected on the red dichroic film R, while the other light, that is, blue and green light, is transmitted through it. The red light reflected from the red dichroic film R is totally reflected on a side face PD1b of the first prism DP1, exits from the first prism DP1 via an entrance/exit surface DP1a thereof, and illuminates a DMD 11 that is an image display element for red.

On the other hand, of the blue and green light that has been transmitted through the red dichroic film R, the blue light is reflected on the blue dichroic film B on the second prism DP2, and the green light is transmitted through it. The blue light that has been reflected from the blue dichroic film B is totally reflected on a side face DP2b of the second prism DP2, exits from the second prism DP2 via an entrance/exit face DP2a thereof, and illuminates a DMD 12 that is an image display element for blue. The green light that has been transmitted through the blue dichroic film B exits from the third prism DP3 via an entrance/exit face DP3a thereof, and illuminates a DMD 13 that is an image display element for green.

Next, a description will be given of the optical paths of the projection light from the individual image display elements (DMDs 11 to 13), that is, how light of different colors are combined together. The red projection light that has been reflected from the DMD 11 for red enters the first prism DP1 via its entrance/exit surface DP1a, is then totally reflected on the side face DP1b of the first prism DP1, and is then further reflected on the red dichroic film R. The blue projection light that has been reflected from the DMD 12 for blue enters the second prism DP2 via its entrance/exit face DP2a, is then totally reflected on the side face DP2b of the second prism DP2, and is then further reflected on the blue dichroic film B (the second dichroic surface DP2c). It is then transmitted through the red dichroic film R (first dichroic surface DP1c) on the first prism DP1. The green projection light that has been reflected from the DMD 13 for green enters the third prism DP3 via its entrance/exit face DP3a, and is transmitted through the blue dichroic film B and through the red dichroic film R.

The red, blue, and green projection light are then combined together into projection light P with a single optical axis, which then exits from the clear prism DP4 via its entrance/exit face DPa and then enters the projection optical system prism PR. Subsequently, the combined projection light P, which fulfills no total reflection condition with respect to any of the prisms in the projection optical system prism PR, is transmitted through the projection optical system prism PR and then through the air gap, and is then projected onto an unillustrated screen by the projection optical system PL, which is composed of a plurality of lenses, etc. Here, the lenses, etc. in the projection optical system PL are omitted from illustration.

As described above, in a color splitting/combining prism DP according to one or more embodiments, a first prism DP1 and a second prism DP2 are arranged to face each other across an air gap, the first and second prisms DP1 and DP2 each being a prism in the shape of triangular prism with a triangular cross-section. Across an air gap from the second prism DP2 is arranged a third prism DP3 in the shape of a quadrangular prism with a quadrangular cross-section. On the face of the first prism DP1 facing the second prism DP2, a red dichroic film R is formed. On the face of the second prism DP2 facing the third prism DP3, a blue dichroic film B is formed. With this construction, through the first prism DP1 in the shape of a triangular prism, light of a first color (red light) can be split off and added on; through the second prism DP2 likewise in the shape of a triangular prism, light of a second color (blue light) can be split off and added on; through the third prism DP3 in the shape of a quadrangular prism, the remaining light, that is, light of a third color (green light) can be directed.

In this way, through the color splitting/combining prism DP, which is composed of a first, a second, and a third prism DP1, DP2, and DP3, the laser light of three colors radiated from the illumination light source 1 can be split apart and then combined together to produce predetermined projection light P.

Figure 3:
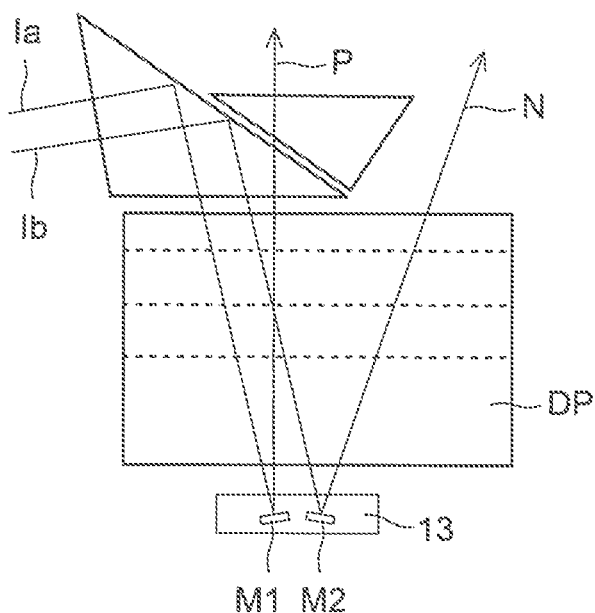
FIG. 3 is an enlarged illustrative diagram showing a part of the optical system, depicting ON-light and OFF-light.

Next, with reference to FIG. 3, a description will be given of how projection light P and OFF-light N are produced via DMDs. Each DMD (e.g., the DMD 13) has a mirror surface composed of a huge number of mirror elements arrayed on a substrate, and the direction in which the mirror elements M1 and M2 constituting the mirror surface reflect light can be switched between two directions independently for each mirror element.

According to pixel signals, mirror elements M1 that correspond to pixels at which light is to be projected are inclined into a position in which they reflect illumination light Ia as projection light P (ON-light). ON-light of different colors are combined together by the color splitting/combining prism DP, are then transmitted through the projection optical system prism PR, and then enter the projection lens.

On the other hand, mirror elements M2 that correspond to unnecessary pixels are inclined into an opposite position, where they reflect illumination light Ib as OFF-light N. Reflected light (OFF-light N) of different colors are combined together by the color splitting/combining prism DP, and are then, as they leave the prism via its front face, directed off the projection optical path. Thus, on the screen, ON-light of different colors form an image.

The dichroic films B and R are each composed of a dielectric multiple-layer film having a plurality of dielectric thin films stacked on each other. The dielectric multiple-layer film can be formed by a conventionally known process, such as vacuum deposition, IAD (ion-assisted deposition), IP (ion plating), or sputtering. Conventionally available common dichroic films are composed of a dielectric multiple-layer film that is designed to reduce wavelength-average reflectance with respect to all light within a transmitted wavelength range. However, in cases where a laser light source is adopted as the illumination light source 1, it suffices to use a dielectric multiple-layer film that mainly reduces wavelength-average reflectance in a predetermined wavelength band.

For example, it may be preferable that the laser light radiated from the illumination light source 1 cover the following wavelength ranges: as a blue range, a first wavelength range of 440 to 470 nm; as a green range, a second wavelength range of 520 to 550 nm; and, as a red range, a third wavelength range of 630 to 660 nm. With this configuration, it is possible to use not only semiconductor lasers and LEDs that emit light in predetermined wavelength ranges but also various laser light sources that are obtained by converting the wavelength of the output of semiconductor lasers by use of non-linear crystals.

For example, for a blue laser light source, it is common to use around 445 nm of a blue semiconductor laser, or 465 nm resulting from wavelength conversion of a 930 nm semiconductor laser by use of a non-linear crystal; for green, it is common to use around 525 nm or around 545 nm of a green semiconductor laser, or 532 nm resulting from wavelength conversion of 1064 nm laser light by use of a non-linear crystal; for red, it is common to use a wavelength band around 630 to 660 nm of a red semiconductor laser.

Accordingly, in one or more embodiments, use is made of a red dichroic film R that reflects red light in the third wavelength range of 630 to 660 nm and that transmits light in the first wavelength range of 440 to 470 nm and in the second wavelength range of 520 to 550 nm, in combination with a dichroic film B that reflects blue light in the first wavelength range of 440 to 470 nm and that transmits light in the second wavelength range of 520 to 550 nm and in the third wavelength range of 630 to 660 nm.

Since a dichroic surface is composed of a dielectric multiple-layer film as mentioned above, its characteristics shift to a shorter-wavelength side with increase in the incidence angle of incident light. Thus, ON-light, which is incident at a predetermined incidence angle, is reflected on the dichroic film. On the other hand, OFF-light, which is incident at a different incidence angle from ON-light, is transmitted; in addition, if the opposite phenomenon occurs, OFF-light may be partly directed elsewhere than toward the prism front face, or even ON-light may be directed off the projection optical path. Such light becomes stray light.

Since laser light is extremely intense, stray laser light may damage adhesive and components nearby. Even without such damage, stray light is directed to the projection lens to cause ghosts and low contrast.

Figure 4:
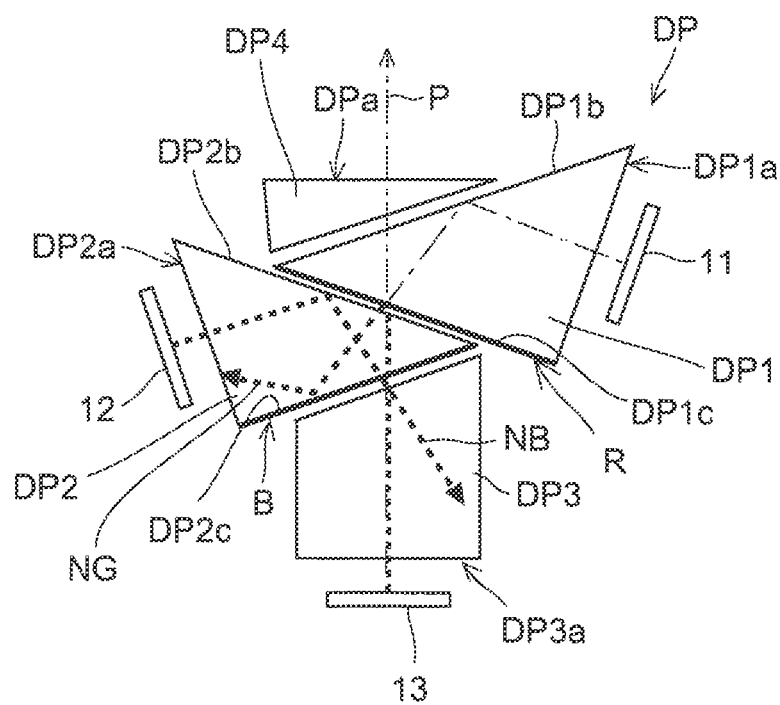
FIG. 4 is a vertical sectional view of a color splitting/combining prism, depicting an example of stray light.

Next, with reference to FIG. 4, a description will be given of an example of stray light that is produced in a color splitting/combining prism DP provided with a conventionally configured dichroic film.

The illumination light that has entered the color splitting/combining prism DP travels through the clear prism DP4 and enters the first prism DP1. By the red dichroic film R (first dichroic surface DP1c), red light in the third wavelength range of 630 to 660 nm is reflected to be directed to the DMD 11 for red, where it is then reflected in predetermined directions as ON-light and OFF-light.

Here, in the four-prism construction including the clear prism DP4 according to one or more embodiments, the incidence angle of the illumination light with respect to the red dichroic film R is about 39°, the incidence angle of the ON-light with respect to the red dichroic film R is about 28°, and the incidence angle of the OFF-light with respect to the red dichroic film R is about 58°.

Blue light in the first wavelength range of 440 to 470 nm and green light in the second wavelength range of 520 to 550 nm are transmitted through the red dichroic film R, and enter the second prism DP2. By the blue dichroic film B (second dichroic surface DP2c), the blue light in the first wavelength range is reflected to be directed to the DMD 12 for blue, where it is then reflected in predetermined directions as ON-light and OFF-light.

Here, in one or more embodiments, the incidence angle of the illumination light with respect to the blue dichroic film B is about 39°, the incidence angle of the ON-light with respect to the blue dichroic film B is about 28°, and the incidence angle of the OFF-light with respect to the blue dichroic film B is about 58°. These angles are all largely constant, but allow for an adjustment margin of +2°.

The OFF-light is incident on the blue dichroic film B at about 58°; at this angle, about one-half of blue light around 470 nm is transmitted through the blue dichroic film B to become stray light NB, which then enters the third prism DP3, as the present inventors have found out.

On the other hand, the green light in the second wavelength range of 520 to 550 nm that has been transmitted through the first and second prisms DP1 and DP2 and has entered the third prism DP3 is directed by the DMD 13 for green to be reflected in predetermined directions as ON-light and OFF-light.

Here, in one or more embodiments, the incidence angle of the ON-light with respect to the blue dichroic film B and with respect to the red dichroic film R is about 28°, and the incidence angle of the OFF-light with respect to the blue dichroic film B and with respect to the red dichroic film R is about 58°.

The green OFF-light is incident on the blue dichroic film B at about 58°; at this angle, close to one-half of green light around 540 to 550 nm is reflected on the red dichroic film R to become stray light NG, which is then radiated into the second prism DP2, as the present inventors have found out.

The above inconvenience results from the conventionally configured dichroic film having angle dependence. Moreover, in a color splitting/combining prism for conventional projectors using white light, the dichroic film is designed to have such characteristics as to maximize the range of colors that can be reproduced when an image is projected onto a screen; accordingly, between wavelength bands to be split from each other, the wavelength at which the transmittance in the projection optical path is 50% (i.e., the cutoff wavelength) is set, for a blue dichroic film B, around 500 to 510 nm and, for a red dichroic film R, around 590 to 600 nm. Now, a description will be given of the angle dependence of such a conventionally configured dichroic film with reference to FIGS. 5 and 6.

Figure 5:
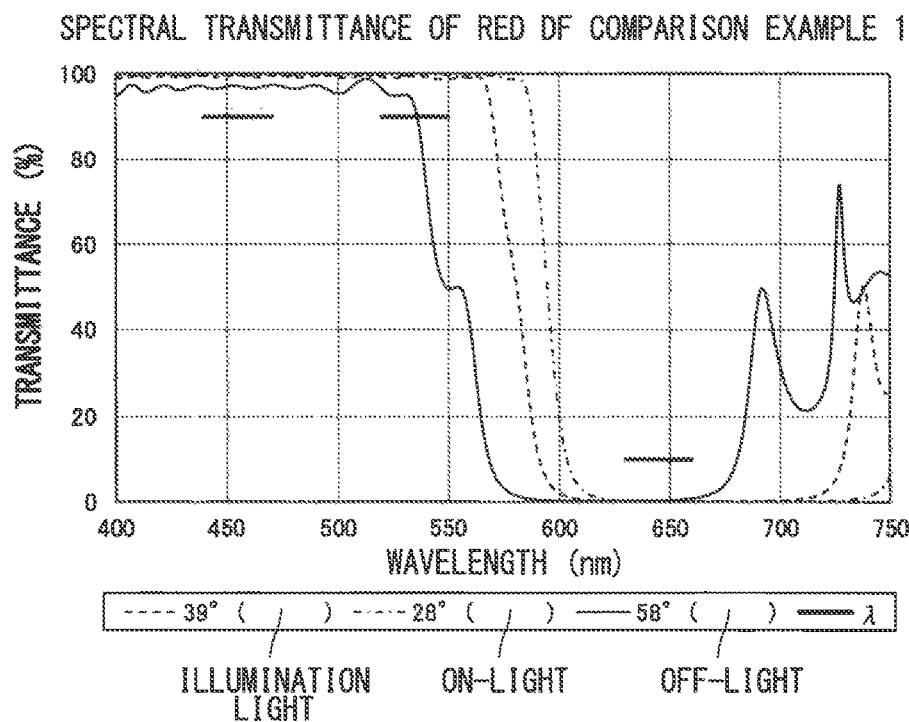
FIG. 5 is a diagram showing the transmittance of Red DF Comparison Example 1 as a conventional example.

FIG. 5 shows, with respect to a conventionally configured red dichroic film R (Red DF Comparison Example 1), plots of transmittance versus wavelength (spectral transmittance) for light incident at incidence angles of 39° (corresponding to illumination light), 28° (corresponding to ON-light), and 58° (corresponding to OFF-light) respectively, the horizontal axis representing wavelength in nm and the vertical axis representing transmittance in %. The film configuration of Red DF Comparison Example 1 is shown in FIG. 13.

As shown in FIG. 13, Red DF Comparison Example 1 according to one or more embodiments has, stacked on top of a prism base (substrate glass): layers of $Al_2O_3$ with a refractive index of 1.63 as a first, a third, and subsequent odd-numbered layers up to a 25th; layers of $Nb_2O_5$ with a refractive index of 2.38 as a second, a fourth, and subsequent even-numbered layers up to a 26th; and a layer of $SiO_2$ with a refractive index of 1.47 as a 27th, outermost layer.

FIG. 13 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

The transmittance of the dichroic film is measured at incidence angles of 39° corresponding to illumination light, 28° corresponding to projection light, and 58° corresponding to OFF-light. The results are shown in FIG. 5.

As will be understood from FIG. 5, the conventional red dichroic film R having the film configuration shown in FIG. 13 behaves with green light in the second wavelength range of 520 to 550 nm as follows: it satisfactorily transmits all light with incidence angles of 28° corresponding to ON-light and 39° corresponding to illumination light; however, light with an incidence angle of 58° corresponding to OFF-light falls in a border region where transmittance varies, and thus, as mentioned earlier, it transmits only about one-half of green light around 540 to 550 nm and reflects the rest, close to one-half, of the light.

Figure 6:
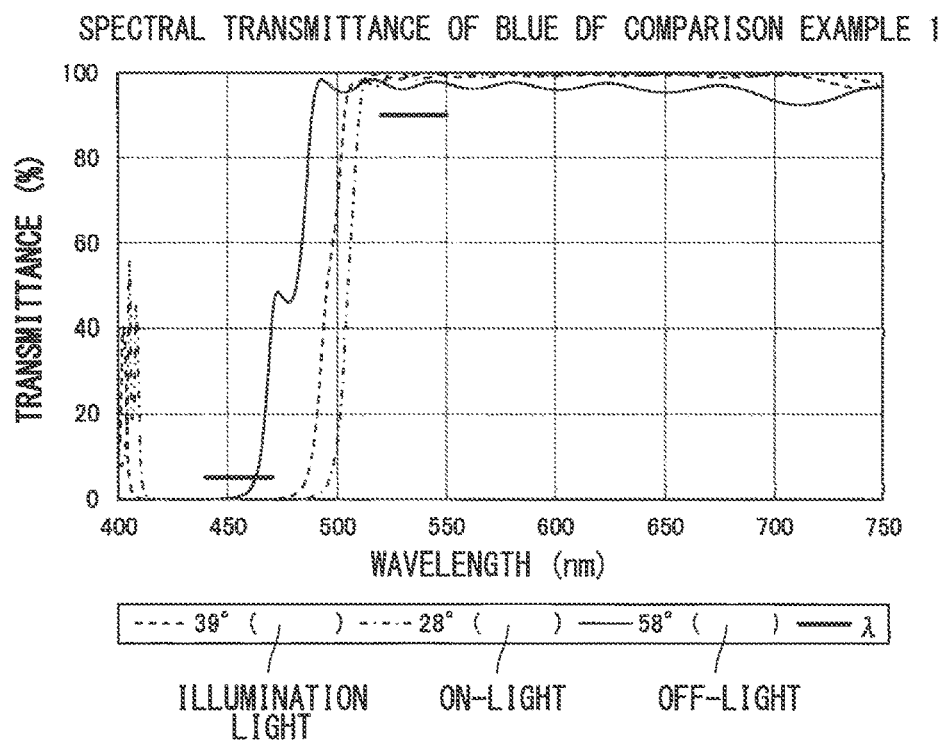
FIG. 6 is a diagram showing the transmittance of Blue DF Comparison Example 1 as a conventional example.

Next, with reference to FIGS. 6 and 17, a conventional blue dichroic film will be described. FIG. 6 shows, with respect to a conventionally configured blue dichroic film B (Blue DF Comparison Example 1), plots of transmittance versus wavelength (spectral transmittance) for light incident at incidence angles of 39° (corresponding to illumination light), 28° (corresponding to ON-light), and 58° (corresponding to OFF-light) respectively, the horizontal axis representing wavelength in nm and the vertical axis representing transmittance in %. The film configuration of Blue DF Comparison Example 1 is shown in FIG. 17.

As shown in FIG. 17, Blue DF Comparison Example 1 according to one or more embodiments has, stacked on top of a prism base (substrate glass): layers of $TiO_2$ with a refractive index of 2.47 as a first, a third, and subsequent odd-numbered layers up to a 29th; layers of $La_{0.5}Al_{1.5}O_3$ with a refractive index of 1.74 as a second, a fourth, and subsequent even-numbered layers up to a 28th; and a layer of $SiO_2$ with a refractive index of 1.47 as a 30th, outermost layer.

FIG. 17 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

The transmittance of the dichroic film is measured at incidence angles of 39° corresponding to illumination light, 28° corresponding to projection light, and 58° corresponding to OFF-light. The results are shown in FIG. 6.

As will be understood from FIG. 6, the conventional blue dichroic film B having the film configuration shown in FIG. 17 behaves with blue light in the first wavelength range of 440 to 470 nm as follows: it exhibits a transmittance of approximately 0 to, and thus satisfactorily reflects all, light with incidence angles of 28° corresponding to ON-light and 39° corresponding to illumination light; however, light with an incidence angle of 58° corresponding to OFF-light falls in a border region where transmittance varies, and thus, as mentioned earlier, it transmits about 40 to 50% of blue light around 470 nm and reflects the rest, one-half, of the light.

Thus, when an illumination light source that radiates laser light is used in a projector provided with a color splitting/combining prism including conventional dichroic films, if the oscillation wavelengths of the blue and green light used in it are displaced to a longer-wavelength side, the above-mentioned inconvenience due to stray light occurs.

In an actual optical system, there is light that is spread over a spread angle corresponding to the f-number of the optical system. Thus, in a projector optical system that employs a DMD including mirror elements inclined at ±120, assuming that the light beam has a spread angle θ on either side, the f-number is given by 1/(2 sin θ), which is equivalent to ±11.50 in terms of angles. This means a higher risk of degraded separation in outermost light in ON-light on a small-angle side, resulting in low contrast, and a higher risk of outermost light in OFF-light on a large-angle side becoming stray light.

Figure 7:
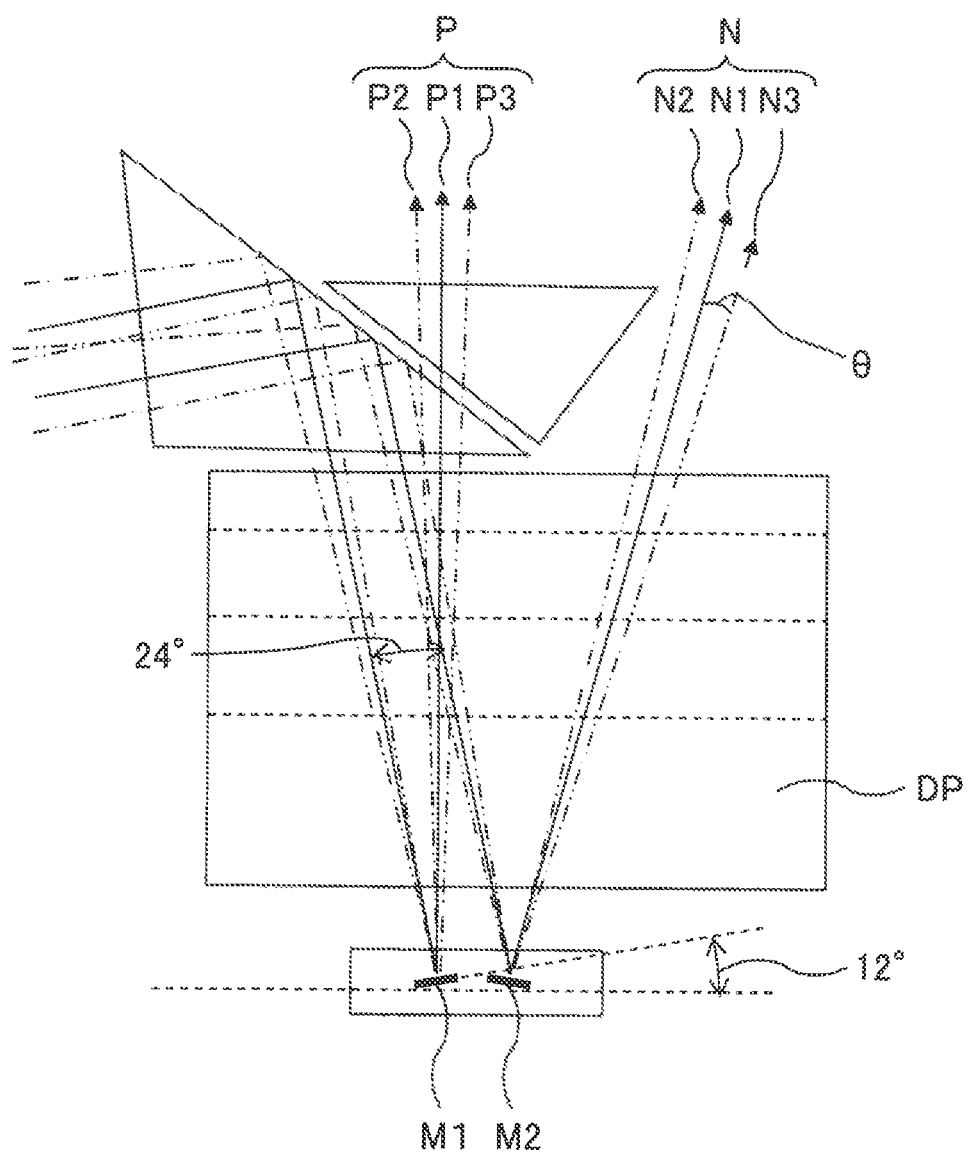
FIG. 7 is an enlarged illustrative diagram showing the spread of ON-light and OFF-light.

For example, as shown in FIG. 7, when illumination light is deflected by 24° via a mirror element M1, the projection light P that emerges in a perpendicular direction includes a principal ray P1 along with outermost rays P2 and P3 that are spread over a predetermined angle. On the other hand, OFF-light that emerges, via a mirror element M2, in a different direction from the projection light P includes a principal ray N1 along with outermost rays N2 and N3 that are spread over a predetermined angle. Thus, the principal ray N1 and the outermost ray N3 are spread relative to each other over a one-side spread angle θ of about 11.5°. This variation in incidence angle causes variation in transmittance and in reflectance.

To avoid that, in the optical system employing DMDs according to one or more embodiments, the splitting-apart and combining-together of a whole light beam with an f-number of 2.5 is made possible by forming an air gap surface including a dichroic surface with an inclination of 18° relative to the projection optical axis so that the incidence angle of the light beam with respect to each dichroic surface is 39° for illumination light, 28° for projection light, and 58° for OFF-light. With an f-number of 2.5 taken into consideration, the minimum incidence angle is 16.5° (28°-11.5°) for outermost light in ON-light (projection light P), and the maximum incidence angle is 69.5° (58°+11.5°) for outermost light in OFF-light.

Next, a first example and then a second example will be described.

First Example

In the first example, there is provided a dichroic surface on which a dichroic film is formed whose cutoff wavelength at which it exhibits a transmittance of 50% when splitting two different colors between reflection and transmission is provided in a wavelength range in which satisfactory wavelength separation is possible for all of illumination light, projection light, and OFF-light that are incident at different angles respectively.

A laser light source radiates light in a predetermined wavelength range; it is thus clear that a first wavelength range as a blue range, a second wavelength range as a green range, and a third wavelength range as a red range each have a unique wavelength range and include almost no light in any other wavelength range. It is also clear that the optical paths of illumination light I, projection light P, and OFF-light N that reach the same dichroic surface has different incidence angles, and thus the incidence angle of OFF-light N that is incident on a dichroic surface optimized for the incidence angle of projection light P, which is the principal light, is deviated greatly. Thus, by providing a dichroic film that exhibits, even to light beams incident at incidence angles larger than that of the projection light P, appropriate transmittance and reflectance that suit the wavelength ranges of three colors, it is possible to form a color splitting/combining prism DP that satisfactorily transmits a light beam to be transmitted and that satisfactorily reflects a light beam to be reflected so as not to produce stray light.

For example, it is possible to provide a dichroic film that has a function of achieving wavelength separation with a transmittance of 90% or more for light of wavelengths to be transmitted and with a transmittance of 5% or less for light of wavelengths to be reflected. In other words, it can be said that there is provided a dichroic film that can exert a function of achieving wavelength separation, for each of the optical paths of illumination light I, projection light P, and OFF-light N containing light in a first wavelength range as a blue range, a second wavelength range as a green range, and a third wavelength range as a red range, with a transmittance of 90% or more for wavelengths to be transmitted and with a transmittance of 5% or less for light of wavelengths to be reflected.

Thus, it is possible to obtain, in an optical system including a illumination light source 1 that radiates laser light and a color splitting/combining prism DP, a color splitting/combining prism DP that includes a dichroic surface that can achieve satisfactory wavelength separation for all of illumination light I, projection light P, and OFF-light N. That is, a color splitting/combining prism DP according to this one or more embodiments can achieve satisfactory wavelength separation for all of illumination light I, projection light P, and OFF-light N, and can suppress adverse effects of unnecessary reflected light and stray light, thereby to enhance light use efficiency.

The amount of wavelength shift due to angle dependence of a dichroic film increases in proportion to wavelengths of interest. For example, in a case where use is made of blue light in a first wavelength range of 440 to 470 nm, green light in a second wavelength range of 520 to 550 nm, and red light in a third wavelength range of 630 to 660 nm, the intervals between the wavelength ranges are, between blue and green, 50 nm spanning from 470 to 520 nm and, between green and red, 80 nm spanning from 550 to 630.

Thus, the tolerated amount of wavelength shift is, between blue and green, 50 nm for light of a wavelength of 520 nm, accounting for 9.6%; between green and red, it is 80 nm for light of a wavelength of 630 nm, accounting for 12.7%.

Thus, the blue dichroic film B, which has a function of splitting/combining between blue and green, has the lower tolerance for the amount of wavelength shift, and thus poses greater difficulty in film designing. By contrast, the red dichroic film R, which has a function of splitting/combining between green and red, has the higher tolerance for the amount of wavelength shift, and thus poses less difficulty in film designing.

Accordingly, in one or more embodiments, a red dichroic film R that reflects red light and transmits blue and green light and a blue dichroic film B that reflects blue light and transmits green light are arranged in this order from the illumination light entrance side. With this construction, on a prism face that is required to transmit two of the three colors that compose illumination light, a red dichroic film that has a high tolerance for the amount of wavelength shift and that poses less difficulty in film designing is provided, and on a prism face that is required to transmit only one of the remaining two colors, a blue dichroic film B that has a low tolerance for the amount of wavelength shift and that poses more difficulty in film designing is provided. This facilitates optical designing. That is, a prism face that has only to reflect one color and transmit one color can be assigned the stricter tolerance, and this facilitates optical designing.

To form a dichroic film of which the cutoff wavelength at which it exhibits a transmittance of 50% is provided in a wavelength range where satisfactory wavelength separation is possible for all of illumination light, projection light, and OFF-light that are incident at different angles respectively, a dichroic film corresponding to the red dichroic film R according to one or more embodiments is formed to fulfill conditional formula (1) below, where $\lambda_R$ represents the oscillation wavelength for red, $\lambda_G$ represents the oscillation wavelength for green, and $\lambda_{50}$ represents the wavelength at which the dichroic film exhibits a transmittance of 50% when splitting two colors of red and green between reflection and transmission in the characteristics of the dichroic film as observed when projection light is incident.

$$0.2 \leq (\lambda_R - \lambda_{50})/(\lambda_R - \lambda_G) \leq 0.4 \quad (1)$$

With a construction including a dichroic film that fulfills conditional formula (1), the difference between the oscillation wavelength for red and the cutoff wavelength is smaller than the difference between the oscillation wavelength for red and the oscillation wavelength for green; the cutoff wavelength is thus set nearer to the oscillation wavelength for red, that is, displaced to the longer wavelength side. That is, even with a dichroic surface on which a dichroic film is formed whose characteristics shift to the shorter-wavelength side as the incidence angle of light increases, by previously setting its cutoff wavelength in a predetermined longer wavelength range, it is possible to achieve a configuration that can reliably split apart red and green light. Thus, it is possible to reduce unnecessary reflected light, prevent damage to optical components and adhesive, suppress image degradation due to stray light, and enhance light use efficiency.

On the other hand, a dichroic film corresponding to the blue dichroic film B according to one or more embodiments is formed to fulfill conditional formula (2) below, where $\lambda_G$ represents the oscillation wavelength for green, $\lambda_B$ represents the oscillation wavelength for blue, and $\lambda_{50}$ represents the wavelength at which the dichroic film exhibits a transmittance of 50% when splitting two colors of green and blue between reflection and transmission in the characteristics of the dichroic film as observed when projection light is incident. That is, this dichroic film is formed to fulfill conditional formula (2') below.

$$(\lambda_G - \lambda_{50})/(\lambda_G - \lambda_B) = 0.2 \pm 0.02 \quad (2)$$

$$0.18 \leq (\lambda_G - \lambda_{50})/(\lambda_G - \lambda_B) \leq 0.22 \quad (2')$$

With a construction including a dichroic film that fulfills conditional formula (2) (i.e., conditional formula (2')), the difference between the oscillation wavelength for green and the cutoff wavelength is smaller than the difference between the oscillation wavelength for green and the oscillation wavelength for blue; the cutoff wavelength is thus set nearer to the oscillation wavelength for green, that is, displaced to the longer wavelength side. That is, even with a dichroic surface on which a dichroic film is formed whose characteristics shift to the shorter-wavelength side as the incidence angle of light increases, by previously setting its cutoff wavelength in a predetermined longer wavelength range, it is possible to achieve a configuration that can reliably split apart green and blue light. Thus, it is possible to reduce unnecessary reflected light, prevent damage to optical components and adhesive, suppress image degradation due to stray light, and enhance light use efficiency.

Next, practical examples and comparison examples of the red dichroic film R (Red DF) that reflects red light and practical examples and comparison examples of the blue dichroic film B (Blue DF) that reflects blue light will be described one by one. These reflective films are formed, by use of BK7 manufactured by Schott as substrate glass, by an IAD process under the heat of 150° C.

Red DF Practical Example 1-1

Figure 8:
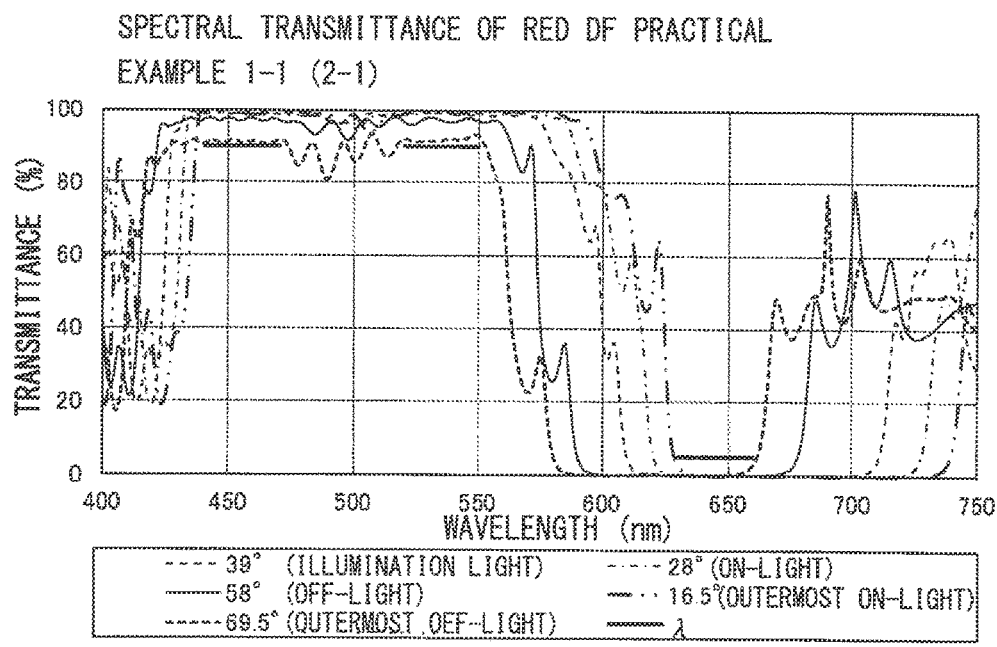
FIG. 8 is a diagram showing the transmittance of Red DF Practical Example 1-1 (2-1) according to the present disclosure.

First, with reference to FIGS. 8 and 14, Red DF Practical Example 1-1 according to one or more embodiments (corresponding to a dichroic film R according to the present disclosure) will be described. FIG. 14 shows the structure of the dichroic film, and FIG. 8 shows the spectral transmittance of the dichroic film.

As shown in FIG. 14, Red DF Practical Example 1-1 (the red dichroic film R) according to one or more embodiments has, stacked on top of a prism base (substrate glass); layers of $La_{0.9}Al_{1.1}O_3$ with a refractive index of 1.85 as a first, a third, and subsequent odd-numbered layers up to a 49th; layers of $TiO_2$ with a refractive index of 2.47 as a second, a fourth, and subsequent even-numbered layers up to a 50th; and a layer of $SiO_2$ with a refractive index of 1.47 as a 51st, outermost layer.

FIG. 14 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

The transmittance of the dichroic film is measured at incidence angles of 39° corresponding to illumination light, 28° corresponding to projection light, and 58° corresponding to OFF-light. Each light beam has a spread of ±11.5°, and thus the transmission is measured also at 28°−11.5°=16.5° (corresponding to outermost light in ON-light) and at 58°+11.5°=69.5° (corresponding to outermost light in OFF-light) The results are shown in FIG. 8. In FIG. 8, the horizontal axis represents a wavelength range from 400 to 750 nm, and the vertical axis represents transmittance from 0 to 100%.

That is, FIG. 8 shows transmittances at different wavelengths for incident light with incidence angles of 28° (corresponding to projection light), 39° (corresponding to illumination light), and 58° (corresponding to OFF-light) and also for outermost light in ON-light (with an incidence angle of 16.5°) and outermost light in OFF-light (with an incidence angle of 69.5°), the horizontal axis representing wavelength in nm and the vertical axis representing transmittance in %.

From the results shown in FIG. 8, it is seen that Red DF Practical Example 1-1 exhibits a transmittance of 5% or less to all light with respect to light in the third wavelength range of 630 to 660 nm to be reflected. To light in the second wavelength range of 520 to 550 nm and in the first wavelength range of 440 to 470 nm to be transmitted, it exhibits a transmittance of 95% or more to OFF-light with an incidence angle of 58° and a transmittance of 90% or more even to outermost light in OFF-light with an incidence angle of 69.5°. It is thus seen that it exhibits a transmittance of 90% or more to all light to be transmitted.

Thus, the following is now clear: when this dichroic film is applied to laser light, even if there is OFF-light that is incident at an angle larger than the incidence angle of ON-light to serve as projection light and that is spread over a predetermined angle corresponding to the f-number 2.5 of the optical system, red light in the third wavelength range of 630 to 660 nm is reflected satisfactorily with a transmittance of 5% or less, and blue light in the first wavelength range of 440 to 470 nm and green light in the second wavelength range of 520 to 550 nm are transmitted satisfactorily with a transmittance of 90% or more across the entire range of incidence angles.

A description will now be given of Red DF Practical Example 1-2 and Red DF Practical Example 1-3, which provide a similar effect to Red DF Practical Example 1-1.

Red DF Practical Example 1-2

FIG. 15 shows the structure of a dichroic film of Red DF Practical Example 1-2 (corresponding to a red dichroic film R according to the present disclosure). As shown in FIG. 15, Red DF Practical Example 1-2 has, stacked on top of a prism base (substrate glass): layers of $Nb_2O_5$ with a refractive index of 2.38 as a first, a third, and subsequent odd-numbered layers up to a 51st; layers of $La_{0.5}Al_{1.5}O_3$ with a refractive index of 1.74 as a second, a fourth, and subsequent even-numbered layers up to a 50th; and a layer of $SiO_2$ with a refractive index of 1.47 as a 52nd, outermost layer.

FIG. 15 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

It has been found that a dichroic film R comprising Red DF Practical Example 1-2, like Red DF Practical Example 1-1, can split apart red, green, and blue laser light more reliably. Its specific effects will be described later.

Red DF Practical Example 1-3

FIG. 16 shows the structure of a dichroic film of Red DF Practical Example 1-3 (corresponding to a red dichroic film R according to the present disclosure). As shown in FIG. 16, Red DF Practical Example 1-3 has, stacked on top of a prism base (substrate glass): layers of $Nb_2O_5$ with a refractive index of 2.38 as a first, a third, and subsequent odd-numbered layers up to a 55th; and layers of $SiO_2$ with a refractive index of 1.47 as a second, a fourth, and subsequent even-numbered layers up to a 54th, and as a 56th, outermost layer.

FIG. 16 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

It has been found that a dichroic film R comprising Red DF Practical Example 1-3, like Red DF Practical Example 1-1, can split apart red, green, and blue laser light more reliably. Its specific effects will be described later.

Blue DF Practical Example 1-1

Figure 9:
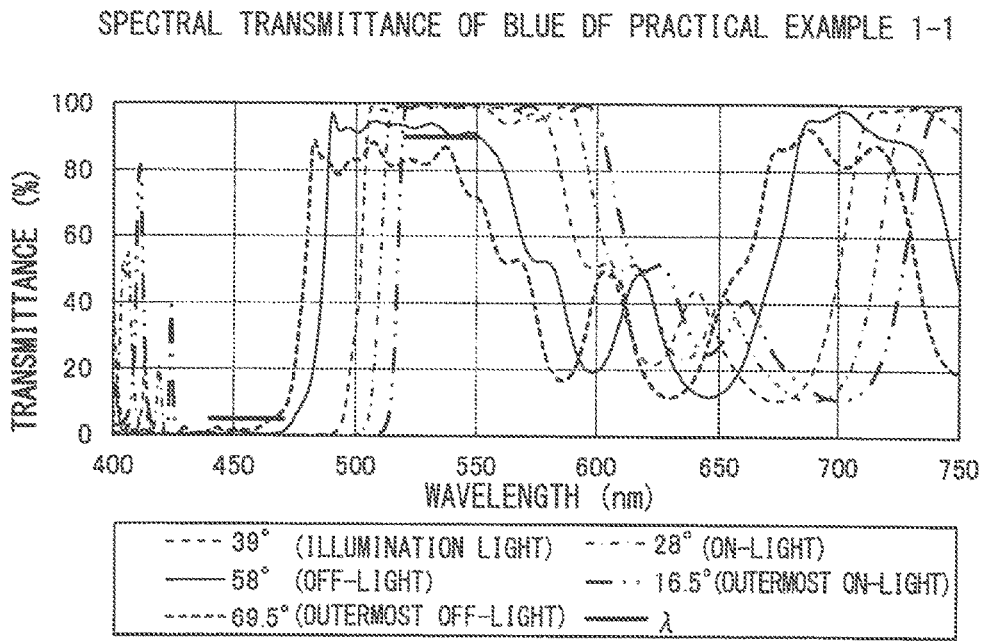
FIG. 9 is a diagram showing the transmittance of Blue DF Practical Example 1-1 according to the present disclosure.

Next, with reference to FIGS. 9 and 18, Blue DF Practical Example 1-1 according to one or more embodiments (corresponding to a dichroic film B according to the present disclosure) will be described. FIG. 18 shows the film structure of Blue DF Practical Example 1-1, and FIG. 9 shows the spectral transmittance of Blue DF Practical Example 1-1.

As shown in FIG. 18, Blue DF Practical Example 1-1 according to one or more embodiments has, stacked on top of a prism base (substrate glass): layers of $Nb_2O_5$ with a refractive index of 2.38 as a first, a third, and subsequent odd-numbered layers up to a 43rd; layers of $La_{0.5}Al_{1.5}O_3$ with a refractive index of 1.74 as a second, a fourth, and subsequent even-numbered layers up to a 42nd; and a layer of $SiO_2$ with a refractive index of 1.47 as a 44th, outermost layer.

FIG. 18 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

The transmittance of Blue DF Practical Example 1-1 is measured, in a similar manner as described above, at incidence angles of 39° corresponding to illumination light, 28° corresponding to projection light, 58° corresponding to OFF-light, 16.5° corresponding to outermost light in ON-light, and 69.5° corresponding to outermost light in OFF-light. The results are shown in FIG. 9.

FIG. 9 shows, with respect to Blue DF Practical Example 1-1 having the film structure shown in FIG. 18, transmittances at different wavelengths at incidence angles of 28° (corresponding to ON-light), 39° (corresponding to illumination light), 58° (corresponding to OFF-light), 16.5° (corresponding to outermost light in ON-light), and 69.5° (corresponding to outermost light in OFF-light), the horizontal axis representing wavelength in nm and the vertical axis representing transmittance in %.

From the results shown in FIG. 9, it is seen that Blue DF Practical Example 1-1 exhibits a transmittance of 5% of less to light in the first wavelength range of 440 to 470 nm to be reflected, except light at 69.5°, exhibiting a transmittance slightly over 5% to light at 69.5°. It is also seen that it exhibits a transmittance of 90% or more to light in the second wavelength range of 520 to 550 nm to be transmitted, except light at 69.5°, exhibiting a transmittance of 70 to 90% to light at 69.5°.

Thus, the following is now clear: when this dichroic film is applied to laser light, even if there is OFF-light that is spread over a predetermined angle corresponding to the f-number of the optical system, blue light in the first wavelength range of 440 to 470 nm is reflected satisfactorily with a transmittance of 5% or less, and green light in the second wavelength range of 520 to 550 nm, except light with an incidence angle of 69.5°, is transmitted satisfactorily with a transmittance of 90% or more.

Blue DF Practical Example 1-2

FIG. 19 shows the structure of a dichroic film of Blue DF Practical Example 1-2 (corresponding to a blue dichroic film B according to the present disclosure). As shown in FIG. 19, Blue DF Practical Example 1-2 has, stacked on top of a prism base (substrate glass): layers of $Nb_2O_5$ with a refractive index of 2.38 as a first, a third, and subsequent odd-numbered layers up to a 43rd; layers of $Al_2O_3$ with a refractive index of 1.63 as a second, a fourth, and subsequent even-numbered layers up to a 42nd; and a layer of $SiO_2$ with a refractive index of 1.47 as a 44th, outermost layer.

FIG. 19 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

It has been found that a dichroic film B comprising Blue DF Practical Example 1-2, like Blue DF Practical Example 1-1, can split apart red, green, and blue laser light more reliably. Its specific effects will be described later.

Figure 10:
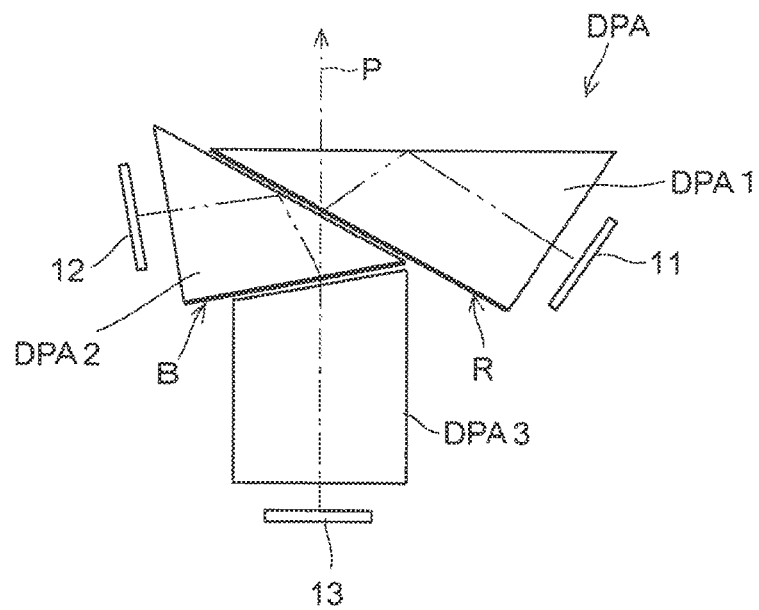
FIG. 10 is a vertical sectional view of a color splitting/combining prism composed of three prisms.

The incidence angles of different light beams vary also according to whether the color splitting/combining prism is composed of three or four prisms. For example, in the case of a color splitting/combining prism DPA as shown in FIG. 10 that is provided with no clear prism DP4 as mentioned earlier, the incidence angles with respect to a first dichroic film (red dichroic film R) formed on the face of a first prism DPA1 facing a second prism DPA2 are, in terms of air-side angles, about 55° for illumination light, about 46° for ON-light, and about 77° for OFF-light.

On the other hand, the incidence angles with respect to a second dichroic film (blue dichroic film B) formed on the face of the second prism DPA2 facing a third prism DPA3 are, in terms of air-side angles, about 31° for illumination light, about 17° for ON-light, and about 52° for OFF-light.

Blue DF Comparison Example 2

Figure 11:
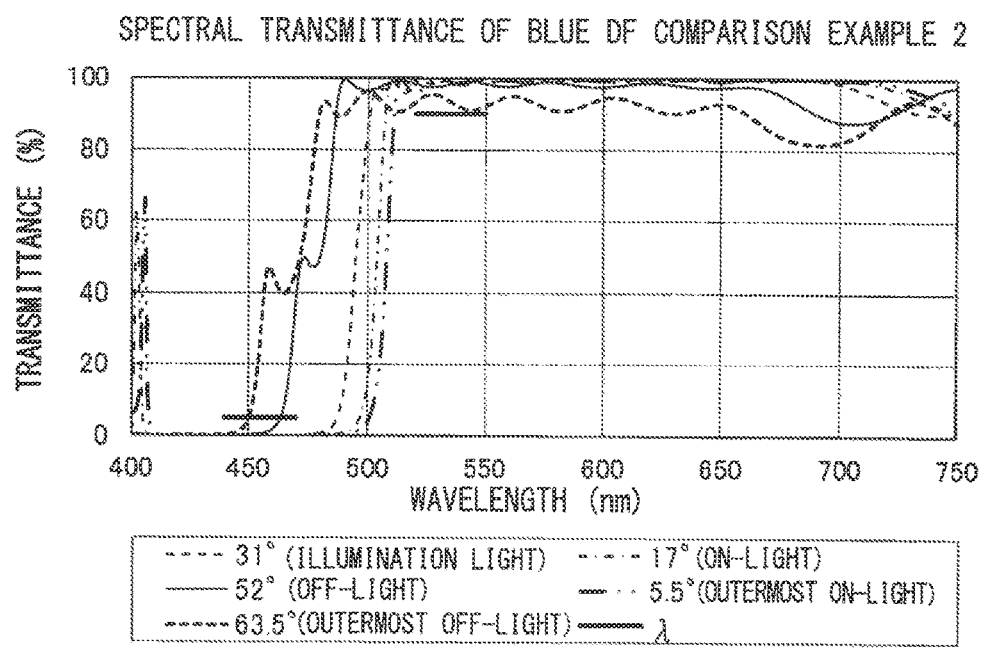
FIG. 11 is a diagram showing the transmittance of Blue DF Comparison Example 2.

For comparison's sake, an example where a conventionally configured blue dichroic film is applied to the color splitting/combining prism DPA described above will be described, as Blue DF Comparison Example 2, with reference to FIGS. 11 and 20. FIG. 11 shows, with respect to a conventionally configured blue dichroic film (Blue DF Comparison Example 2), transmittances at different wavelengths at incidence angles of 31° (corresponding to illumination light), 17° (corresponding to ON-light), 52° (corresponding to OFF-light), 5.5° (corresponding to outermost light in ON-light), and 63.5° (corresponding to outermost light in OFF-light), the horizontal axis representing wavelength in nm and the vertical axis representing transmittance in %. The film structure of Blue DF Comparison Example 2 is shown in FIG. 20.

As shown in FIG. 20, Blue DF Comparison Example 2 according to one or more embodiments has, stacked on top of a prism base (substrate glass): layers of $TiO_2$ with a refractive index of 2.47 as a first, a third, and subsequent odd-numbered layers up to a 29th; layers of $La_{0.5}Al_{1.5}O_3$ with a refractive index of 1.74 as a second, a fourth, and subsequent even-numbered layers up to a 28th; and a layer of $SiO_2$ with a refractive index of 1.47 as a 30th, outermost layer.

FIG. 20 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

As will be understood from FIG. 11, the conventional blue dichroic film B having the film structure shown in FIG. 20 satisfactorily reflects, with respect to blue light in the first wavelength range of 440 to 470 nm, all of light with an incidence angle of 17° corresponding to ON-light and light with an incidence angle of 31° corresponding to illumination light. It is seen, however, that light with an incidence angle of 52° corresponding to OFF-light falls in a border region where transmittance varies, and thus, as mentioned earlier, of blue light around 470 nm, only about one-half is reflected and the rest, one-half, is transmitted. Light with an incidence angle of 63.5° corresponding to outermost light in OFF-light is subject to a still lower transmittance.

Blue DF Practical Example 1-3

Next, a description will be given of Blue DF Practical Example 1-3, in which a blue dichroic film B that fulfills conditional formula (2) is formed, with reference to FIGS. 12 and 21. FIG. 12 shows, with respect to Blue DF Practical Example 1-3, transmittances at different wavelengths at 31° (corresponding to illumination light), 17° (corresponding to ON-light), 52° (corresponding to OFF-light), 5.5° (corresponding to outermost light in ON-light), and 63.5° (corresponding to outermost light in OFF-light), the horizontal axis representing wavelength in nm and the vertical axis representing transmittance in %. The film structure of Blue DF Practical Example 1-3 is shown in FIG. 21.

As shown in FIG. 21, Blue DF Practical Example 1-3 according to one or more embodiments has, stacked on top of a prism base (substrate glass): layers of $TiO_2$ with a refractive index of 2.47 as a first, a third, and subsequent odd-numbered layers up to a 29th; layers of $Ak_2O_3$ with a refractive index of 1.63 as a second, a fourth, and subsequent even-numbered layers up to a 28th; and a layer of $SiO_2$ with a refractive index of 1.47 as a 30th, outermost layer.

FIG. 21 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

As will be understood from FIG. 12, Blue DF Practical Example 1-3 having the film structure shown in FIG. 21 satisfactorily reflects, with respect to blue light in the first wavelength range of 440 to 470 nm, all of light with an incidence angle of 17° corresponding to ON-light, light with an incidence angle of 31° corresponding to illumination light, and in addition light with an incidence angle of 52° corresponding to OFF-light. It is seen, however, that light with an incidence angle of 63.5° corresponding to outermost light in OFF-light falls in a border region where transmittance varies, and blue light around 470 nm is subject to a transmittance of about 40%, meaning that the rest, about 60%, of the light is reflected.

A dichroic film can be evaluated in the following manner. When a dichroic film simultaneously fulfills, across the entire range of incidence angles, a transmittance of 90% or more to light in a wavelength range to be transmitted and a transmittance of 5% or less to light in a wavelength range to be reflected, it can be evaluated as Excellent. When a dichroic film simultaneously fulfills, across a range of incidence angles excluding incidence angles corresponding to outermost light in OFF-light with the largest incidence angle, a transmittance of 90% or more to light in a wavelength range to be transmitted and a transmittance of 5% or less to light in a wavelength range to be reflected, it can be evaluated as Good. When a dichroic film fails to satisfy, in a predetermined range of incidence angles of ON-light and OFF-light, one of a transmittance of 90% or more to light in a wavelength range to be transmitted and a transmittance of 5% or less to light in a wavelength range to be reflected, it can be evaluated as Poor.

Table 1 shows the film structures of Red DF Comparison Example 1 and Red DF Practical Example 1-1, and the film structures of Red DF Practical Examples 1-2 and 1-3, which yield satisfactory results like Red DF Practical Example 1-1. Table 2 shows the film structures of Blue DF Comparison Example 1 and Blue DF Practical Example 1-1, the film structure of Blue DF Practical Example 1-2, which yields satisfactory results like Blue DF Practical Example 1-1, and the film structures of Blue DF Comparison Example 2 and Blue DF Practical Example 1-3. Table 3 shows a performance test chart of the red dichroic films shown in Table 1. Table 4 shows a performance test chart of the blue dichroic films shown in Table 2.

Listed in Tables 1 and 2 are the substances and refractive indices of a first refractive index material with a higher refractive index and a second refractive index material with a lower refractive index, the number of layers stacked, the wavelength corresponding to $\lambda_{50}$, the value given by conditional formulae (1) and (2), and the evaluation result. Listed in Tables 3 and 4 are, in addition to the substances and refractive indices of a first refractive index material with a higher refractive index and a second refractive index material with a lower refractive index, the results of performance tests performed on the dichroic film as the value given by conditional formulae (1) and (2) are varied.

TABLE 1

| | RED DF FILM CONFIGURATIONS | | | | | | |
|---|---|---|---|---|---|---|---|
| | MATERIAL | REFRACTIVE INDEX | MATERIAL | REFRACTIVE INDEX | NUMBER OF LAYERS | $\lambda_{50\%}$ | $(\lambda_R - \lambda_{50})/(\lambda_R - \lambda_G)$ | EVALUATION |
| RED COMPARISON EXAMPLE 1 | $Nb_2O_5$ | 2.38 | $Al_2O_3$ | 1.63 | 27 | 594.7 nm | 0.44 | POOR |
| RED PRACTICAL EXAMPLE 1-1 | $TiO_2$ | 2.47 | $La_{0.9}Al_{1.1}O_3$ | 1.85 | 51 | 613.0 nm | 0.21 | GOOD |
| RED PRACTICAL EXAMPLE 1-2 | $Nb_2O_5$ | 2.38 | $La_{0.5}Al_{1.5}O_3$ | 1.74 | 52 | 612.6 nm | 0.22 | GOOD |
| RED PRACTICAL EXAMPLE 1-3 | $Nb_2O_5$ | 2.38 | $SiO_2$ | 1.47 | 56 | 610.8 nm | 0.24 | GOOD |

$\lambda_R$: 630 nm,
$\lambda_G$: 550 nm

TABLE 2

BLUE DF FILM CONFIGURATIONS

| MATERIAL | REFRACTIVE INDEX | MATERIAL | REFRACTIVE INDEX | NUMBER OF LAYERS | $\lambda_{50\%}$ | $(\lambda_G - \lambda_{50})/(\lambda_G - \lambda_B)$ | EVALUATION |
|---|---|---|---|---|---|---|---|
| BLUE COMPARISON EXAMPLE 1 | $TiO_2$ | 2.47 | $La_{0.5}Al_{1.5}O_3$ | 1.74 | 30 | 504.8 nm | 0.30 | POOR |
| BLUE PRACTICAL EXAMPLE 1-1 | $Nb_2O_5$ | 2.38 | $La_{0.5}Al_{1.5}O_3$ | 1.74 | 44 | 510.0 nm | 0.20 | GOOD |
| BLUE PRACTICAL EXAMPLE 1-2 | $Nb_2O_5$ | 2.38 | $Al_2O_3$ | 1.63 | 44 | 510.2 nm | 0.20 | GOOD |
| BLUE COMPARISON EXAMPLE 2 | $TiO_2$ | 2.47 | $La_{0.5}Al_{1.5}O_3$ | 1.74 | 30 | 504.0 nm | 0.34 | POOR |
| BLUE PRACTICAL EXAMPLE 1-3 | $TiO_2$ | 2.47 | $Al_2O_3$ | 1.63 | 30 | 510.4 nm | 0.19 | GOOD |

$\lambda_G$: 520 nm,
$\lambda_B$: 470 nm

TABLE 3

RED DF PERFORMANCE TESTS

| | MATERIAL | REFRACTIVE INDEX | MATERIAL | REFRACTIVE INDEX | $(\lambda_R - \lambda_{50})/(\lambda_R - \lambda_G)$ | | | | | | |
|---|---|---|---|---|---|---|---|---|---|---|---|
| | | | | | 0.15 | 0.2 | 0.25 | 0.3 | 0.35 | 0.4 | 0.45 |
| COMPARISON EXAMPLE 1 | $Nb_2O_5$ | 2.38 | $Al_2O_3$ | 1.63 | POOR | POOR | POOR | POOR | POOR | POOR | POOR |
| PRACTICAL EXAMPLE 1-1 | $TiO_2$ | 2.47 | $La_{0.9}Al_{1.1}O_3$ | 1.85 | POOR | EXCELLENT | GOOD | GOOD | GOOD | POOR | POOR |
| PRACTICAL EXAMPLE 1-2 | $Nb_2O_5$ | 2.38 | $La_{0.5}Al_{1.5}O_3$ | 1.74 | POOR | EXCELLENT | GOOD | GOOD | GOOD | GOOD | POOR |
| PRACTICAL EXAMPLE 1-3 | $Nb_2O_5$ | 2.38 | $SiO_2$ | 1.47 | POOR | GOOD | GOOD | GOOD | GOOD | POOR | POOR |

$\lambda_R$: 630 nm,
$\lambda_G$: 550 nm

TABLE 4

BLUE DF PERFORMANCE TESTS

| | MATERIAL | REFRACTIVE INDEX | MATERIAL | REFRACTIVE INDEX | $(\lambda_G - \lambda_{50})/(\lambda_G - \lambda_B)$ | | | | | | |
|---|---|---|---|---|---|---|---|---|---|---|---|
| | | | | | 0.17 | 0.18 | 0.19 | 0.20 | 0.21 | 0.22 | 0.23 |
| COMPARISON EXAMPLE 1 | $TiO_2$ | 2.47 | $La_{0.5}Al_{1.5}O_3$ | 1.74 | POOR | POOR | POOR | POOR | POOR | POOR | POOR |
| PRACTICAL EXAMPLE 1-1 | $Nb_2O_5$ | 2.38 | $La_{0.5}Al_{1.5}O_3$ | 1.74 | POOR | GOOD | GOOD | GOOD | GOOD | GOOD | POOR |
| PRACTICAL EXAMPLE 1-2 | $Nb_2O_5$ | 2.38 | $Al_2O_3$ | 1.63 | POOR | POOR | GOOD | GOOD | GOOD | GOOD | POOR |
| COMPARISON EXAMPLE 2 | $TiO_2$ | 2.47 | $La_{0.5}Al_{1.5}O_3$ | 1.74 | POOR | POOR | POOR | POOR | POOR | POOR | POOR |
| PRACTICAL EXAMPLE 1-3 | $Nb_2O_5$ | 2.38 | $Al_2O_3$ | 1.63 | POOR | GOOD | GOOD | GOOD | GOOD | GOOD | POOR |

$\lambda_G$: 520 nm,
$\lambda_B$: 470 nm

As shown in Table 1, as for Red DFs (red dichroic films R) that reflect red light, Comparison Example 1, where the value of $\lambda_{50}$ equals 594.8 nm and the value of $(\lambda_R-\lambda_{50})/(\lambda_R-\lambda_G)$ corresponding to conditional formula (1) equals 0.44, is evaluated as Poor; Practical Example 1-1, where the values equal 613.0 nm and 0.21, Practical Example 1-2, where the values equal 612.6 nm and 0.22, and Practical Example 1-3, where the values equal 610.8 nm and 0.24, are evaluated as Good. That is, the following is now clear: Comparison Example 1, where the cutoff wavelength falls on the shorter-wavelength side of 600 nm and the value of conditional formula (1) is larger than 0.4, is evaluated as Poor; by contrast, Practical Examples 1-1, 1-2, and 1-3, where the cutoff wavelength falls on a longer-wavelength side of about 610 nm and the value of conditional formula (1) is 0.2 to 0.4, are evaluated as Good, exhibiting a transmittance of 90% or more to light in wavelength ranges to be transmitted (440 to 470 nm and 520 to 550 nm) for light in a range of incidence angles of 16.5 to 58° excluding the maximum incidence angle, and a transmittance of 5% or less to light in a wavelength range to be reflected (630 to 660 nm), thus providing satisfactory characteristics (transmittance and reflectance).

That is, from Comparison Example 1 and Practical Examples 1-1 to 1-3 shown in Table 1, it is surmised that a Red DF (red dichroic film R) that reflects red light provides satisfactory transmittance and reflectance when $\lambda_{50}$ is equal to or larger than 610.0 nm and the value corresponding to conditional formula (1) (($\lambda_R-\lambda_{50}$)/($\lambda_R-\lambda_G$)) is equal to or larger than 0.2 but equal to or smaller than 0.4.

From Table 2, as for Blue DFs (blue dichroic films B) that reflect blue light, Comparison Example 1, where $\lambda_{50}$ equals 504.8 nm and the value of ($\lambda_G-\lambda_{50}$)/($\lambda_G-\lambda_B$) corresponding to conditional formula (2) equals 0.30, and Comparison Example 2, where the values equal 504.0 nm and 0.34, are evaluated as Poor; Practical Example 1-1, where the values are 510.0 nm and 0.20, Practical Example 1-2, where the values are 510.2 nm and 0.20, and Practical Example 1-3, where the values are 510.4 nm and 0.19, are evaluated as Good. That is, Comparison Examples 1 and 2, where the cutoff wavelength falls on the shorter-wavelength side of 510 nm and the value of conditional formula (2) is larger than 0.3, are evaluated as Poor; by contrast, Practical Examples 1-1, 1-2, and 1-3, where the cutoff wavelength falls on the lower-wavelength side of about 510 nm and the value of conditional formula (2) is 0.2±0.02, are evaluated as Good, exhibiting a transmittance of 90% or more to light in wavelength ranges to be transmitted (520 to 550 nm) for light in a range of incidence angles of 16.5 to 58° excluding the maximum incidence angle, and a transmittance of 5% or less to light in a wavelength range to be reflected (440 to 470 nm), thus providing satisfactory characteristics (transmittance and reflectance).

Thus, from Comparison Examples 1 and 2 and Practical Examples 1-1 to 1-3 shown in Table 2, it is surmised that a Blue DF (blue dichroic film B) that reflects blue light provides satisfactory transmittance and reflectance when $\lambda_{50}$ is equal to or larger than 510.0 nm and the value corresponding to conditional formula (2) (($\lambda_R-\lambda_{50}$)/($\lambda_R-\lambda_G$)) is 0.2±0.02.

It is clear that, with both conditional formulae (1) and (2), when its value is about 0.2, the best results are obtained. That is, it may be preferable to provide a dichroic surface on which a dichroic film is formed that fulfills conditional formula (3) below, where $\lambda_{50}$ represents the wavelength at which the dichroic film exhibits a transmittance of 50% when splitting two colors between reflection and transmission, $\lambda1$ represents the oscillation wavelength of, out of the two colors, the color with the longer wavelength, and $\lambda2$ represents the oscillation wavelength of the color with the shorter wavelength, then.

$$(\lambda1-\lambda_{50})/(\lambda1-\lambda2)\approx 0.2 \quad (3)$$

With this configuration, the difference between the oscillation wavelength of the longer-wavelength side one of the two colors to be split and the cutoff wavelength is smaller than the difference between the oscillation wavelength of the longer-wavelength side one and the oscillation wavelength of the shorter-wavelength side one, and thus the cutoff wavelength is closer to the oscillation wavelength of the longer-wavelength side one. That is, it is possible to obtain a configuration that can split apart light of different colors more reliably even with a dichroic surface on which a dichroic film is formed whose characteristics shift to the shorter-wavelength side as the incidence angle of light increases. It is thus possible to reduce unnecessary reflected light, prevent damage to optical components and adhesive, suppress image degradation due to stray light, and enhance light use efficiency.

Next, with reference to Tables 3 and 4, a preferred range of conditional formula (1) and a preferred range of conditional formula (2), in accordance with one or more embodiments, will be confirmed. Table 3 is a performance test chart of the red dichroic films shown in Table 1, and Table 4 is a performance test chart of the blue dichroic films shown in Table 2. In performance tests, while the structure of each dichroic film is left unchanged, the thicknesses of the individual layers are adjusted to vary the cutoff wavelength.

Table 3 shows performance tests in which the value of ($\lambda_R-\lambda_{50}$)/($\lambda_R-\lambda_G$) corresponding to conditional formula (1) for each red dichroic film is varied from 0.15 to 0.45. In this way, it is possible to confirm a preferred region in which to set the wavelength $\lambda_{50}$ (cutoff wavelength) at which the dichroic film exhibits a transmittance of 50% when splitting two colors of red and green between reflection and transmission.

For example, Comparison Example 1 is evaluated as Poor across the entire range where the value of ($\lambda_R-\lambda_{50}$)/($\lambda_R-\lambda_G$) is 0.15 to 0.45. However, Practical Example 1-1 is evaluated as Excellent when the value of ($\lambda_R-\lambda_{50}$)/($\lambda_R-\lambda_G$) equals 0.2, and as Good when the value is 0.25 to 0.35.

Practical Example 1-2 is evaluated as Excellent when the value of ($\lambda_R-\lambda_{50}$)/($\lambda_R-\lambda_G$) equals 0.2, and as Good when the value is 0.25 to 0.4. Practical Example 1-3 is evaluated as Good when the value of ($\lambda_R-\lambda_{50}$)/($\lambda_R-\lambda_G$) is 0.2 to 0.35.

Thus, from these results, it may be preferable that a red dichroic film R according to one or more embodiments be a dichroic film that fulfills conditional formula (1) below, where $\lambda_R$ represents the oscillation wavelength for red, $\lambda_G$ represents the oscillation wavelength for green, and $\lambda_{50}$ represents the wavelength at which the dichroic film exhibits a transmittance of 50% when splitting two colors of red and green between reflection and transmission in the characteristics of the dichroic film as observed when projection light is incident. It can be said that it may be more preferable that this dichroic film be a dichroic film that fulfills conditional formula (1') below.

$$0.2\leq(\lambda_R-\lambda_{50})/(\lambda_R-\lambda_G)\leq 0.4 \quad (1)$$

$$0.2\leq(\lambda_R-\lambda_{50})/(\lambda_R-\lambda_G)\leq 0.35 \quad (1')$$

With this configuration, in a projector provided with an illumination light source 1 that radiates laser light and a color splitting/combining prism DP, it is possible to reduce unnecessary reflected light, prevent damage to optical components and adhesive, suppress image degradation due to stray light, and enhance light use efficiency.

When the oscillation wavelength for red is 630 to 660 nm and the oscillation wavelength for green is 520 to 550 nm, the interval between the two colors of red and green is given by substituting the shortest oscillation wavelength for red, namely 630 nm, in $\lambda_R$ and the longest oscillation wavelength for green, namely 550 nm, in $\lambda_G$. That is, formula (1) is then $0.2\leq(630-\lambda_{50})/(630-550)\leq 0.4$.

Then, $\lambda_{50}$ is 598 to 614 nm. Thus, a value of $\lambda_{50}$ is, based on the results in Table 1, 610 to 613 nm, but it can also be said that, based on the results in Table 3, it may instead be about 598 to 614 nm. That is, whereas the cutoff wavelength provided between the two colors of red and green in a conventionally configured red dichroic film is 590 to 600 nm, it can be said that, in a red dichroic film R according to the present disclosure, where a laser light source is used, it is 600 to 614 nm.

Table 4 shows performance tests in which the value of ($\lambda_G-\lambda_{50}$)/($\lambda_G-\lambda_B$) corresponding to conditional formula (2) for each blue dichroic film is varied from 0.17 to 0.23. In this way, it is possible to confirm a region in which to set the wavelength $\lambda_{50}$ (cutoff wavelength) at which the dichroic film exhibits a transmittance of 50% when splitting two colors of blue and green between reflection and transmission.

For example, Comparison Example 1 is evaluated as Poor across the entire range where the value of $(\lambda_G-\lambda_{50})/(\lambda_G-\lambda_B)$ is 0.17 to 0.23. However, Practical Example 1-1 is evaluated as Good when the value of $(\lambda_G-\lambda_{50})/(\lambda_G-\lambda_B)$ is 0.18 to 0.22; Practical Example 1-2 is evaluated as Good when the value of $(\lambda_G-\lambda_{50})/(\lambda_G-\lambda_B)$ is 0.19 to 0.22.

Comparison Example 2, like Comparison Example 1, is evaluated as Poor across the entire range from 0.17 to 0.23. However, Practical Example 1-3 is evaluated as Good from 0.18 to 0.22.

Thus, with respect to the cutoff wavelength that is set between a blue region and a green region, it can be said that it may be preferable to fulfill conditional formula (2') below, where $\lambda_G$ represents the oscillation wavelength for green, $\lambda_B$ represents the oscillation wavelength for blue, and $\lambda_{50}$ represents the wavelength at which a dichroic film exhibits a transmittance of 50% when splitting two colors of green and blue between reflection and transmission in the characteristics of the dichroic film as observed when projection light is incident. It can be said that it may be more preferable that this dichroic film be a dichroic film that fulfills conditional formula (2") below.

$$0.18 \leq (\lambda_G-\lambda_{50})/(\lambda_G-\lambda_B) \leq 0.22 \quad (2')$$

$$0.19 \leq (\lambda_G-\lambda_{50})/(\lambda_G-\lambda_B) \leq 0.22 \quad (2'')$$

With this configuration, in a projector provided with an illumination light source 1 that radiates laser light and a color splitting/combining prism DP, it is possible to reduce unnecessary reflected light, prevent damage to optical components and adhesive, suppress image degradation due to stray light, and enhance light use efficiency.

When the oscillation wavelength for green is 520 to 550 nm and the oscillation wavelength for blue is 440 to 470 nm, then the interval between the two colors of green and blue can be given by substituting the shortest oscillation wavelength for green, namely 520 nm, in G and the longest oscillation wavelength for blue-green, namely 470 nm, in $\lambda_B$. That is, the conditional formula (2) is then $(520-\lambda_{50})/(520-470)=0.2\pm0.02$.

Then, $\lambda_{50}$ is 510±1 nm. Thus, in one or more embodiments, while a preferred value of $\lambda_{50}$ is, based on the results in Table 2, 510.0 to 510.4 nm, it can be said that, based on the results in Table 4, it may instead be about 509 to 511 nm. That is, whereas the cutoff wavelength provided between the two colors of blue and green in a conventionally configured blue dichroic film is 500 to 510 nm, it can be said that, in a blue dichroic film B according to the present disclosure, where a laser light source is used, it preferably is 509 to 511 nm in one or more embodiments.

As described above, in a dichroic film according to the first example, the cutoff wavelength is set in a predetermined portion between the oscillation wavelength ranges of the laser light sources used, and in addition the cutoff wavelength is provided on a longer-wavelength side than in a conventional dichroic film. It is thus possible to reduce unnecessary reflected light, prevent damage to optical components and adhesive, and suppress image degradation due to stray light.

For example, a color splitting/combining prism DP according to one or more embodiments has a dichroic film that is provided with a function of achieving wavelength separation with a transmittance of 90% or more for light of wavelengths to be transmitted and with a transmittance of 5% or less for light of wavelengths to be reflected, for all light beams that are incident on the dichroic film.

In a dichroic film corresponding to any red dichroic film R according to Red DF Practical Examples 1-1 and 1-2 and in a dichroic film corresponding to any blue dichroic film B according to Blue DF Practical Examples 1-1 to 1-3, there are alternately stacked together layers of a first refractive index material with a refractive index of 2.3 or more but 2.6 or less for light of 550 nm and layers of a second refractive index material with a refractive index of 1.6 or more but 1.9 or less, with a layer of $SiO_2$ formed as the last layer. Film formation is performed by use of, as the first refractive index material, $TiO_2$ or $Nb_2O_5$ and, as the second refractive index material, $Al_2O_3$ or a mixture oxide of $Al_2O_3$ and $La_2O_3$, and such that $\lambda_{50}$ mentioned above is fulfilled.

On the other hand, in a dichroic film corresponding to a red dichroic film R according to Red DF Practical Example 1-3, there are alternately stacked together layers of a first refractive index material with a refractive index of 2.3 or more but 2.6 or less for light of 550 nm and layers of $SiO_2$ with a refractive index of 1.4 or more but 1.5 or less, with a layer of $SiO_2$ formed as the last layer. Film formation is performed by used of, as the first refractive index material, $Nb_2O_5$, and such that $\lambda_{50}$ mentioned above is fulfilled.

With the configurations described above, it is possible to easily form a dichroic film whose cutoff wavelength is set such that two different colors are split apart reliably for all light beams of illumination light, projection light, and OFF-light that have different incidence angles with respect to the dichroic film.

As mentioned above, the first refractive index material with a refractive index of 2.3 or more but 2.6 or less may preferably be $TiO_2$ (with a refractive index of 2.47) or $Nb_2O_5$ (with a refractive index of 2.38), and the second refractive index material with a refractive index of 1.6 or more but 1.9 or less may preferably be $Al_2O_3$ (with a refractive index of 1.63) or a mixture oxide of $Al_2O_3$ and $La_2O_3$ (such as $La_{0.5}Al_{1.5}O_3$ with a refractive index of 1.74 or $La_{0.9}Al_{1.1}O_3$ with a refractive index of 1.85). With such configurations, it is possible to obtain film formation materials that reliably provide a desired refractive indices. Here, $La_{0.5}Al_{1.5}O_3$ is Substance M2 manufactured by Merck, and is a mixture oxide of $Al_2O_3$ and $La_2O_3$; $La_{0.9}Al_{1.1}O_3$ is Substance M3 manufactured by Merck, and is a mixture oxide of $Al_2O_3$ and $La_2O_3$.

With a color splitting/combining prism DP provided with a red dichroic film R according to any of Red DF Practical Examples 1-1 to 1-3 described above and a blue dichroic film B according to any of Blue DF Practical Examples 1-1 to 1-3 described above, it is possible to achieve satisfactory wavelength separation for all of illumination light, projection light, and OFF-light that are composed of laser light containing blue light in the first wavelength range of 440 to 470 nm, green light in the second wavelength range of 520 to 550 nm, and red light in the third wavelength range of 630 to 660 nm, and across the entire range of incidence angles.

When, with respect to a dichroic film, the incidence angle of illumination light is 39°, the incidence angle of projection light is 28°, and the incidence angle of OFF-light is 58° and in addition the one-side spread angle of a light beam is θ, then the f-number of the light beam, which is given by 1/(2 sin θ), may preferably be 2.5 or less. Here, the incidence angle of each light allows for an adjustment margin of ±2°. That is, in a situation where the present disclosure is suitably applied, the incidence angle of illumination light is 39°±2°, the incidence angle of projection light is 28°±2°, and the incidence angle of OFF-light is 58°±20°. With this configuration, even when the different light beams that are incident at different incidence angles are each a light beam having a spread angle (11.5° on one side) corresponding to an f-number of 2.5, it is possible to achieve satisfactory wavelength separation with all light in a predetermined wavelength range. Thus, even with high-output light radiated from the laser light source 1, it is possible to obtain a color splitting/combining prism, and an optical system that employs it, that can suppress unnecessary stray light and that can enhance light use efficiency.

For example, with respect to a light beam on a cone defined by an f-number of 2.5, the transmittance to all light in a wavelength band to be transmitted is of 90% or more, and in addition the transmittance in a wavelength band to be reflected is 5% or less. With this configuration, even when illumination light, projection light, and OFF-light each having a predetermined spread reach the same dichroic surface, it is possible to achieve satisfactory wavelength separation for all of those light beams.

Instead, with respect to all light of illumination light and projection light having a predetermined spread defined by an f-number of 2.5 and light along the central optical axis of OFF-light with the largest incidence angle, the average transmittance in a wavelength band to be transmitted may be 90% or more, and in addition the transmittance in a wavelength band to be reflected may be 5% or less. Also with this configuration, it is possible to obtain a color splitting/combining prism DP that can suppress unnecessary reflected light and that can enhance light use efficiency.

Thus, with an optical system that employs a color splitting/combining prism DP configured as described above, it is possible to provide a dichroic surface that can achieve satisfactory wavelength separation for all of illumination light I, projection light P, and OFF-light N, thereby to suppress unnecessary reflected light and stray light and to enhance light use efficiency.

Accordingly, with a projector that employs a color splitting/combining prism DP configured as described above, it is possible to provide a dichroic film that can achieve satisfactory wavelength separation for all of illumination light I, projection light P, and OFF-light N, and to obtain a projector that can suppress unnecessary reflected light and stray light and that can enhance light use efficiency.

Specifically, according to the present disclosure, a projector includes a laser light source 1 that radiates laser light in a first wavelength range as a blue range, a second wavelength range as a green range, and a third wavelength range as a red range; includes an illumination optical system IL that directs illumination light I emitted from the laser light source 1 to an image display element; includes a projection optical system PL that directs projection light P from the image display element to a projection lens; and includes a color splitting/combining prism DP that has a function of splitting apart the illumination light I and combining together the projection light P and that lets the part of illumination light I that will not be used as the projection light P emerge as OFF-light N via the image display element in a different direction from the projection light P. Here, the color splitting/combining prism DP has a dichroic film whose cutoff wavelength at which it exhibits a transmittance of 50% when splitting two different colors between reflection and transmission is provided in a wavelength range where satisfactory wavelength separation is possible for all of illumination light, projection light, and OFF-light that are incident at different incidence angles respectively.

In one or more embodiments, although illumination light is made incident on a dichroic film in a circularly polarized state or with such a polarization direction that p-polarized light and s-polarized light are equal with respect to the dichroic film, this is not meant to limit the present disclosure.

The cutoff wavelength $\lambda_{50}$ is the average value of the wavelengths at which a transmittance of 50% is exhibited to p-polarized light and s-polarized light respectively. In a case where a plurality of wavelengths at which a transmittance of 50% is exhibited exist between a transmitted wavelength range and a reflected wavelength range due to waveform oscillation, the one farthest to the longer-wavelength side can be taken as $\lambda_{50}$.

Next, a second example will be described.

Second Example

In a second example, there is provided a dichroic film that has a function of achieving wavelength separation, at least with respect to the central optical axis of OFF-light N, with a transmittance of 90% or more for light of wavelengths to be transmitted and with a transmittance of 5% or less for light of wavelengths to be reflected. In other words, there is provided a dichroic film that has a function of achieving wavelength separation, for each of the optical paths of illumination light I, projection light P, and OFF-light N containing light in a first wavelength range as a blue region, a second wavelength range as a green region, and a third wavelength range as a red region, with a transmittance of 90% or more at wavelengths to be transmitted in an optical-axis light beam and with a transmittance of 5% or less for light of wavelengths to be reflected.

With this configuration, the laser light source radiates light in a predetermined wavelength range; thus it is clear that the first wavelength range as a blue region, the second wavelength range as a green region, and the third wavelength range as a red region each have a unique wavelength range, and there is almost no light in any other wavelength range. It is also clear that the optical paths of illumination light I, projection light P, and OFF-light N that reach the same dichroic surface have different incidence angles respectively, and thus the incidence angle of OFF-light N that is incident on the dichroic surface that is optimized for the incidence angle of projection light P, which is the principal light, is deviated greatly. Thus, even when light is incident at an incidence angle larger than the incidence angle of projection light P, by providing a dichroic film that exhibits appropriate transmittance and reflectance to light beams corresponding to the wavelength ranges of the three colors, it is possible to form a color splitting/combining prism DP that satisfactorily reflects light beams to be reflected without producing stray light.

Thus, in an optical system provided with a laser light source 1 that radiates light source and a color splitting/combining prism DP, it is possible to obtain a color splitting/combining prism DP provided with a dichroic surface that can achieve satisfactory wavelength separation for all of illumination light I, projection light P, and OFF-light N. That is, with a color splitting/combining prism DP according to one or more embodiments, it is possible to achieve satisfactory wavelength separation for all of illumination light I, projection light P, and OFF-light N, and it is possible to suppress adverse effects of unnecessary reflected light and stray light and to enhance light use efficiency.

In one or more embodiments, a red dichroic film R that reflects red light and transmits blue and green light and a blue dichroic film B that reflects blue light and transmits green light are arranged in this order from the illumination light entrance side. With this construction, on a prism face that is required to transmit two of three colors that compose illumination light, a red dichroic film that has a high tolerance for the amount of wavelength shift and that poses less difficulty in film designing is provided, and on a prism face that is required to transmit only one of the remaining two colors, a blue dichroic film B that has a low tolerance for the amount of wavelength shift and that poses more difficulty in film designing is provided. This facilitates optical designing. That is, a prism face that has only to reflect one color and transmit one color can be assigned the stricter tolerance, and this facilitates optical designing.

To form a dichroic film that has a function of achieving wavelength separation with a transmittance of 90% or more at wavelengths to be transmitted in an optical-axis light beam and with a transmittance of 5% or less for light of wavelengths to be reflected, in a dichroic film corresponding to a red dichroic film R according to one or more embodiments, there are alternately stacked together layers of a first refractive index material with a refractive index of 2.3 or more but 2.6 or less for light of 550 nm and layers of a second refractive index material with a refractive index of 1.6 or more but 1.9 or less for light of 550 nm, with a layer of $SiO_2$ formed as the last layer. Moreover, it has an average refractive index nA of 2.05 or more as given by conditional formula (4) below, transmitting light of 440 to 470 nm and 520 to 550 nm, and reflecting light of 630 to 660 nm.

$$nA=\Sigma(n_i \cdot d_i)/\Sigma d_i \text{ (where } i=1 \text{ to } m-1\text{)} \quad (4)$$

Here, $n_i$ represents the refractive indices of the ith layer for light of 550 nm, $d_i$ represents the film thickness of the ith layer, and m represents the number of layers in the multiple-layer film.

On the other hand, in a dichroic film corresponding to a blue dichroic film B according to one or more embodiments, there are alternately stacked together layers of a first refractive index material with a refractive index of 2.3 or more but 2.6 or less for light of 550 nm and layers of a second refractive index material with a refractive index of 1.6 or more but 1.9 or less for light of 550 nm, with a layer of $SiO_2$ formed as the last layer. Moreover, it has an average refractive index nA of 2.10 or more as given by conditional formula (4) below, transmitting light of 440 to 470 nm, and reflecting light of 520 to 550 nm.

$$nA=\Sigma(n_i \cdot d_i)/\Sigma d_i \text{ (where } i=1 \text{ to } m-1\text{)} \quad (4)$$

Here, $n_i$ represents the refractive indices of the ith layer for light of 550 nm, $d_i$ represents the film thickness of the ith layer, and m represents the number of layers in the multiple-layer film.

Next, a description will be given of practical examples and comparison examples of red dichroic films R (Red DF) that reflect red light and practical examples and comparison examples of blue dichroic films B (Blue DF) that reflect blue light. These reflective films are formed, by use of BK7 manufactured by Schott as substrate glass, by an IAD process under the heat of 150° C.

Red DF Practical Example 2-1

Red DF Practical Example 2-1 according to one or more embodiments is identical with Red DF Practical Example 1-1 described previously. That is, the film structure of Red DF Practical Example 2-1 is as shown in FIG. 14 and the spectral transmittance of Red DF Practical Example 2-1 is as shown in FIG. 8.

From the results shown in FIG. 8, Red DF Practical Example 2-1 exhibits, with respect to light in the third wavelength range of 630 to 660 nm to be reflected, a transmittance of 5% or more for all light and, with respect to light in the second wavelength range of 520 to 550 nm and in the first wavelength range of 440 to 470 nm to be transmitted, a transmittance of 90% or more to all light.

Thus, the following is clear: when this dichroic film is applied to laser light, even when there is light that is spread over a predetermined angle corresponding to an f-number of 2.5, red light in the third wavelength range of 630 to 660 nm is reflected satisfactorily owing to a transmittance of 5% or less, and blue light in the first wavelength range of 440 to 470 nm and green light in the second wavelength range of 520 to 550 nm are transmitted satisfactorily owing to a transmittance of 90% or more across the entire range of incidence angles.

Blue DF Practical Example 2-1

Figure 47:
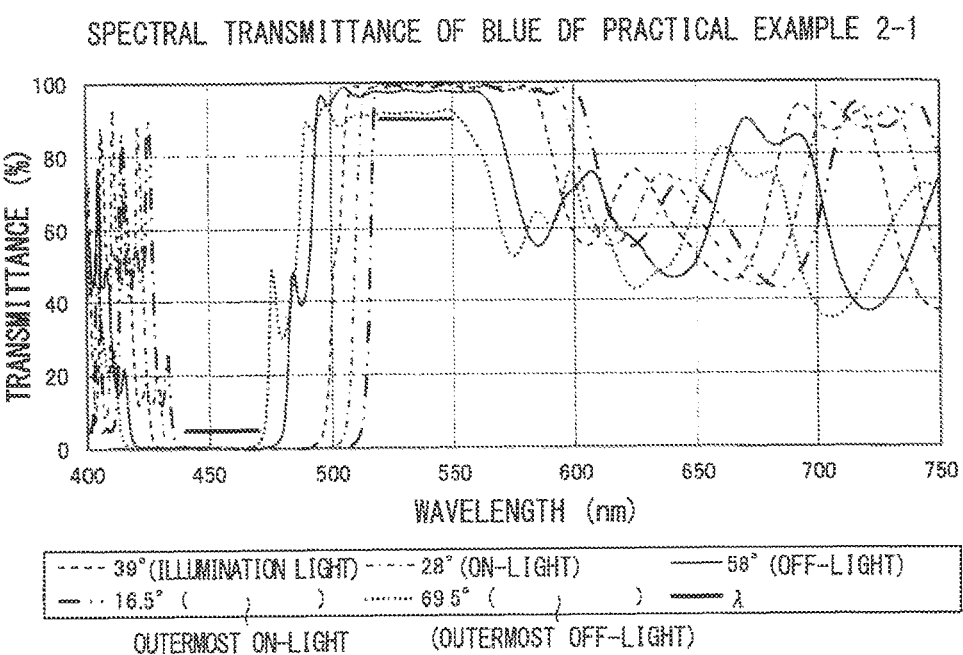
FIG. 47 is a diagram showing the transmittance of Blue DF Practical Example 2-1.

Next, with reference to FIGS. 33 and 47, a description will be given of Blue DF Practical Example 2-1 according to one or more embodiments (corresponding to a blue dichroic film B according to the present disclosure). FIG. 33 shows the structure of the dichroic film, and FIG. 47 shows the spectral transmittance of the dichroic film.

As shown in FIG. 33, Blue DF Practical Example 2-1 according to one or more embodiments has, stacked on top of a prism base: layers of $TiO_2$ with a refractive index of 2.47 as a first, a third, and subsequent odd-numbered layers up to a 49th; layers of $La_{0.9}Al_{1.1}O_3$ with a refractive index of 1.85 as a second, a fourth, and subsequent even-numbered layers up to a 48th; and a layer of $SiO_2$ with a refractive index of 1.47 as a 50th, outermost layer.

FIG. 33 also shows, for each of the stacked layers, its physical film thickness (nm), refractive index, and optical film thickness at a design principal wavelength $\lambda_0$ of 550 nm. The prism base (substrate glass) is formed of a conventionally known material, specifically BK7 manufactured by Schott, with a refractive index of 1.52.

The transmittance of this dichroic film is measured, in a similar manner as described above, at incidence angles of 39° corresponding to illumination light, 28° corresponding to projection light, 58° corresponding to OFF-light, 16.5° corresponding to outermost light in ON-light, and 69.5° corresponding to outermost light in OFF-light. The results are shown in FIG. 47.

FIG. 47 shows, with respect to the dichroic film having the film structure shown in FIG. 33, transmittances at different wavelengths at incidence angles of 28° (corresponding to ON-light), 39° (corresponding to illumination light), 58° (corresponding to OFF-light), 16.5° (corresponding to outermost light in ON-light), and 69.5° (corresponding to outermost light in OFF-light), the horizontal axis representing wavelength in nm and the vertical axis representing transmittance in %.

From the results shown in FIG. 47, it is seen that Blue DF Practical Example 2-1 exhibits, with respect to light in the first wavelength range of 440 to 470 nm to be reflected, a transmittance of 5% or less to all light. It is also seen that it exhibits, with respect to light in the second wavelength range of 520 to 550 nm to be transmitted, a transmittance of 90% or more to all light.

Thus, the following is clear: when this dichroic film is applied to laser light, even when there is light that is spread over a predetermined angle corresponding to the f-number of the optical system, blue light in the first wavelength range of 440 to 470 nm is reflected satisfactorily owing to a transmittance of 5% or less, and green light in the second wavelength range of 520 to 550 nm is transmitted satisfactorily owing to a transmittance of 90% or more.

Next, the results of confirmation with Red DF Practical Examples 2-2 to 2-6, which yield satisfactory results like Red DF Practical Example 2-1, Red DF Practical Examples 2-7 and 2-8, which yield acceptable results, and Red DF Comparison Examples 1 to 7, which yield poor results, are shown in Table 5. Likewise, the results of confirmation with Blue DF Practical Examples 2-2 to 2-6, which yield satisfactory results like Blue DF Practical Example 2-1, Blue DF Practical Examples 2-7 and 2-8, which yield acceptable results, and Blue DF Comparison Examples 1 and 3 to 8, which yield poor results, are shown in Table 6.

Listed in Tables 5 and 6 are the substances and refractive indices of a first refractive index material with a higher index and a second refractive index material with a lower refractive index, the average refractive index as given by conditional formula (4), the number of layers stacked, the maximum and minimum transmittances, and the evaluation result. For each wavelength range, the minimum transmittance is indicated for light in a wavelength range to be transmitted, and the maximum transmittance is indicated for light in a wavelength range to be reflected. Values obtained at the maximum angle of 69.5°, at which poorest performance is observed, are indicated in parentheses.

The dichroic films are evaluated in the following manner. When a dichroic film simultaneously fulfills, across the entire range of incidence angles, a transmittance of 90% or more for light in a wavelength range to be transmitted and a transmittance of 5% or less for light in a wavelength range to be reflected, it is evaluated as Excellent. When a dichroic film simultaneously fulfills, in a range of incidence angles of 16.5° to 58° excluding the maximum angle of 69.5°, a transmittance of 90% or more for light in a wavelength range to be transmitted and a transmittance of 5% or less for light in a wavelength range to be reflected, it is evaluated as Good. When a dichroic film fails to fulfill one of the conditions, it is evaluated as Poor.

TABLE 5

RED DF REFRACTIVE INDEX COMPARISON

| | MATERIAL | REFRACTIVE INDEX | MATERIAL | REFRACTIVE INDEX | AVERAGE REFRACTIVE INDEX | NUMBER OF LAYERS | 16.5~58° (69.5°) | | | RESULT |
|---|---|---|---|---|---|---|---|---|---|---|
| | | | | | | | MINIMUM TRANSMITTANCE 440~470 nm | MINIMUM TRANSMITTANCE 520~550 nm | MAXIMUM TRANSMITTANCE 630~660 nm | |
| PRACTICAL EXAMPLE 2-1 | $TiO_2$ | 2.47 | $La_{0.9}Al_{1.1}O_3$ | 1.85 | 2.19 | 51 | 96.9% (90.5%) | 96.0% (91.1%) | 2.5% (2.8%) | EXCELLENT |
| PRACTICAL EXAMPLE 2-2 | $TiO_2$ | 2.47 | $La_{0.5}Al_{1.5}O_3$ | 1.74 | 2.16 | 47 | 98.8% (90.9%) | 96.5% (91.7%) | 1.2% (1.2%) | EXCELLENT |
| PRACTICAL EXAMPLE 2-3 | $TiO_2$ | 2.47 | $Al_2O_3$ | 1.63 | 2.14 | 53 | 94.8% (90.9%) | 94.2% (90.5%) | 2.3% (2.7%) | EXCELLENT |
| PRACTICAL EXAMPLE 2-4 | $Nb_2O_5$ | 2.38 | $La_{0.9}Al_{1.1}O_3$ | 1.85 | 2.11 | 78 | 92.3% (90.0%) | 93.5% (90.2%) | 2.5% (2.6%) | EXCELLENT |
| PRACTICAL EXAMPLE 2-5 | $Nb_2O_5$ | 2.38 | $La_{0.5}Al_{1.5}O_3$ | 1.74 | 2.06 | 52 | 94.1% (90.3%) | 93.1% (90.3%) | 2.5% (4.5%) | EXCELLENT |
| PRACTICAL EXAMPLE 2-6 | $Nb_2O_5$ | 2.38 | $Al_2O_3$ | 1.63 | 2.10 | 54 | 94.1% (90.4%) | 96.0% (91.1%) | 3.5% (3.5%) | EXCELLENT |
| PRACTICAL EXAMPLE 2-7 | $TiO_2$ | 2.47 | $SiO_2$ | 1.47 | 2.01 | 56 | 93.7% (89.4%) | 94.6% (91.6%) | 1.5% (1.5%) | GOOD |
| PRACTICAL EXAMPLE 2-8 | $Nb_2O_5$ | 2.38 | $SiO_2$ | 1.47 | 1.98 | 56 | 94.0% (88.8%) | 91.6% (90.2%) | 2.6% (2.8%) | GOOD |
| COMPARISON EXAMPLE 1 | $Nb_2O_5$ | 2.38 | $Al_2O_3$ | 1.63 | 1.94 | 27 | 96.5% (89.5%) | 49.7% (26.0%) | 0.8% (25.0%) | POOR |
| COMPARISON EXAMPLE 2 | $TiO_2$ | 2.47 | $Al_2O_3$ | 1.63 | 2.10 | 41 | 95.5% (90.2%) | 93.2% (91.0%) | 6.4% (6.4%) | POOR |
| COMPARISON EXAMPLE 3 | $Nb_2O_5$ | 2.38 | $La_{0.5}Al_{1.5}O_3$ | 1.74 | 2.04 | 44 | 94.3% (90.6%) | 95.3% (91.1%) | 5.7% (5.7%) | POOR |
| COMPARISON EXAMPLE 4 | $Ta_2O_5$ | 2.21 | $La_{0.9}Al_{1.1}O_3$ | 1.85 | 2.03 | 63 | 97.1% (90.2%) | 95.4% (89.3%) | 5.8% (7.8%) | POOR |
| COMPARISON EXAMPLE 5 | $Ta_2O_5$ | 2.21 | $La_{0.5}Al_{1.5}O_3$ | 1.74 | 2.00 | 55 | 97.1% (91.0%) | 94.8% (90.5%) | 7.0% (7.0%) | POOR |
| COMPARISON EXAMPLE 6 | $Ta_2O_5$ | 2.21 | $Al_2O_3$ | 1.63 | 1.97 | 53 | 95.9% (90.7%) | 96.4% (90.7%) | 8.2% (8.2%) | POOR |
| COMPARISON EXAMPLE 7 | $Ta_2O_5$ | 2.21 | $SiO_2$ | 1.47 | 1.91 | 52 | 94.9% (90.6%) | 94.6% (90.3%) | 5.8% (5.8%) | POOR |

TABLE 6

BLUE DF REFRACTIVE INDEX COMPARISON

| | MATERIAL | REFRACTIVE INDEX | MATERIAL | REFRACTIVE INDEX | REFRACTIVE INDEX | NUMBER OF LAYERS | 16.5~58° (69.5°) | | RESULT |
|---|---|---|---|---|---|---|---|---|---|
| | | | | | | | MAXIMUM TRANSMITTANCE 440~470 nm | MINIMUM TRANSMITTANCE 520~550 nm | |
| PRACTICAL EXAMPLE 2-1 | $TiO_2$ | 2.47 | $La_{0.9}Al_{1.1}O_3$ | 1.85 | 2.25 | 50 | 0.7% (1.4%) | 97.2% (91.5%) | EXCELLENT |

TABLE 6-continued

BLUE DF REFRACTIVE INDEX COMPARISON

|  | MATERIAL | REFRACTIVE INDEX | MATERIAL | REFRACTIVE INDEX | REFRACTIVE INDEX | NUMBER OF LAYERS | 16.5~58° (69.5°) | | RESULT |
|---|---|---|---|---|---|---|---|---|---|
|  |  |  |  |  |  |  | MAXIMUM TRANSMITTANCE 440~470 nm | MINIMUM TRANSMITTANCE 520~550 nm |  |
| PRACTICAL EXAMPLE 2-2 | $TiO_2$ | 2.47 | $La_{0.5}Al_{1.5}O_3$ | 1.74 | 2.15 | 41 | 1.0% (4.3%) | 97.1% (91.1%) | EXCELLENT |
| PRACTICAL EXAMPLE 2-3 | $TiO_2$ | 2.47 | $Al_2O_3$ | 1.63 | 2.25 | 38 | 1.6% (3.3%) | 96.0% (90.7%) | EXCELLENT |
| PRACTICAL EXAMPLE 2-4 | $Nb_2O_5$ | 2.38 | $La_{0.9}Al_{1.1}O_3$ | 1.85 | 2.20 | 48 | 1.3% (3.2%) | 95.2% (90.6%) | EXCELLENT |
| PRACTICAL EXAMPLE 2-5 | $Nb_2O_5$ | 2.38 | $La_{0.5}Al_{1.5}O_3$ | 1.74 | 2.16 | 52 | 0.6% (2.4%) | 97.1% (91.2%) | EXCELLENT |
| PRACTICAL EXAMPLE 2-6 | $Nb_2O_5$ | 2.38 | $Al_2O_3$ | 1.63 | 2.15 | 48 | 1.2% (3.7%) | 96.0% (91.3%) | EXCELLENT |
| PRACTICAL EXAMPLE 2-7 | $Nb_2O_5$ | 2.38 | $SiO_2$ | 1.47 | 2.09 | 32 | 4.2% (9.5%) | 95.8% (89.6%) | GOOD |
| PRACTICAL EXAMPLE 2-8 | $Ta_2O_5$ | 2.21 | $La_{0.5}Al_{1.5}O_3$ | 1.74 | 2.04 | 53 | 3.4% (12.1%) | 94.5% (91.0%) | GOOD |
| COMPARISON EXAMPLE 1 | $TiO_2$ | 2.47 | $La_{0.5}Al_{1.5}O_3$ | 1.74 | 2.03 | 30 | 42.2% (44.9%) | 96.2% (88.5%) | POOR |
| COMPARISON EXAMPLE 3 | $TiO_2$ | 2.47 | $Al_2O_3$ | 1.63 | 2.25 | 32 | 5.5% (5.5%) | 96.7% (89.3%) | POOR |
| COMPARISON EXAMPLE 4 | $Nb_2O_5$ | 2.38 | $La_{0.9}Al_{1.1}O_3$ | 1.85 | 2.19 | 34 | 5.8% (12.3%) | 94.2% (89.4%) | POOR |
| COMPARISON EXAMPLE 5 | $TiO_2$ | 2.47 | $SiO_2$ | 1.47 | 2.01 | 46 | 7.2% (7.2%) | 96.3% (90.8%) | POOR |
| COMPARISON EXAMPLE 6 | $Ta_2O_5$ | 2.21 | $La_{0.9}Al_{1.1}O_3$ | 1.85 | 2.08 | 57 | 11.6% (22.9%) | 94.1% (89.3%) | POOR |
| COMPARISON EXAMPLE 7 | $Ta_2O_5$ | 2.21 | $Al_2O_3$ | 1.63 | 2.05 | 47 | 8.2% (17.2%) | 92.5% (89.4%) | POOR |
| COMPARISON EXAMPLE 8 | $Ta_2O_5$ | 2.21 | $SiO_2$ | 1.47 | 1.97 | 48 | 6.5% (17.8%) | 91.6% (89.8%) | POOR |

As shown in Table 5, as for Red DFs (red dichroic films R) that reflect red light, Practical Examples 2-1 to 2-6 are evaluated as Excellent, Practical Examples 2-7 and 2-8 are evaluated as Good, and Comparison Examples 1 to 7 are evaluated as Poor. Specifically, Red DF Practical Examples 2-1 to 2-6 exhibit, with respect to light in wavelength ranges to be transmitted (440 to 470 nm and 520 to 550 nm), a transmittance of 90% or more to all light in the range of incidence angles of 16.5 to 69.5° and, with respect to light in a wavelength range to be reflected (630 to 660 nm) a transmittance of 5% or less; it is thus clear that it provides satisfactory transmittance characteristics for all light beams having a spread angle corresponding to an f-number of 2.5.

Although Practical Example 2-7 yields satisfactory results in a range of incidence angles of 16.5 to 58°, it exhibits 89.4%, which is less than 90%, at an incidence angle of 69.5° in a wavelength range of 440 to 470 nm, and is thus evaluated only as Good. Likewise, although Practical Example 2-8 yields satisfactory results in a range of incidence angles of 16.5 to 58°, it exhibits 88.8% at an incidence angle of 69.5° in a wavelength range of 440 to 470 nm, and is thus evaluated only as Good. Practical Examples 1 to 7 fail to fulfill one of 90% or more and 5% or less in a range of incidence angles of 16.5 to 58°, and are thus evaluated as Poor.

A comparison between Red DF Practical Examples 2-1 to 2-6 with Red DF Comparison Examples 1 to 7 reveals the following. Practical Examples 2-1 to 2-6 fulfill both of the condition that the average refractive index is 2.05 or more (the minimum being 2.06 in Practical Example 2-5) and that the number of layers is 45 or more (the minimum being 47 in Practical Example 2-2). Comparison Examples 1 to 7 fail to fulfill one of the two conditions. Specifically, in Comparison Examples 1 and 3 to 7, the average refractive index is 2.05 or less, and in Comparison Example 2, although the average refractive index is 2.10, the number of layers is 44.

Thus, from Practical Examples 2-1 to 2-6 and Comparison Examples 1 to 7 shown in Table 5, it is surmised that a Red DF (red dichroic film R) that reflects red light exhibits satisfactory transmittance and reflectance when it has an average refractive index of 2.05 or more as defined by formula (4) and has 45 or more layers.

Moreover, from Table 6, it is seen that, as for Blue DFs (blue dichroic films B) that reflect blue light, Practical Examples 2-1 to 2-6 are evaluated as Excellent, Practical Example 2-7 and 2-8 are evaluated as Good, and Comparison Examples 1 and 3 to 8 are evaluated as Poor. Specifically, Blue DF Practical Examples 2-1 to 2-6 exhibit, across the entire range of incidence angles of 1.65 to 69.5°, a transmittance of 90% or more to light in a wavelength range to be transmitted (520 to 550 nm) and a transmittance of 5% or less to light in a wavelength range to be reflected (440 to 470 nm); Comparison Examples 1 and 3 to 8 fail to fulfill at least one of the conditions.

On the other hand, although Practical Example 2-7 exhibits satisfactory results in a range of incidence angles of 16.5 to 58°, it exhibits 9.5%, which is more than 5%, at an incidence angle of 69.5° in a wavelength range of 440 to 470 nm and 89.6%, which is less than 90%, at an incidence angle of 69.5° in a wavelength range of 520 to 550 nm; it is thus evaluated only as Good. Likewise, although Practical Example 2-8 exhibits satisfactory results in a range of incidence angles of 16.5 to 58°, it exhibits 12.1% at an incidence angle of 69.5° in a wavelength range of 440 to 470 nm; thus, it is evaluated only as Good.

A comparison between Blue DF Practical Examples 2-1 to 2-6 and Blue DF Comparison Examples 1 and 3 to 8 reveals the following. Practical Examples 2-1 to 2-6 fulfill both of the condition that the average refractive index is 2.10 or more (the minimum being 2.15 in Practical Examples 2-2 and 2-6) and that the number of layers is 35 or more (the minimum being 38 in Practical Example 2-3). Comparison Examples 1 and 3 to 8 fail to fulfill one of the two conditions. Specifically, in Comparison Examples 1 and 5 to 8, the average refractive index is 2.10 or less; in Comparison Examples 3 and 4, although the average refractive index is 2.10 or more, the number of layers is 32 and 34 respectively, which is less than 35.

Thus, from Practical Examples 2-1 to 2-6 and Comparison Examples 1 and 3 to 8 shown in Table 6, it is surmised that a Blue DF (blue dichroic film B) that reflects blue light exhibits satisfactory transmittance and reflectance when it has an average refractive index of 2.10 or more as defined by conditional formula (4) and has 35 layers or more.

Next, as to Red DF Practical Examples 2-2 to 2-8 and Red DF Comparison Examples 1 to 7, their film structures will be described with reference to FIGS. 22 to 32, and as to Blue DF Practical Examples 2-2 to 2-8 and Blue DF Comparison Examples 1 and 3 to 8, their film structures will be described with reference to FIGS. 34 to 46.

Red DF Practical Examples 2-2 to 2-8

First, the film structures of Red DF Practical Examples 2-2 to 2-8 will be described with reference to FIGS. 22 to 26, 15, and 16.

As shown in FIG. 22, Red DF Practical Example 2-2 has, stacked on top of a prism base (with a refractive index of 1.52): layers of $La_{0.5}Al_{1.5}O_3$ with a refractive index of 1.74 as a first, a third, and subsequent odd-numbered layers up to a 45th; layers of $TiO_2$ with a refractive index of 2.47 as a second, a fourth, and subsequent even-numbered layers up to a 46th; and a layer of $SiO_2$ with a refractive index of 1.47 as a 47th, outermost layer.

Also shown are, for each of the stacked layers, its physical film thickness (nm), refractive index, and optical film thickness at a design principal wavelength $\lambda_0$ of 550 nm. As shown in Table 5, Red DF Practical Example 2-2 has an average refractive index of 2.16, exhibiting minimum transmittances of 98.8% (90.9%) and 96.5% (91.7%) respectively in wavelength ranges of 440 to 470 nm and 520 to 550 nm to be transmitted; it exhibits a maximum transmittance of 1.2% (1.2%) in a wavelength range of 630 to 660 nm to be reflected.

A transmittance of 98.8% (90.9%) signifies, as mentioned above, that the transmittance is 98.8% at incidence angles of 16.5 to 58° and is 90.9% at the maximum angle of 69.5°. It is thus clear that Red DF Practical Example 2-2 provides satisfactory transmittance and reflectance at incidence angles of 16.5° to 69.5° for laser light of three colors.

As shown in FIG. 23, Red DF Practical Example 2-3 has, stacked on top of a prism base (with a refractive index of 1.52): layers of $Al_2O_3$ with a refractive index of 1.63 as a first, a third, and subsequent odd-numbered layers up to a 51st; layers of $TiO_2$ with a refractive index of 2.47 as a second, a fourth, and subsequent even-numbered layers up to a 52nd; and a layer of $SiO_2$ with a refractive index of 1.47 as a 53rd, outermost layer.

As shown in Table 5, Red DF Practical Example 2-3 has an average refractive index of 2.14, exhibiting minimum transmittances of 94.8% (90.9%) and 94.2% (90.5%) respectively in wavelength ranges of 440 to 470 nm and 520 to 550 nm to be transmitted; it exhibits a maximum transmittance of 2.3% (2.7%) in a wavelength range of 630 to 660 nm to be reflected. Thus, Red DF Practical Example 2-3 provides satisfactory transmittance and reflectance at incidence angles of 16.5° to 69.5° for laser light of three colors.

As shown in FIG. 24, Red DF Practical Example 2-4 has, stacked on top of a prism base (with a refractive index of 1.52): layers of $Nb_2O_5$ with a refractive index of 2.38 as a first, a third, and subsequent odd-numbered layers up to a 77th; layers of $La_{0.9}Al_{1.1}O_3$ with a refractive index of 1.85 as a second, a fourth, and subsequent even-numbered layers up to a 76th; and a layer of $SiO_2$ with a refractive index of 1.47 as a 78th, outermost layer.

As shown in Table 5, Red DF Practical Example 2-4 has an average refractive index of 2.11, exhibiting minimum transmittances of 92.3% (90.0%) and 93.5% (90.2%) respectively in wavelength ranges of 440 to 470 nm and 520 to 550 nm to be transmitted; it exhibits a maximum transmittance of 2.5% (2.6%) in a wavelength range of 630 to 660 nm to be reflected. Thus, Red DF Practical Example 2-4 provides satisfactory transmittance and reflectance at incidence angles of 16.5° to 69.5° for laser light of three colors.

The Red DF Practical Example 2-5 has the same film structure as Red DF Practical Example 1-2 described previously; as shown in FIG. 15, Red DF Practical Example 2-5 has, stacked on top of a prism base (with a refractive index of 1.52): layers of $Nb_2O_5$ with a refractive index of 2.38 as a first, a third, and subsequent odd-numbered layers up to a 51st; layers of $La_{0.5}Al_{1.5}O_3$ with a refractive index of 1.74 as a second, a fourth, and subsequent even-numbered layers up to a 50th; and a layer of $SiO_2$ with a refractive index of 1.47 as a 52nd, outermost layer.

As shown in Table 5, Red DF Practical Example 2-5 has an average refractive index of 2.06, exhibiting minimum transmittances of 94.1% (90.3%) and 93.1% (90.3%) respectively in wavelength ranges of 440 to 470 nm and 520 to 550 nm to be transmitted; it exhibits a maximum transmittance of 2.5% (4.5%) in a wavelength range of 630 to 660 nm to be reflected. Thus, Red DF Practical Example 2-5 provides satisfactory transmittance and reflectance at incidence angles of 16.5° to 69.5° for laser light of three colors.

As shown in FIG. 25, Red DF Practical Example 2-6 has, stacked on top of a prism base (with a refractive index of 1.52): layers of $Nb_2O_5$ with a refractive index of 2.38 as a first, a third, and subsequent odd-numbered layers up to a 53rd; layers of $Al_2O_3$ with a refractive index of 1.63 as a second, a fourth, and subsequent even-numbered layers up to a 52nd; and a layer of $SiO_2$ with a refractive index of 1.47 as a 54th, outermost layer.

As shown in Table 5, Red DF Practical Example 2-6 has an average refractive index of 2.10, exhibiting minimum transmittances of 94.1% (90.4%) and 96.0% (91.1%) respectively in a wavelength ranges of 440 to 470 nm and 520 to 550 nm to be transmitted; it exhibits a maximum transmittance of 3.5% (3.5%) in a wavelength range of 630 to 660 nm to be reflected. Thus, Red DF Practical Example 2-6 provides satisfactory transmittance and reflectance at incidence angles of 16.5° to 69.5° for laser light of three colors.

As shown in FIG. 26, Red DF Practical Example 2-7 has, stacked on top of a prism base (with a refractive index of 1.52): layers of $TiO_2$ with a refractive index of 2.47 as a first, a third, and subsequent odd-numbered layers up to a 55th; and layers of $SiO_2$ with a refractive index of 1.47 as a second, a fourth, and subsequent even-numbered layers up to a 54th, and as a 56th, outermost layer.

As shown in Table 5, Red DF Practical Example 2-7 has an average refractive index of 2.01, exhibiting minimum transmittances of 93.7% (89.4%) and 94.6% (91.6%) respectively in wavelength ranges of 440 to 470 nm and 520 to 550 nm to be transmitted; it exhibits a maximum transmittance of 1.5% (1.5%) in a wavelength range of 630 to 660 nm to be reflected. Thus, although Red DF Practical Example 2-7 provides satisfactory transmittance and reflectance at incidence angles of 16.5° to 58°, it exhibits a minimum transmittance of 89.4%, which is less than 90%, at an incidence angle of 69.5° at 440 to 470 nm; thus, it is evaluated only as Good, as mentioned earlier.

The Red DF Practical Example 2-8 has the same film structure as Red DF Practical Example 1-3 described previously; as shown in FIG. 16, Red DF Practical Example 2-8 has, stacked on top of a prism base (substrate glass): layers of $Nb_2O_5$ with a refractive index of 2.38 as a first, a third, and subsequent odd-numbered layers up to a 55th; and layers of $SiO_2$ with a refractive index of 1.47 as a second, a fourth, and subsequent even-numbered layers up to a 54th, and as a 56th, outermost layer.

As shown in Table 5, Red DF Practical Example 2-8 has an average refractive index of 1.98, exhibiting minimum transmittances of 94.0% (88.8%) and 91.6% (90.2%) respectively in wavelength ranges of 440 to 470 nm and 520 to 550 nm to be transmitted; it exhibits a maximum transmittance of 2.6% (2.8%) in a wavelength range of 630 to 660 nm to be reflected. Thus, although Red DF Practical Example 2-8 provides satisfactory transmittance and reflectance at incidence angles of 16.5° to 58°, it exhibits a minimum transmittance of 88.8%, which is less than 90%, at an incidence angle of 69.5° at 440 to 470 nm; it is thus evaluated only as Good, as mentioned earlier.

Red DF Comparison Examples 1 to 7

Next, the film structures of Red DF Comparison Examples 1 to 7 will be described with reference to FIGS. 13 and 27 to 32.

As shown in FIG. 13, Red DF Comparison Example 1 has, stacked on top of a prism base (with a refractive index of 1.52): layers of $Al_2O_3$ with a refractive index of 1.63 as a first, a third, and subsequent odd-numbered layers up to a 25th; layers of $Nb_2O_5$ with a refractive index of 2.38 as a second, a fourth, and subsequent even-numbered layers up to a 26th; and a layer of $SiO_2$ with a refractive index of 1.47 as a 27th, outermost layer.

As shown in Table 5, Red DF Comparison Example 1 has an average refractive index of 1.94, exhibiting minimum transmittances of 96.5% (89.5%) and 49.7% (26.0%) respectively in wavelength ranges of 440 to 470 nm and 520 to 550 nm to be transmitted; it exhibits a maximum transmittance of 0.8% (25.0%) in a wavelength range of 630 to 660 nm to be reflected. Thus, Red DF Comparison Example 1 exhibits an unacceptable transmittance in a wavelength range of 520 to 550 nm, and is thus evaluated as Poor. That is, Red DF Comparison Example 1 cannot be said to provide satisfactory transmittance and reflectance.

As shown in FIG. 27, Red DF Comparison Example 2 has, stacked on top of a prism base (with a refractive index of 1.52): layers of $Al_2O_3$ with a refractive index of 1.63 as a first, a third, and subsequent odd-numbered layers up to a 39th; layers of $TiO_2$ with a refractive index of 2.47 as a second, a fourth, and subsequent even-numbered layers up to a 40th; and a layer of $SiO_2$ with a refractive index of 1.47 as a 41st, outermost layer.

As shown in Table 5, Red DF Comparison Example 2 has an average refractive index of 2.10, exhibiting minimum transmittances of 95.5% (90.2%) and 93.2% (91.0%) respectively in wavelength ranges of 440 to 470 nm and 520 to 550 nm to be transmitted; it exhibits a maximum transmittance of 6.4% (6.4%) in a wavelength range of 630 to 660 nm to be reflected. Thus, Red DF Comparison Example 2, exhibiting a transmittance of 5% or more in a wavelength range of 630 to 660 nm, is evaluated as Poor. That is, Red DF Comparison Example 2 cannot be said to provide satisfactory transmittance and reflectance.

As shown in FIG. 28, Red DF Comparison Example 3 has, stacked on top of a prism base (with a refractive index of 1.52): layers of $Nb_2O_5$ with a refractive index of 2.38 as a first, a third, and subsequent odd-numbered layers up to a 43rd; layers of $La_{0.5}Al_{1.5}O_3$ with a refractive index of 1.74 as a second, a fourth, and subsequent even-numbered layers up to a 42nd; and a layer of $SiO_2$ with a refractive index of 1.47 as a 44th, outermost layer.

As shown in Table 5, Red DF Comparison Example 3 has an average refractive index of 2.04, exhibiting minimum transmittances of 94.3% (90.6%) and 95.3% (91.1%) respectively in wavelength ranges of 440 to 470 nm and 520 to 550 nm to be transmitted; it exhibits a maximum transmittance of 5.7% (5.7%) in a wavelength range of 630 to 660 nm to be reflected. Thus, Red DF Comparison Example 3, exhibiting a transmittance of 5% or more in a wavelength range of 630 to 660 nm, is evaluated as Poor. That is, Red DF Comparison Example 3 cannot be said to provide satisfactory transmittance and reflectance.

As shown in FIG. 29, Red DF Comparison Example 4 has, stacked on top of a prism base (with a refractive index of 1.52): layers of $La_{0.9}Al_{1.1}O_3$ with a refractive index of 1.85 as a first, a third, and subsequent odd-numbered layers up to a 61st; layers of $Ta_2O_5$ with a refractive index of 2.21 as a second, a fourth, and subsequent even-numbered layers up to a 62nd; and a layer of $SiO_2$ with a refractive index of 1.47 as a 63rd, outermost layer.

As shown in Table 5, Red DF Comparison Example 4 has an average refractive index of 2.03, exhibiting minimum transmittances of 97.1% (90.2%) and 95.4% (89.3%) respectively in wavelength ranges of 440 to 470 nm and 520 to 550 nm to be transmitted; it exhibits a maximum transmittance of 5.8% (7.8%) in a wavelength range of 630 to 660 nm to be reflected. Thus, Red DF Comparison Example 4, exhibiting a transmittance of 5% or more in a wavelength range of 630 to 660 nm, is evaluated as Poor. That is, Red DF Comparison Example 4 cannot be said to provide satisfactory transmittance and reflectance.

As shown in FIG. 30, Red DF Comparison Example 5 has, stacked on top of a prism base (with a refractive index of 1.52): layers of $La_{0.5}Al_{1.5}O_3$ with a refractive index of 1.74 as a first, a third, and subsequent odd-numbered layers up to a 53rd; layers of $Ta_2O_5$ with a refractive index of 2.21 as a second, a fourth, and subsequent even-numbered layers up to a 54th; and a layer of $SiO_2$ with a refractive index of 1.47 as a 55th, outermost layer.

As shown in Table 5, Red DF Comparison Example 5 has an average refractive index of 2.00, exhibiting minimum transmittances of 97.1% (91.0%) and 94.8% (90.5%) respectively in wavelength ranges of 440 to 470 nm and 520 to 550 nm to be transmitted; it exhibits a maximum transmittance of 7.0% (7.0%) in a wavelength range of 630 to 660 nm to be reflected. Thus, Red DF Comparison Example 5, exhibiting a transmittance of 5% or more in a wavelength range of 630 to 660 nm, is evaluated as Poor. That is, Red DF Comparison Example 5 cannot be said to provide satisfactory transmittance and reflectance.

As shown in FIG. 31, Red DF Comparison Example 6 has, stacked on top of a prism base (with a refractive index of 1.52): layers of $Al_2O_3$ with a refractive index of 1.63 as a first, a third, and subsequent odd-numbered layers up to a 51st; layers of $Ta_2O_5$ with a refractive index of 2.21 as a second, a fourth, and subsequent even-numbered layers up to a 52nd; and a layer of $SiO_2$ with a refractive index of 1.47 as a 53rd, outermost layer.

As shown in Table 5, Red DF Comparison Example 6 has an average refractive index of 1.97, exhibiting minimum transmittances of 95.9% (90.7%) and 96.4% (90.7%) respectively in wavelength ranges of 440 to 470 nm and 520 to 550 nm to be transmitted; it exhibits a maximum transmittance of 8.2% (8.2%) in a wavelength range of 630 to 660 nm to be reflected. Thus, Red DF Comparison Example 6, exhibiting a transmittance of 5% or more in a wavelength range of 630 to 660 nm, is evaluated as Poor. That is, Red DF Comparison Example 6 cannot be said to provide satisfactory transmittance and reflectance.

As shown in FIG. 32, Red DF Comparison Example 7 has, stacked on top of a prism base (with a refractive index of 1.52): layers of $Ta_2O_5$ with a refractive index of 2.21 as a first, a third, and subsequent odd-numbered layers up to a 51st; and layers of $SiO_2$ with a refractive index of 1.47 as a second, a fourth, and subsequent even-numbered layers up to a 50th, and as a 52nd, outermost layer.

As shown in Table 5, Red DF Comparison Example 7 has an average refractive index of 1.91, exhibiting minimum transmittances of 94.9% (90.6%) and 94.6% (90.3%) respectively in wavelength ranges of 440 to 470 nm and 520 to 550 nm to be transmitted; it exhibits a maximum transmittance of 5.8% (5.8%) in a wavelength range of 630 to 660 nm to be reflected. Thus, Red DF Comparison Example 7, exhibiting a transmittance of 5% or more in a wavelength range of 630 to 660 nm, is evaluated as Poor. That is, Red DF Comparison Example 6 cannot be said to provide satisfactory transmittance and reflectance.

Blue DF Practical Examples 2-2 to 2-8

Next, the film structures of Blue DF Practical Examples 2-2 to 2-8 will be described with reference to FIGS. 34 to 40.

As shown in FIG. 34, Blue DF Practical Example 2-2 has, stacked on top of a prism base (with a refractive index of 1.52): layers of $La_{0.5}Al_{1.5}O_3$ with a refractive index of 1.74 as a first, a third, and subsequent odd-numbered layers up to a 39th; layers of $TiO_2$ with a refractive index of 2.47 as a second, a fourth, and subsequent even-numbered layers up to a 40th; and a layer of $SiO_2$ with a refractive index of 1.47 as a 41st, outermost layer.

As shown in Table 6, Blue DF Practical Example 2-2 has an average refractive index of 2.15, exhibiting a maximum transmittance of 1.0% (4.3%) in a wavelength range of 440 to 470 nm to be reflected and a minimum transmittance of 97.1% (91.1%) in a wavelength range of 520 to 550 nm to be transmitted.

Blue DF Practical Example 2-2 exhibits a maximum transmittance of 5% or less across the entire range of incidence angles in a wavelength range to be reflected, and exhibits a minimum transmittance of 90% or more in a wavelength range to be transmitted; thus, it is evaluated as Excellent. That is, it is clear that Blue DF Practical Example 2-2 provides satisfactory transmittance and reflectance at incidence angles of 16.5° to 69.5° for laser light in a predetermined wavelength range.

As shown in FIG. 35, Blue DF Practical Example 2-3 has, stacked on top of a prism base (with a refractive index of 1.52): layers of $TiO_2$ with a refractive index of 2.47 as a first, a third, and subsequent odd-numbered layers up to a 37th; layers of $Al_2O_3$ with a refractive index of 1.63 as a second, a fourth, and subsequent even-numbered layers up to a 36th; and a layer of $SiO_2$ with a refractive index of 1.47 as a 38th, outermost layer.

As shown in Table 6, Blue DF Practical Example 2-3 has an average refractive index of 2.25, exhibiting a maximum transmittance of 1.6% (3.3%) in a wavelength range of 440 to 470 nm to be reflected and a minimum transmittance of 96.0% (90.7%) in a wavelength range of 520 to 550 nm to be transmitted. Thus, Blue DF Practical Example 2-3 exhibits a maximum transmittance of 5% or less across the entire range of incidence angles in a wavelength range to be reflected and a minimum transmittance of 90% or more in a wavelength range to be transmitted; thus, it is evaluated as Excellent, and can be said to provide satisfactory transmittance and reflectance.

As shown in FIG. 36, Blue DF Practical Example 2-4 has, stacked on top of a prism base (with a refractive index of 1.52): layers of $Nb_2O_5$ with a refractive index of 2.38 as a first, a third, and subsequent odd-numbered layers up to a 47th; layers of $La_{0.9}Al_{1.1}O_3$ with a refractive index of 1.85 as a second, a fourth, and subsequent even-numbered layers up to a 46th; and a layer of $SiO_2$ with a refractive index of 1.47 as a 48th, outermost layer.

As shown in Table 6, Blue DF Practical Example 2-4 has an average refractive index of 2.20, exhibiting a maximum transmittance of 1.3% (3.2%) in a wavelength range of 440 to 470 nm to be reflected and a minimum transmittance of 95.2% (90.6%) in a wavelength range of 520 to 550 nm to be transmitted. Thus, Blue DF Practical Example 2-4 exhibits a maximum transmittance of 5% or less across the entire range of incidence angles in a wavelength range to be reflected and a minimum transmittance of 90% or more in a wavelength range to be transmitted; thus, it is evaluated as Excellent, and can be said to provide satisfactory transmittance and reflectance.

As shown in FIG. 37, Blue DF Practical Example 2-5 has, stacked on top of a prism base (with a refractive index of 1.52): layers of $Nb_2O_5$ with a refractive index of 2.38 as a first, a third, and subsequent odd-numbered layers up to a 51st; layers of $La_{0.5}Al_{1.5}O_3$ with a refractive index of 1.74 as a second, a fourth, and subsequent even-numbered layers up to a 50th; and a layer of $SiO_2$ with a refractive index of 1.47 as a 52nd, outermost layer.

As shown in Table 6, Blue DF Practical Example 2-5 has an average refractive index of 2.16, exhibiting a maximum transmittance of 0.6% (2.4%) in a wavelength range of 440 to 470 nm to be reflected and a minimum transmittance of 97.1% (91.2%) in a wavelength range of 520 to 550 nm to be transmitted. Thus, Blue DF Practical Example 2-5 exhibits a maximum transmittance of 5% or less across the entire range of incidence angles in a wavelength range to be reflected and a minimum transmittance of 90% or more in a wavelength range to be transmitted; thus, it is evaluated as Excellent, and can be said to provide satisfactory transmittance and reflectance.

As shown in FIG. 38, Blue DF Practical Example 2-6 has, stacked on top of a prism base (with a refractive index of 1.52): layers of $Nb_2O_5$ with a refractive index of 2.38 as a first, a third, and subsequent odd-numbered layers up to a 47th; layers of $Al_2O_3$ with a refractive index of 1.63 as a second, a fourth, and subsequent even-numbered layers up to a 46th; and a layer of $SiO_2$ with a refractive index of 1.47 as a 48th, outermost layer.

As shown in Table 6, Blue DF Practical Example 2-6 has an average refractive index of 2.15, exhibiting a maximum transmittance of 1.2% (3.7%) in a wavelength range of 440 to 470 nm to be reflected and a minimum transmittance of 96.0% (91.3%) in a wavelength range of 520 to 550 nm to be transmitted. Thus, Blue DF Practical Example 2-6 exhibits a maximum transmittance of 5% or less across the entire range of incidence angles in a wavelength range to be reflected and a minimum transmittance of 90% or more in a wavelength range to be transmitted; thus, it is evaluated as Excellent, and can be said to provide satisfactory transmittance and reflectance.

As shown in FIG. 39, Blue DF Practical Example 2-7 has, stacked on top of a prism base (with a refractive index of 1.52): layers of $Nb_2O_5$ with a refractive index of 2.38 as a first, a third, and subsequent odd-numbered layers up to a 31st; and layers of $SiO_2$ with a refractive index of 1.47 as a second, a fourth, and subsequent even-numbered layers up to a 30th, and as a 32nd, outermost layer.

As shown in Table 6, Blue DF Practical Example 2-7 has an average refractive index of 2.09, exhibiting a maximum transmittance of 4.2% (9.5%) in a wavelength range of 440 to 470 nm to be reflected and a minimum transmittance of 95.8% (89.6%) in a wavelength range of 520 to 550 nm to be transmitted. Thus, although Blue DF Practical Example 2-7 exhibits satisfactory transmittance and reflectance at incidence angles of 16.5° to 58°, it exhibits, at an incidence angle of 69.5°, a maximum transmittance of 9.5, which is more than 5%, at 440 to 470 nm and a minimum transmittance of 89.6%, which is less than 90%, at 520 to 550 nm; it is thus evaluated only as Good, as mentioned earlier.

As shown in FIG. 40, Blue DF Practical Example 2-8 has, stacked on top of a prism base (with a refractive index of 1.52): layers of $La_{0.5}Al_{1.5}O_3$ with a refractive index of 1.74 as a first, a third, and subsequent odd-numbered layers up to a 51st; layers of $Ta_2O_5$ with a refractive index of 2.21 as a second, a fourth, and subsequent even-numbered layers up to a 52th; and a layer of $SiO_2$ with a reflective index of 1.47 as a 53rd, outermost layer.

As shown in Table 6, Blue DF Practical Example 2-8 has an average refractive index of 2.04, exhibiting a maximum transmittance of 3.4% (12.1%) in a wavelength range of 440 to 470 nm to be reflected and a minimum transmittance of 94.5% (91.0%) in a wavelength range of 520 to 550 nm to be transmitted. Thus, although Blue DF Practical Example 2-8 exhibits satisfactory transmittance and reflectance at incidence angles of 16.5° to 58°, it exhibits a maximum transmittance of 12.1, which is more than 5%, at an incidence angle of 69.5° at 440 to 470 nm; it is thus evaluated only as Good, as mentioned earlier.

Blue DF Comparison Examples 1 and 3 to 8

Next, the film structures of Blue DF Comparison Examples 1 and 3 to 8 will be described with reference to FIGS. 17 and 41 to 46.

As shown in FIG. 17, Blue DF Comparison Example 1 has, stacked on top of a prism base (with a refractive index of 1.52): layers of $TiO_2$ with a refractive index of 2.47 as a first, a third, and subsequent odd-numbered layers up to a 29th; layers of $La_{0.5}Al_{1.5}O_3$ with a refractive index of 1.74 as a second, a fourth, and subsequent even-numbered layers up to a 28th; and a layer of $SiO_2$ with a refractive index of 1.47 as a 30th, outermost layer.

As shown in Table 6, Blue DF Comparison Example 1 has an average refractive index of 2.03, exhibiting a maximum transmittance of 42.2% (44.9%) in a wavelength range of 440 to 470 nm to be reflected and a minimum transmittance of 96.2% (88.5%) in a wavelength range of 520 to 550 nm to be transmitted. Thus, Blue DF Comparison Example 1 exhibits a maximum transmittance of 40% or more at 440 to 470 nm even at incidence angles of 16.5° to 58°; it is thus unacceptable, and is evaluated as Poor. Thus, Blue DF Comparison Example 1 cannot be said to provide satisfactory transmittance and reflectance.

As shown in FIG. 41, Blue DF Comparison Example 3 has, stacked on top of a prism base (with a refractive index of 1.52): layers of $TiO_2$ with a refractive index of 2.47 as a first, a third, and subsequent odd-numbered layers up to a 31st; layers of $Al_2O_3$ with a refractive index of 1.63 as a second, a fourth, and subsequent even-numbered layers up to a 30th; and a layer of $SiO_2$ with a refractive index of 1.47 as a 32nd, outermost layer.

As shown in Table 6, Blue DF Comparison Example 3 has an average refractive index of 2.25, exhibiting a maximum transmittance of 5.5% (5.5%) in a wavelength range of 440 to 470 nm to be reflected and a minimum transmittance of 96.7% (89.3%) in a wavelength range of 520 to 550 nm to be transmitted. Thus, Blue DF Comparison Example 2 exhibits a maximum transmittance of 5% or more at 440 to 470 nm even at incidence angles of 16.5° to 58°; it is thus unacceptable, and is evaluated as Poor. Thus, Blue DF Comparison Example 3 cannot be said to provide satisfactory transmittance and reflectance.

As shown in FIG. 42, Blue DF Comparison Example 4 has, stacked on top of a prism base (with a refractive index of 1.52): layers of $Nb_2O_5$ with a refractive index of 2.38 as a first, a third, and subsequent odd-numbered layers up to a 33rd; layers of $La_{0.9}Al_{1.1}O_3$ with a refractive index of 1.85 as a second, a fourth, and subsequent even-numbered layers up to a 32nd; and a layer of $SiO_2$ with a refractive index of 1.47 as a 34th, outermost layer.

As shown in Table 6, Blue DF Comparison Example 4 has an average refractive index of 2.19, exhibiting a maximum transmittance of 5.8% (12.3%) in a wavelength range of 440 to 470 nm to be reflected and a minimum transmittance of 94.2% (89.4%) in a wavelength range of 520 to 550 nm to be transmitted. Thus, Blue DF Comparison Example 4 exhibits a maximum transmittance of 5% or more at 440 to 470 nm even at incidence angles of 16.5° to 58°; it is thus unacceptable, and is evaluated as Poor. Thus, Blue DF Comparison Example 4 cannot be said to provide satisfactory transmittance and reflectance.

As shown in FIG. 43, Blue DF Comparison Example 5 has, stacked on top of a prism base (with a refractive index of 1.52): layers of $TiO_2$ with a refractive index of 2.47 as a first, a third, and subsequent odd-numbered layers up to a 45th; and layers of $SiO_2$ with a refractive index of 1.47 as a second, a fourth, and subsequent even-numbered layers up to a 44th, and as a 46th, outermost layer.

As shown in Table 6, Blue DF Comparison Example 5 has an average refractive index of 2.01, exhibiting a maximum transmittance of 7.2% (7.2%) in a wavelength range of 440 to 470 nm to be reflected and a minimum transmittance of 96.3% (90.8%) in a wavelength range of 520 to 550 nm to be transmitted. Thus, Blue DF Comparison Example 5 exhibits a maximum transmittance of 5% or more at 440 to 470 nm even at incidence angles of 16.5° to 58°; it is thus unacceptable, and is evaluated as Poor. Thus, Blue DF Comparison Example 5 cannot be said to provide satisfactory transmittance and reflectance.

As shown in FIG. 44, Blue DF Comparison Example 6 has, stacked on top of a prism base (with a refractive index of 1.52): layers of $La_{0.9}Al_{1.1}O_3$ with a refractive index of 1.85 as a first, a third, and subsequent odd-numbered layers up to a 55th; layers of $Ta_2O_5$ with a refractive index of 2.21 as a second, a fourth, and subsequent even-numbered layers up to a 56th; and a layer of $SiO_2$ with a refractive index of 1.47 as a 57th, outermost layer.

As shown in Table 6, Blue DF Comparison Example 6 has an average refractive index of 2.08, exhibiting a maximum transmittance of 11.6% (22.9%) in a wavelength range of 440 to 470 nm to be reflected and a minimum transmittance of 94.1% (89.3%) in a wavelength range of 520 to 550 nm to be transmitted. Thus, Blue DF Comparison Example 6 exhibits a maximum transmittance of 5% or more at 440 to 470 nm even at incidence angles of 16.5° to 58°; it is thus unacceptable, and is evaluated as Poor. Thus, Blue DF Comparison Example 6 cannot be said to provide satisfactory transmittance and reflectance.

As shown in FIG. 45, Blue DF Comparison Example 7 has, stacked on top of a prism base (with a refractive index of 1.52): layers of $Al_2O_3$ with a refractive index of 1.63 as a first, a third, and subsequent odd-numbered layers up to a 45th; layers of $Ta_2O_5$ with a refractive index of 2.21 as a second, a fourth, and subsequent even-numbered layers up to a 46th; and a layer of $SiO_2$ with a refractive index of 1.47 as a 47th, outermost layer.

As shown in Table 6, Blue DF Comparison Example 7 has an average refractive index of 2.05, exhibiting a maximum transmittance of 8.2% (17.2%) in a wavelength range of 440 to 470 nm to be reflected and a minimum transmittance of 92.5% (89.4%) in a wavelength range of 520 to 550 nm to be transmitted. Thus, Blue DF Comparison Example 7 exhibits a maximum transmittance of 5% or more at 440 to 470 nm even at incidence angles of 16.5° to 58°; it is thus unacceptable, and is evaluated as Poor. Thus, Blue DF Comparison Example 7 cannot be said to provide satisfactory transmittance and reflectance.

As shown in FIG. 46, Blue DF Comparison Example 8 has, stacked on top of a prism base (with a refractive index of 1.52): layers of $Ta_2O_5$ with a refractive index of 2.21 as a first, a third, and subsequent odd-numbered layers up to a 47th; and layers of $SiO_2$ with a refractive index of 1.47 as a second, a fourth, and subsequent even-numbered layers up to a 46th, and as a 48th, outermost layer.

As shown in Table 6, Blue DF Comparison Example 8 has an average refractive index of 1.97, exhibiting a maximum transmittance of 6.5% (17.8%) in a wavelength range of 440 to 470 nm to be reflected and a minimum transmittance of 91.6% (89.8%) in a wavelength range of 520 to 550 nm to be transmitted. Thus, Blue DF Comparison Example 8 exhibits a maximum transmittance of 5% or more at 440 to 470 nm even at incidence angles of 16.5° to 58°; it is thus unacceptable, and is evaluated as Poor. Thus, Blue DF Comparison Example 8 cannot be said to provide satisfactory transmittance and reflectance.

As described above, of color splitting/combining prisms DP according to the second example, those provided with a red dichroic film R according to one of Red DF Practical Examples 2-1 to 2-6 and a blue dichroic film B according to one of Blue DF Practical Examples 2-1 to 2-6 are color splitting/combining prisms DP provided with dichroic surfaces that can achieve satisfactory wavelength separation for all of illumination light, projection light (ON-light), and OFF-light.

On the other hand, those provided with a red dichroic film R according to Red DF Practical Example 2-7 or 2-8 and a blue dichroic film B according to Blue DF Practical Example 2-7 or 2-8 are color splitting/combining prisms DP provided with dichroic surfaces that can achieve satisfactory wavelength separation for all of illumination light and projection light (ON-light), and in addition for central optical-axis light in OFF-light.

That is, a color splitting/combining prism DP according to the second example has a dichroic film that has a function of achieving wavelength separation, with respect to a central optical axis of the OFF-light, with a transmittance of 90% or more for light of wavelengths to be transmitted and with a transmittance of 5% or less for light of wavelengths to be reflected.

A dichroic film corresponding to a red dichroic film R according to one of Red DF Practical Examples 2-1 to 2-6 has layers of a first refractive index material with a refractive index of 2.3 or more but 2.6 or less for light of 550 nm and layers of a second refractive index material with a refractive index of 1.6 or more but 1.9 or less for light of 550 nm stacked alternately, with a layer of $SiO_2$ formed as the last layer; it exhibits an average refractive index nA of 2.05 or more as defined by conditional formula (4) below, transmitting light of 440 to 470 nm and 520 to 550 nm and reflecting light of 630 to 660 nm.

$$nA=\Sigma(n_i \cdot d_i)/\Sigma d_i \text{ (where } i=1 \text{ to } m-1) \tag{4}$$

Here, $n_i$ represents the refractive indices of the ith layer for light of 550 nm, $d_i$ represents the film thickness of the ith layer, and m represents the number of layers in the multiple-layer film.

In the above-mentioned dichroic film corresponding to a red dichroic film R according to one of Red DF Practical Examples 2-1 to 2-6, the number m of layers is 45 or more. With this configuration, it is possible to obtain a dichroic film that can achieve wavelength separation for all of illumination light, projection light, and OFF-light.

On the other hand, a dichroic film corresponding to a blue dichroic film B according to one of Blue DF Practical Examples 2-1 to 2-6 has layers of a first refractive index material with a refractive index of 2.3 or more but 2.6 or less for light of 550 nm and layers of a second refractive index material with a refractive index of 1.6 or more but 1.9 or less for light of 550 nm stacked alternately, with a layer of $SiO_2$ formed as the last layer; it exhibits an average refractive index nA of 2.10 or more as defined by conditional formula (4) below, transmitting light of 440 to 470 nm and reflecting light of 520 to 550 nm.

$$nA=\Sigma(n_i \cdot d_i)/\Sigma d_i \text{ (where } i=1 \text{ to } m-1) \tag{4}$$

Here, $n_i$ represents the refractive indices of the ith layer for light of 550 nm, $d_i$ represents the film thickness of the ith layer, and m represents the number of layers in the multiple-layer film.

In the above-mentioned dichroic film corresponding to a blue dichroic film B according to one of Blue DF Practical Examples 2-1 to 2-6, the number m of layers is 35 or more. With this configuration, it is possible to obtain a dichroic film that can achieve wavelength separation for all of illumination light, projection light, and OFF-light.

The first refractive index material with a refractive index of 2.3 or more but 2.6 or less may preferably be $TiO_2$ (with a refractive index of 2.47) or $Nb_2O_5$ (with a refractive index of 2.38), and the second refractive index material with a refractive index of 1.6 or more but 1.9 or less may preferably be $Al_2O_3$ (with a refractive index of 1.63) or a mixture oxide of $Al_2O_3$ and $La_2O_3$ (such as $La_{0.5}Al_{1.5}O_3$ with a refractive index of 1.74 or $La_{0.9}Al_{1.1}O_3$ with a refractive index of 1.85). With such configurations, it is possible to obtain film formation materials that reliably provide a desired refractive index. Here, $La_{0.5}Al_{1.5}O_3$ is Substance M2 manufactured by Merck, and is a mixture oxide of $Al_2O_3$ and $La_2O_3$; $La_{0.9}Al_{1.1}O_3$ is Substance M3 manufactured by Merck, and is a mixture oxide of $Al_2O_3$ and $La_2O_3$.

With a color splitting/combining prism DP provided with a red dichroic film R according to one of Red DF Practical Examples 2-1 to 2-6 and a blue dichroic film B according to one of Blue DF Practical Examples 2-1 to 2-6, it is possible to achieve satisfactory wavelength separation for all of illumination light, projection light, and OFF-light composed of laser light containing blue light in the first wavelength range of 440 to 470 nm, green light in the second wavelength range of 520 to 550 nm, and red light in the third wavelength range of 630 to 660 nm, and across the entire range of incidence angles.

In one or more embodiments, it may be preferable that, with respect to a dichroic surface, the incidence angle of illumination light be 39°, the incidence angle of projection light be 28°, and the incidence angle of OFF-light be 58°, and that, let the one-side spread angle of a light beam be θ, the f-number of the light beam as given by 1/(2 sin θ) be 2.5 or less. The incidence angle of each light allows for an adjustment margin of ±2°. That is, in a situation where the present disclosure is suitably applied, the incidence angle of illumination light is 39°±2°, the incidence angle of projection light is 28°±2°, and the incidence angle of OFF-light is 58°±2°. With this configuration, even when the different light beams incident at different incidence angles are each a light beam having a spread angle (11.5° on one side) corresponding to an f-number of 2.5, it is possible to achieve satisfactory wavelength separation with all light in a predetermined wavelength range. Thus, even with high-output light radiated from the laser light source 1, it is possible to obtain a color splitting/combining prism, and an optical system that employs it, that can suppress unnecessary stray light and that can enhance light use efficiency.

For example, with respect to a light beam on a cone defined by an f-number of 2.5, the transmittance to all light in a wavelength band to be transmitted is of 90% or more, and in addition the transmittance in a wavelength band to be reflected is 5% or less. With this configuration, even when illumination light, projection light, and OFF-light each having a predetermined spread reach the same dichroic surface, it is possible to achieve satisfactory wavelength separation for all of those light beams.

Instead, with respect to all light of illumination light and projection light having a predetermined spread defined by an f-number of 2.5 and light along the central optical axis of OFF-light with the largest incidence angle, the average transmittance in a wavelength band to be transmitted may be 90% or more, and in addition the transmittance in a wavelength band to be reflected may be 5% or less. Also with this configuration, it is possible to obtain a color splitting/combining prism DP that can suppress unnecessary reflected light and that can enhance light use efficiency.

Thus, with an optical system that employs a color splitting/combining prism DP configured as described above, it is possible to provide a dichroic surface that can achieve satisfactory wavelength separation for all of illumination light I, projection light P, and OFF-light N, thereby to suppress unnecessary reflected light and stray light and to enhance light use efficiency.

In one or more embodiments, although illumination light is made incident on a dichroic film in a circularly polarized state or with such a polarization direction that p-polarized light and s-polarized light are equal with respect to the dichroic film, this is not meant to limit the present disclosure.

As described above, according to the present disclosure as implemented in the first and the second examples, it is possible, in a projector provided with an illumination light source that radiates laser light and a color splitting/combining prism, to obtain a color splitting/combining prism, and an optical system and a projector employing it, that can reduce unnecessary stray light, prevent damage to optical components and adhesive, suppress image degradation due to stray light, and enhance light use efficiency.

That is, with an optical system employing a color splitting/combining prism according to the present disclosure, owing to the provision of a dichroic surface that can reliably split red, green, and blue light, it is possible to obtain an optical system that can suppress unnecessary reflected light and stray light and thereby enhance light use efficiency. Likewise, with a projector employing a color splitting/combining prism according to the present disclosure, owing to the provision of a dichroic surface that can reliably split red, green, and blue light, it is possible to obtain a projector that can suppress unnecessary reflected light and stray light and thereby enhance light use efficiency.

Thus, color splitting/combining prisms according to the present disclosure, and optical systems and projectors employing them, are suitably applicable to large projectors and the like that are required to use high-output laser light to display images on a large screen.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

What is claimed is:

1. A color splitting/combining prism that splits apart illumination light from a projector and combines together projection light from the projector, wherein a part of the illumination light that is not used as the projection light passes through the color splitting/combining prism as OFF-light via an image display element in a direction different from the projection light, the color splitting/combining prism comprising:
a dichroic film of which a cutoff wavelength, at which the dichroic film exhibits a transmittance of 50% when splitting two different colors between reflection and transmission, is provided in a wavelength range in which wavelength separation is possible for all of the illumination light, the projection light, and the OFF-light that are incident at different incidence angles respectively, wherein
conditional formula (1) below is fulfilled:

$$0.2 \leq (\lambda_R - \lambda_{50})/(\lambda_R - \lambda_G) \leq 0.4, \quad (1)$$

where $\lambda_R$ is an oscillation wavelength for red,
$\lambda_G$ is an oscillation wavelength for green, and
$\lambda_{50}$ is the cutoff wavelength at which the dichroic film exhibits a transmittance of 50% when splitting two colors of red and green between reflection and transmission in dichroic film characteristics observed with the projection light incident.

2. The color splitting/combining prism of claim 1, wherein
conditional formula (1') below is fulfilled:

$$0.2 \leq (\lambda_R - \lambda_{50})/(\lambda_R - \lambda_G) \leq 0.35. \quad (1')$$

3. The color splitting/combining prism of claim 1, wherein
conditional formula (3) below is fulfilled:

$$(\lambda 1 - \lambda_{50})/(\lambda 1 - \lambda 2) \approx 0.2, \quad (3)$$

where $\lambda_{50}$ is the cutoff wavelength at which the dichroic film exhibits a transmittance of 50% when splitting the two different colors between reflection and transmission,
$\lambda 1$ is an oscillation wavelength of a longer-wavelength one of the two colors, and
$\lambda 2$ is an oscillation wavelength of a shorter-wavelength one of the two colors.

4. The color splitting/combining prism of claim 1, further comprising:

a first prism including a red dichroic film that reflects red light and transmits blue and green light; and a second prism including a blue dichroic film that reflects blue light and transmits green light, wherein the first and second prisms are arranged in this order from an illumination light entrance side.

5. The color splitting/combining prism of claim 4, wherein the first and second prisms are arranged to face each other across an air gap, the first and second prisms each being a prism in a shape of a triangular prism with a triangular cross-section, a third prism is arranged to face the second prism across an air gap, the third prism being in a shape of a quadrangular prism with a quadrangular cross-section, the red dichroic film is formed on a face of the first prism that faces the second prism, and the blue dichroic film is formed on a face of the second prism that faces the third prism.

6. The color splitting/combining prism of claim 1, wherein the dichroic film comprises alternately stacked layers of a first refractive index material with a refractive index of 2.3 or more but 2.6 or less for light of 550 nm and layers of a second refractive index material with a refractive index of 1.6 or more but 1.9 or less for light of 550 nm, with a layer of $SiO_2$ formed as a last layer, and the dichroic film fulfills the $\lambda_{50}$ by use of $TiO_2$ or $Nb_2O_5$ as the first refractive index material and $Al_2O_3$ or a mixture oxide of $Al_2O_3$ and $La_2O_3$ as the second refractive index material.

7. The color splitting/combining prism of claim 1, wherein the dichroic film comprises alternately stacked layers of a first refractive index material with a refractive index of 2.3 or more but 2.6 or less for light of 550 nm and layers of $SiO_2$ with a refractive index of 1.4 or more but 1.5 or less for light of 550 nm, with a layer of $SiO_2$ formed as a last layer, and the dichroic film is formed so as to fulfill the $\lambda_{50}$ by use of $TiO_2$ or $Nb_2O_5$ as the first refractive index material.

8. An optical system comprising the color splitting/combining prism of claim 1.

9. A projector comprising the color splitting/combining prism of claim 1 and further comprising:

a laser light source that radiates laser light in a first wavelength range as a blue range, a second wavelength range as a green range, and a third wavelength range as a red range;

an illumination optical system that directs the illumination light emitted from the laser light source to the image display element; and a projection optical system that directs the projection light from the image display element to a projection lens.

10. The projector of claim 9, wherein
conditional formula (3) below is fulfilled:

$$(\lambda 1-\lambda_{50})/(\lambda 1-\lambda 2)\approx 0.2 \qquad (3)$$

where $\lambda_{50}$ is the cutoff wavelength at which the dichroic film exhibits a transmittance of 50% when splitting the two different colors between reflection and transmission, $\lambda 1$ is an oscillation wavelength of a longer-wavelength one of the two colors, and $\lambda 2$ is an oscillation wavelength of a shorter-wavelength one of the two colors, the first wavelength range as the blue range is 440 to 470 nm, the second wavelength range as the green range is 520 to 550 nm, and the third wavelength range as the red range is 630 to 660 nm.

11. A color splitting/combining prism that splits apart illumination light from a projector and combines together projection light from the projector, wherein a part of the illumination light that is not used as the projection light emerges from the color splitting/combining prism as OFF-light via the image display element in a direction different from the projection light, the color splitting/combining prism comprising:

a dichroic film of which a cutoff wavelength, at which the dichroic film exhibits a transmittance of 50% when splitting two different colors between reflection and transmission, is provided in a wavelength range in which wavelength separation is possible for all of the illumination light, the projection light, and the OFF-light that are incident at different incidence angles respectively, wherein conditional formula (2') below is fulfilled:

$$0.18\leq(\lambda_G-\lambda_{50})/(\lambda_G-\lambda_B)\leq 0.22, \qquad (2')$$

where $\lambda_G$ is an oscillation wavelength for green, $\lambda_B$ is an oscillation wavelength for blue, and $\lambda_{50}$ is the cutoff wavelength at which the dichroic film exhibits a transmittance of 50% when splitting two colors of green and blue between reflection and transmission in dichroic film characteristics observed with the projection light incident.

12. The color splitting/combining prism of claim 11, wherein conditional formula (2") below is fulfilled:

$$0.19\leq(\lambda_G-\lambda_{50})/(\lambda_G-\lambda_B)\leq 0.22. \qquad (2'')$$

13. A projector comprising the color splitting/combining prism of claim 11 and further comprising:

a laser light source that radiates laser light in a first wavelength range as a blue range, a second wavelength range as a green range, and a third wavelength range as a red range;

an illumination optical system that directs the illumination light emitted from the laser light source to the image display element; and a projection optical system that directs the projection light from the image display element to a projection lens.

14. A color splitting/combining prism that splits apart illumination light from a projector and combines together projection light from the projector, wherein a part of the illumination light that is not used as the projection light passes through the color splitting/combining prism as OFF-light via an image display element in a direction different from the projection light, the color splitting/combining prism comprising:

a dichroic surface on which a dichroic film is formed, and the dichroic film provides wavelength separation, with respect to a central optical axis of the OFF-light, with a transmittance of 90% or more for light of wavelengths to be transmitted and with a transmittance of 5% or less for light of wavelengths to be reflected, wherein an incidence angle of the illumination light with respect to the dichroic surface is 39°±2°, an incidence angle of the projection light with respect to the dichroic surface is 28°±2°, an incidence angle of the OFF-light with respect to the dichroic surface is 58°±2°, and θ is a one-side spread angle of a light beam, and an f-number of the light beam is given by 1/(2 sin θ) is 2.5 or less.

15. The color splitting/combining prism of claim 14, wherein the dichroic surface comprises a first dichroic surface and a second dichroic surface in order from an illumination light entrance side, a red dichroic film that reflects red light and transmits blue and green light is formed on the first dichroic surface, and a blue dichroic film that reflects blue light and transmits green light is formed on the second dichroic surface.

16. The color splitting/combining prism of claim 15, wherein the red dichroic film comprises alternately stacked layers of a first refractive index material with a refractive index of 2.3 or more but 2.6 or less for light of 550 nm and layers of a second refractive index material with a refractive index of 1.6 or more but 1.9 or less for light of 550 nm, with a layer of $SiO_2$ formed as a last layer, the red dichroic film has an average refractive index of 2.05 or more as given by conditional formula (4) below, and the red dichroic film transmits light of 440 the 470 nm and 520 to 550 nm and reflects light of 630 to 660 nm:

$$nA=\Sigma(ni \cdot di)/\Sigma di \text{ (where } i=1 \text{ to } m-1\text{)}, \quad (4)$$

where $ni$ represents a refractive index of an ith layer for light of 550 nm;

$di$ represents a film thickness of the ith layer; and $m$ represents a number of layers in a multiple-layer film.

17. The color splitting/combining prism of claim 16, wherein the number of layers in the dichroic film is 45 or more.

18. The color splitting/combining prism of claim 16, wherein the first refractive index material is $TiO_2$ or $Nb_2O_5$, and the second refractive index material is $Al_2O_3$ or a mixture oxide of $Al_2O_3$ and $La_2O_3$.

19. The color splitting/combining prism of claim 15, wherein the blue dichroic film comprises alternately stacked layers of a first refractive index material with a refractive index of 2.3 or more but 2.6 or less for light of 550 nm and layers of a second refractive index material with a refractive index of 1.6 or more but 1.9 or less for light of 550 nm, with a layer of $SiO_2$ formed as a last layer, the blue dichroic film has an average refractive index of 2.10 or more as given by conditional formula (4) below, and the blue dichroic film reflects light of 440 the 470 nm and transmits light of 520 to 550 nm:

$$nA=\Sigma(ni \cdot di)/\Sigma di \text{ (where } i=1 \text{ to } m-1\text{)}, \quad (4)$$

where $ni$ represents a refractive index of an ith layer for light of 550 nm;

$di$ represents a film thickness of the ith layer; and $m$ represents a number of layers in a multiple-layer film.

20. The color splitting/combining prism of claim 19, wherein the number of layers in the dichroic film is 35 or more.

* * * * *